United States Patent
Yamahara

(10) Patent No.: US 10,360,605 B2
(45) Date of Patent: Jul. 23, 2019

(54) SERVER APPARATUS, INFORMATION PROVIDING METHOD, INFORMATION PROVIDING PROGRAM, RECORDING MEDIUM RECORDING THE INFORMATION PROVIDING PROGRAM, AND INFORMATION PROVIDING SYSTEM

(75) Inventor: Hisanori Yamahara, Tokyo (JP)

(73) Assignee: Rakuten, Inc., Tokyo (JP)

( * ) Notice: Subject to any disclaimer, the term of this patent is extended or adjusted under 35 U.S.C. 154(b) by 942 days.

(21) Appl. No.: 13/638,270

(22) PCT Filed: Mar. 28, 2011

(86) PCT No.: PCT/JP2011/057701
§ 371 (c)(1),
(2), (4) Date: Nov. 12, 2012

(87) PCT Pub. No.: WO2011/122583
PCT Pub. Date: Oct. 6, 2011

(65) Prior Publication Data
US 2013/0060843 A1 Mar. 7, 2013

(30) Foreign Application Priority Data

Mar. 29, 2010 (JP) ................... 2010-076164
Mar. 29, 2010 (JP) ................... 2010-076165

(51) Int. Cl.
*G06F 15/16* (2006.01)
*G06Q 30/06* (2012.01)
(Continued)

(52) U.S. Cl.
CPC ......... *G06Q 30/0603* (2013.01); *G06Q 10/10* (2013.01); *G06Q 30/02* (2013.01); *G06Q 30/06* (2013.01)

(58) Field of Classification Search
CPC ............. G06Q 30/02; G06F 17/30699; G06F 17/30646; G06F 17/30648;
(Continued)

(56) References Cited

U.S. PATENT DOCUMENTS 6,691,106 B1 * 2/2004 Sathyanarayan ... G06F 16/9535
8,631,029 B1 * 1/2014 Amacker .......... G06F 17/30554
707/766

(Continued)

FOREIGN PATENT DOCUMENTS

JP 10-301943 A 11/1998
JP 2003-178092 A 6/2003
(Continued)

OTHER PUBLICATIONS

Japanese Patent Office Action dated Nov. 13, 2012 for corresponding JP Application No. 2012-508323 and English-language translation thereof.
(Continued)

Primary Examiner — Vivek Srivastava
Assistant Examiner — Muhammad Raza
(74) Attorney, Agent, or Firm — Sughrue Mion, PLLC

(57) ABSTRACT

In providing information to a user, a server apparatus and the like which can preferentially display information in which the user is interested is provided. Degrees of interest of the user for targets corresponding to information displayed on a display unit are calculated based on details of operation of the user when the display unit displays the information, and information to be displayed is displayed by prioritizing the information of targets related to targets with high degrees of interest of the user.

16 Claims, 34 Drawing Sheets

| DEGREE OF INTEREST | PRODUCT | SPECIFIC PRODUCT LIST | RELATED KEYWORD |
|---|---|---|---|
| 7 | PRODUCT E | O | O |
| 6 | PRODUCT B | O | O |
| 5 | PRODUCT R | O | — |
| 3 | PRODUCT S | — | — |
| 2 | PRODUCT A | — | — |
| ⋮ | ⋮ | ⋮ | ⋮ |

(51) Int. Cl.
*G06Q 10/10* (2012.01)
*G06Q 30/02* (2012.01)

(58) Field of Classification Search
CPC ......... G06F 17/30675; G06F 17/30705; G06F 17/30899; G06F 17/30554; G06F 17/30867
See application file for complete search history.

(56) References Cited

U.S. PATENT DOCUMENTS

| | | | |
|---|---|---|---|
| 2005/0278321 A1* | 12/2005 | Vailaya | G06F 16/951 |
| 2007/0214154 A1* | 9/2007 | Ducatel | G06F 16/951 |
| 2007/0260597 A1* | 11/2007 | Cramer | G06Q 30/0244 |
| 2008/0033915 A1* | 2/2008 | Chen | G06F 16/951 |
| 2008/0077553 A1* | 3/2008 | Jambunathan | G06F 17/30867 |
| 2008/0301126 A1* | 12/2008 | Asai | G06F 17/30699 |
| 2009/0119254 A1* | 5/2009 | Cross | G06F 17/30867 |
| 2009/0119278 A1* | 5/2009 | Cross | G06F 16/951 |
| 2009/0282023 A1* | 11/2009 | Bennett | G06F 17/30646 |
| 2009/0307018 A1* | 12/2009 | Chappell et al. | 705/5 |
| 2010/0100417 A1* | 4/2010 | Nussel et al. | 705/10 |
| 2010/0174708 A1* | 7/2010 | Ball | G06F 16/9535 707/727 |
| 2010/0268710 A1* | 10/2010 | Strehl | G06F 16/3326 707/732 |
| 2011/0184925 A1* | 7/2011 | Muth | H04L 67/22 707/706 |
| 2011/0191333 A1* | 8/2011 | Gutlapalli | G06F 3/048 707/725 |

FOREIGN PATENT DOCUMENTS

| | | |
|---|---|---|
| JP | 2009140339 A | 6/2009 |
| WO | 2009/004930 A1 | 1/2009 |

OTHER PUBLICATIONS

International Search Report of PCT/JP2011/057701 dated Apr. 26, 2011.

\* cited by examiner

FIG.7A

PRODUCT DB 103

| PRODUCT ID |
| --- |
| SHOP ID |
| PRODUCT NAME |
| PRICE |
| EXPLANATORY INFORMATION OF PRODUCT |
| SALE START DATE/TIME |
| REVIEWS OF PRODUCT |
| THE NUMBER OF REVIEWS |
| TAG |
| RELATED PRODUCT ID |

FIG.7B

KEYWORD DB 104

| PRODUCT ID | KEYWORD | | | |
| --- | --- | --- | --- | --- |
| | 1 | 2 | 3 | ... |
| DC0001 | COMPANY A | 5 MILLION PIXELS | 10× ZOOM | ... |
| DC0002 | COMPANY B | 10 MILLION PIXELS | 5× ZOOM | ... |
| DC0003 | COMPANY A | 10 MILLION PIXELS | 10× ZOOM | ... |
| DC0004 | COMPANY C | 5 MILLION PIXELS | 5× ZOOM | ... |
| DC0005 | COMPANY D | 3× OPTICAL | FREE SHIPPING | ... |
| ⋮ | ⋮ | ⋮ | ⋮ | |

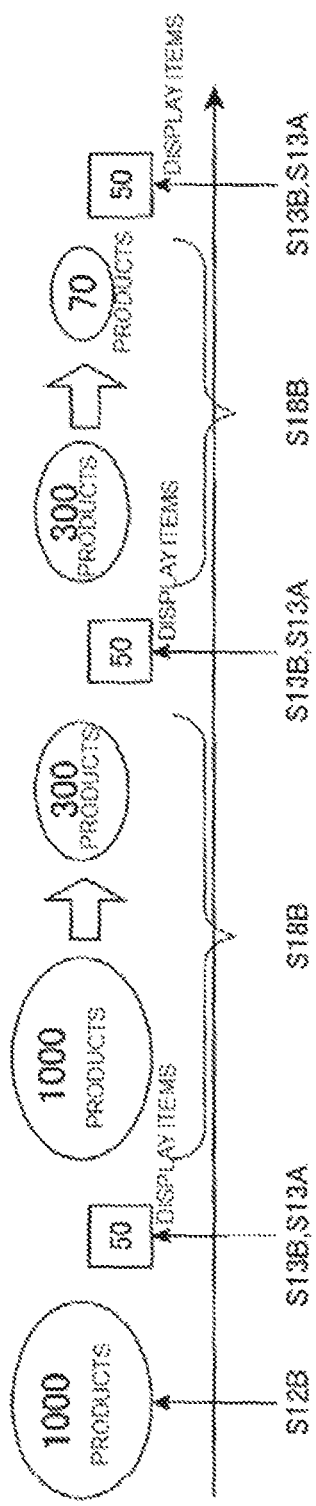
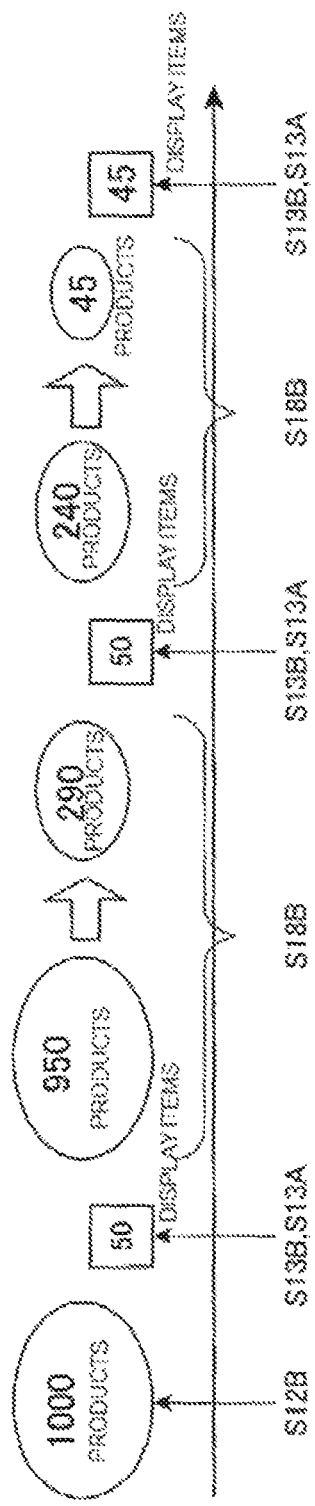

FIG.9

| PHOTO | MAKER | PRODUCT NAME | PRODUCT DESCRIPTION | PRICE | SHOP NAME |
|---|---|---|---|---|---|
| | xxxx | xxxxxxxxxx<br>REVIEWS(xx) | xxxxxxxx<br>xxxxxxxx | xxxxYEN | xxxxxxx |
| | xxxx | xxxxxxxxxx<br>REVIEWS(xx) | xxxxxxxx<br>xxxxxxxx | xxxxYEN | xxxxxxx |
| | xxxx | xxxxxxxxxx<br>REVIEWS(xx) | xxxxxxxx<br>xxxxxxxx | xxxxYEN | xxxxxxx |
| | xxxx | xxxxxxxxxx<br>REVIEWS(xx) | xxxxxxxx<br>xxxxxxxx | xxxxYEN | xxxxxxx |
| | xxxx | xxxxxxxxxx<br>REVIEWS(xx) | xxxxxxxx<br>xxxxxxxx | xxxxYEN | xxxxxxx |
| | xxxx | xxxxxxxxxx<br>REVIEWS(xx) | xxxxxxxx<br>xxxxxxxx | xxxxYEN | xxxxxxx |

SEARCH RESULTS OF KEYWORD "NOTEBOOK COMPUTER"
1 TO 50 (TOTAL 1000 RESULTS) [NEXT 1 2 3 4 5 6 7 8 9 10 ...]

FIG.12A

INITIAL

| PRODUCT ID | KEYWORD | | | ORDER OF DISPLAY |
|---|---|---|---|---|
| | 1 | 2 | 3 | |
| DC0001 | COMPANY A | 5 MILLION PIXELS | 10× ZOOM | 1 |
| DC0002 | COMPANY B | 10 MILLION PIXELS | 5× ZOOM | 2 |
| DC0003 | COMPANY A | 10 MILLION PIXELS | 5× ZOOM | 3 |
| DC0004 | COMPANY C | 5 MILLION PIXELS | 5× ZOOM | 4 |
| DC0005 | COMPANY D | 3× OPTICAL | FREE SHIPPING | 5 |
| DC0006 | COMPANY E | 3 MILLION PIXELS | 5× ZOOM | 6 |
| DC0007 | COMPANY C | 12 MILLION PIXELS | 12× ZOOM | 7 |
| DC0008 | COMPANY A | 5 MILLION PIXELS | 5× ZOOM | 8 |
| DC0009 | COMPANY D | 10 MILLION PIXELS | — | 9 |
| DC0010 | COMPANY F | 5 MILLION PIXELS | 5× ZOOM | 10 |
| DC0011 | COMPANY B | 12 MILLION PIXELS | 12× ZOOM | 11 |
| DC0012 | COMPANY F | 3 MILLION PIXELS | 12× ZOOM | 12 |
| DC0013 | COMPANY B | 10 MILLION PIXELS | 10× ZOOM | 13 |

FIG.12B

SORT (FIRST TIME)

| PRODUCT ID | KEYWORD | | | ORDER OF DISPLAY |
|---|---|---|---|---|
| | 1 | 2 | 3 | |
| DC0001 | COMPANY A | 5 MILLION PIXELS | 10× ZOOM | 1 |
| DC0008 | COMPANY A | 5 MILLION PIXELS | 5× ZOOM | 2 |
| DC0003 | COMPANY A | 10 MILLION PIXELS | 5× ZOOM | 3 |
| DC0004 | COMPANY C | 5 MILLION PIXELS | 5× ZOOM | 4 |
| DC0010 | COMPANY F | 5 MILLION PIXELS | 12× ZOOM | 5 |
| DC0013 | COMPANY B | 10 MILLION PIXELS | 10× ZOOM | 6 |
| DC0002 | COMPANY B | 10 MILLION PIXELS | 5× ZOOM | 7 |
| DC0005 | COMPANY D | 3× OPTICAL | FREE SHIPPING | 8 |
| DC0006 | COMPANY E | 3 MILLION PIXELS | 5× ZOOM | 9 |
| DC0007 | COMPANY C | 12 MILLION PIXELS | 12× ZOOM | 10 |
| DC0009 | COMPANY D | 10 MILLION PIXELS | — | 11 |
| DC0011 | COMPANY B | 12 MILLION PIXELS | 12× ZOOM | 12 |
| DC0012 | COMPANY F | 3 MILLION PIXELS | 5× ZOOM | 13 |

FIG.12C

SORT (SECOND TIME)

| PRODUCT ID | KEYWORD | | | ORDER OF DISPLAY |
|---|---|---|---|---|
| | 1 | 2 | 3 | |
| DC0001 | COMPANY A | 5 MILLION PIXELS | 10× ZOOM | 1 |
| DC0010 | COMPANY F | 5 MILLION PIXELS | 12× ZOOM | 2 |
| DC0008 | COMPANY A | 5 MILLION PIXELS | 5× ZOOM | 3 |
| DC0003 | COMPANY A | 10 MILLION PIXELS | 5× ZOOM | 4 |
| DC0004 | COMPANY C | 5 MILLION PIXELS | 5× ZOOM | 5 |
| DC0013 | COMPANY B | 10 MILLION PIXELS | 10× ZOOM | 6 |
| DC0007 | COMPANY C | 12 MILLION PIXELS | 12× ZOOM | 7 |
| DC0011 | COMPANY B | 12 MILLION PIXELS | 12× ZOOM | 8 |
| DC0012 | COMPANY F | 3 MILLION PIXELS | 5× ZOOM | 9 |
| DC0002 | COMPANY B | 10 MILLION PIXELS | 5× ZOOM | 10 |
| DC0005 | COMPANY D | 3× OPTICAL | FREE SHIPPING | 11 |
| DC0006 | COMPANY E | 3 MILLION PIXELS | 5× ZOOM | 12 |
| DC0009 | COMPANY D | 10 MILLION PIXELS | — | 13 |

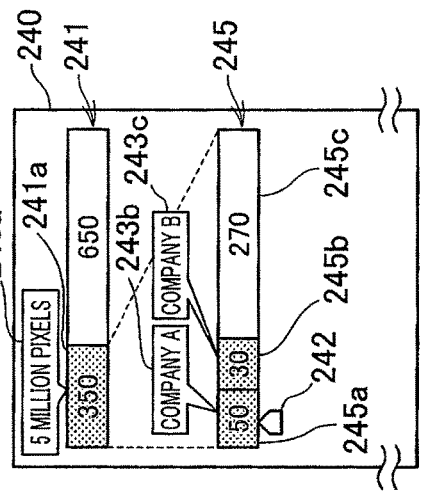
FIG.13A
FIG.13B
FIG.13C
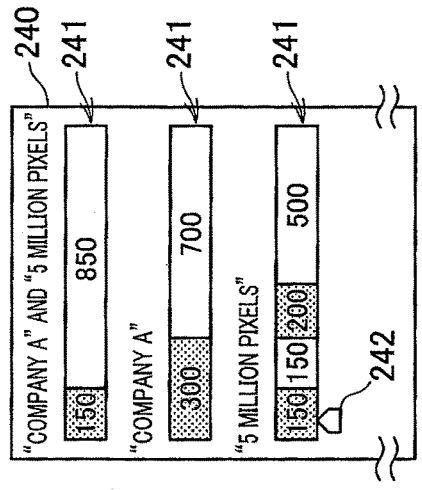
FIG.13D
FIG.13E
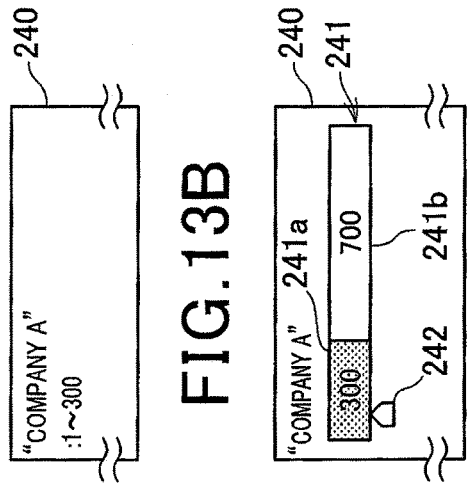
FIG.13F

FIG.14

| DEGREE OF INTEREST | PRODUCT | SPECIFIC PRODUCT LIST | RELATED KEYWORD |
|---|---|---|---|
| 7 | PRODUCT E | ○ | ○ |
| 6 | PRODUCT B | ○ | ○ |
| 5 | PRODUCT R | ○ | — |
| 3 | PRODUCT S | — | — |
| 2 | PRODUCT A | — | — |
| ⋮ | ⋮ | ⋮ | ⋮ |

FIG.31

WEB PAGE INFORMATION DB 107B

| WEB PAGE URL | TEXT | IMAGE | TAG | AUTHOR | RELATED WEB PAGE | KEYWORD | | | |
|---|---|---|---|---|---|---|---|---|---|
| | | | | | | 1 | 2 | 3 | ... |

FIG.33

| PRODUCT ID | ATTRIBUTE INFORMATION ||||||||||
| | MAKER |||| THE NUMBER OF PIXELS |||||
| | COMPANY A | COMPANY B | COMPANY C | COMPANY D | Etc. | ~3 MILLION | ~5 MILLION | ~10 MILLION | ~15 MILLION | MORE | ⋮ |
|---|---|---|---|---|---|---|---|---|---|---|---|
| DC0001 | ○ | | | | | | ○ | | | | ⋮ |
| DC0002 | | ○ | | | | | | | ○ | | ⋮ |
| DC0003 | ○ | | ○ | | | | | ○ | | | ⋮ |
| DC0004 | | | | | ○ | ○ | ○ | | | | ⋮ |
| DC0005 | | | | | | | | | | ○ | ⋮ |
| ⋮ | ⋯ | ⋯ | ⋯ | ⋯ | ⋯ | ⋯ | ⋯ | ⋯ | ⋯ | ⋯ | ⋮ |

FIG.34

| PRODUCT ID | ATTRIBUTE INFORMATION | | | | | | | | |
|---|---|---|---|---|---|---|---|---|---|
| | MAKER | | | | | THE NUMBER OF PIXELS | | | |
| | COMPANY A | COMPANY B | COMPANY C | COMPANY D | Etc. | ~3 MILLION | ~5 MILLION | ~10 MILLION | ~15 MILLION | MORE |
| DC0001 | ○ | | | | | | ○ | | | |
| DC0002 | | ○ | | | | | | ○ | | |
| DC0003 | ○ | | | | | | | | ○ | |
| DC0004 | | | ○ | | ○ | ○ | ○ | | | |
| DC0005 | | | | | | | | | | ○ |

SERVER APPARATUS, INFORMATION PROVIDING METHOD, INFORMATION PROVIDING PROGRAM, RECORDING MEDIUM RECORDING THE INFORMATION PROVIDING PROGRAM, AND INFORMATION PROVIDING SYSTEM

CROSS REFERENCE TO RELATED APPLICATIONS

This application is a National Stage of International Application No. PCT/JP2011/057701 filed Mar. 28, 2011, claiming priority based on Japanese Patent Application Nos. 2010-076165 filed Mar. 29, 2010 and JP 2010-076164 filed Mar. 29, 2010, the contents of all of which are incorporated herein by reference in their entirety.

TECHNICAL FIELD

The present invention relates to a technical field of a server apparatus and the like that provide information to a user.

BACKGROUND ART

Conventionally, a search site is known, in which keywords and the like are set in advance for various pieces of information on the Internet, and the corresponding information is extracted and provided based on keywords input for search and based on the set keywords. According to the search site, the user can search various pieces of information on the Internet and can input keywords related to interesting information to search the information to acquire information corresponding to the input keywords.

Meanwhile, Patent Literature 1 discloses a technique of managing image data to be searched in association with the number of searches (the number of votes) for the image data, searching image data corresponding to search conditions set by the user, and sorting and displaying the searched image data based on the number of searches (the number of votes).

Such a technique is useful for efficiently browsing information estimated to have a high degree of interest for a plurality of users, among a large amount of search results.

PRIOR ART LITERATURE

Patent Literature

Patent Literature 1: Japanese Patent Laid-Open No. 10-301943

SUMMARY OF THE INVENTION

Problem to be Solved by the Invention

Some users desire to extract or preferentially browse only an appropriate amount of interesting information from a large amount of information on the Internet. However, in the conventional technique described above, it may be difficult for each user to appropriately set the search conditions (for example, keywords related to interesting information not recognized by the user at the search) for extracting or preferentially displaying interesting information.

The present invention has been made in view of the foregoing, and an object of the present invention is to provide a server apparatus, an information providing method, an information providing program, a recording medium recording the information providing program, and an information providing system that can preferentially display information the user is interested in.

Means for Solving the Problem

In order to solve the above problem, the invention according to claim 1 is a server apparatus comprising:
a first display data generation means that generates first display data by referring to a storage means that stores information of targets that can be recognized by a user;
a first transmission means that transmits the generated first display data to a terminal apparatus;
a reception means that receives, from the terminal apparatus, user operation information for the first display data displayed on the terminal apparatus;
a calculation means that calculates degrees of interest of the user for the targets corresponding to information displayed by the first display data based on the received user operation information;
a specifying means that specifies a target for which the calculated degree of interest of the user satisfies a predetermined condition;
a second display data generation means that generates second display data by prioritizing another target with information including at least part of the information of the specified target; and
a second transmission means that transmits the generated second display data to the terminal apparatus.

According to the invention, the degrees of interest of the user for the targets corresponding to the information displayed by the terminal apparatus are calculated based on the user operation information, and the other target with information including at least part of the information of the target with the degree of interest of the user satisfying the predetermined condition can be preferentially displayed. Therefore, the information the user is interested in can be preferentially displayed without imposing a burden on the user in providing the information to the user.

The invention according to claim 2 is the server apparatus according to claim 1,
wherein the second display data generation means narrows down the information of the targets included in the first display data based on at least part of the information of the specified target to generate the second display data including the information of the narrowed-down targets.

According to the invention, the degrees of interest of the user for the targets corresponding to the information displayed by the terminal apparatus are calculated based on the user operation information, and the information can be displayed by narrowing down the targets to the other target with information including at least part of the information of the target with the degree of interest of the user satisfying the predetermined condition can be preferentially displayed. Therefore, the product information can be displayed by narrowing down the product information to the product information the user is interested in, without imposing a burden on the user in providing information to the user.

The invention according to claim 3 is the server apparatus according to claim 1,
wherein the second display data generation means sorts an order of display of the information of the targets included in the first display data based on at least part of the information of the specified target to generate the second display data.

According to the invention, the degrees of interest of the user for the targets corresponding to the information displayed by the terminal apparatus are calculated based on the user operation information, and the display of the other target with information including at least part of the information of the target with the degree of interest of the user satisfying the predetermined condition can be prioritized. Therefore, the information the user is interested in can be preferentially displayed without imposing a burden on the user in providing the information to the user.

The invention according to claim 4 is the server apparatus according to claim 1, wherein the second display data generation means determines a display mode of the information of the targets included in the first display data based on at least part of the information of the specified target to generate the second display data based on the determined display mode.

According to the invention, the degrees of interest of the user for the targets corresponding to the information displayed by the terminal apparatus are calculated based on the user operation information, and a display mode of the other target with information including at least part of the information of the target with the degree of interest of the user satisfying the predetermined condition is determined. Therefore, the information the user is interested in can be preferentially displayed without imposing a burden on the user in providing the information to the user.

The invention according to claim 5 is the server apparatus according to any one of claims 1 to 4, wherein the specifying means specifies a target with the calculated degree of interest higher than a predetermined threshold, and the second display data generation means generates the second display data by prioritizing another target with information including at least part of the information of the specified target.

According to the invention, the degrees of interest of the user for the targets corresponding to the information displayed by the terminal apparatus are calculated based on the user operation information, and the other target with information including at least part of the information of the target with the degree of interest of the user higher than the predetermined threshold can be preferentially displayed.

The invention according to claim 6 is the server apparatus according to any one of claims 1 to 4, wherein the specifying means specifies a target with the calculated degree of interest lower than a predetermined threshold, and the second display data generation means generates the second display data by prioritizing a target other than another target with information including at least part of the information of the specified target.

According to the invention, the degrees of interest of the user for the targets corresponding to the information displayed by the terminal apparatus are calculated based on the user operation information, and the target other than the other target with information including at least part of the information of the target with the degree of interest of the user lower than the predetermined threshold can be preferentially displayed.

The invention according to claim 7 is the server apparatus according to any one of claims 1 to 4, wherein when the calculation means calculates the degrees of interest of the user for two or more targets, the specifying means compares the calculated degrees of interest to specify a target with a higher degree of interest of the user, and the second display data generation means generates the second display data by prioritizing the specified target.

According to the invention, the degrees of interest of the user for the targets corresponding to the information displayed by the terminal apparatus are calculated based on the user operation information, and the other target with information including at least part of the information of the target with relatively high degree of interest of the user can be preferentially displayed.

The invention according to claim 8 is the server apparatus according to any one of claims 1 to 7, wherein the first display data further includes link information for displaying related information of the targets, the reception means receives user operation information including details of operation of the user for the link information, and the calculation means calculates the degree of interest of the user for a target corresponding to the link information to be operated based on the received user operation information.

According to the invention, the degrees of interest of the user for the information provided to the user can be calculated based on the number of operations for the link information.

The invention according to claim 9 is the server apparatus according to any one of claims 1 to 7, wherein the reception means receives display time of the information of the displayed targets based on user operation for the first display data, and the calculation means calculates the degrees of interest of the user for the displayed targets based on the received display time.

According to the invention, the degrees of interest of the user can be calculated based on the display time of the display of the information of the targets by the user.

The invention according to claim 10 is the server apparatus according to any one of claims 1 to 9, wherein the first display data displays information of the targets in units of a predetermined number of pieces, and the reception means receives, from the terminal apparatus, an acquisition request of a next predetermined number of pieces of information and the user operation information including the details of the operation of the user for the first display data displayed on the terminal apparatus.

According to the invention, information provided to the user is displayed in units of a predetermined number of pieces, and in the predetermined number of pieces of information displayed next, the other target with information including at least part of the information of the target the user is highly interested in is preferentially displayed. More specifically, the user can check the predetermined number of pieces of information in each page, and if there is an interesting product in the targets corresponding to the displayed information, the user can preferentially check the information of the targets related to the interesting target in the next predetermined number of pieces of information.

The invention according to claim 11 is the server apparatus according to any one of claims 1 to 10, wherein the second display data generation means generates second display data excluding the targets with the information already displayed by the first display data.

According to the invention, the information already checked by the user is not displayed. Therefore, the user does not have to check the already checked information again, and the burden of the user can be reduced.

The invention according to claim 12 is the server apparatus according to any one of claims 1 to 11, further comprising:

a keyword generation means that acquires keywords from the information of the targets based on the user operation information for the first display data displayed on the terminal apparatus to store the keywords in the storage means in association with the information of the targets, wherein the second display data generation means generates the second display data by prioritizing another target with information including the keywords associated with the information of the specified target.

According to the invention, the degrees of interest of the user for the targets corresponding to the information displayed by the terminal apparatus are calculated based on the user operation information, and the other target with information including the keywords associated with the information of the target with the degree of interest of the user satisfying the predetermined condition can be preferentially displayed.

The invention according to claim 13 is an information providing method by a server apparatus, the information providing method comprising:

a first display data generation step of generating first display data by referring to a storage means that stores information of targets that can be recognized by a user;

a first transmission step of transmitting the generated first display data to a terminal apparatus;

a reception step of receiving, from the terminal apparatus, user operation information for the first display data displayed on the terminal apparatus;

a calculation step of calculating degrees of interest of the user for the targets corresponding to information displayed by the first display data based on the received user operation information;

a specifying step of specifying a target for which the calculated degree of interest of the user satisfies a predetermined condition;

a second display data generation step of generating second display data by prioritizing another target with information including at least part of the information of the specified target; and a second transmission step of transmitting the generated second display data to the terminal apparatus.

The invention according to claim 14 is an information providing program causing a computer to function as:

a first display data generation means that generates first display data by referring to a storage means that stores information of targets that can be recognized by a user;

a first transmission means that transmits the generated first display data to a terminal apparatus;

a reception means that receives, from the terminal apparatus, user operation information for the first display data displayed on the terminal apparatus;

a calculation means that calculates degrees of interest of the user for the targets corresponding to information displayed by the first display data based on the received user operation information;

a specifying means that specifies a target for which the calculated degree of interest of the user satisfies a predetermined condition;

a second display data generation means that generates second display data by prioritizing another target with information including at least part of the information of the specified target; and a second transmission means that transmits the generated second display data to the terminal apparatus.

The invention according to claim 15 is a recording medium recording a computer-readable information providing program for causing a computer to function as:

a first display data generation means that generates first display data by referring to a storage means that stores information of targets that can be recognized by a user;

a first transmission means that transmits the generated first display data to a terminal apparatus;

a reception means that receives, from the terminal apparatus, user operation information for the first display data displayed on the terminal apparatus;

a calculation means that calculates degrees of interest of the user for the targets corresponding to information displayed by the first display data based on the received user operation information;

a specifying means that specifies a target for which the calculated degree of interest of the user satisfies a predetermined condition;

a second display data generation means that generates second display data by prioritizing another target with information including at least part of the information of the specified target; and a second transmission means that transmits the generated second display data to the terminal apparatus.

The invention according to claim 16 is an information providing system comprising: a terminal apparatus; and a server apparatus that can be accessed by the terminal apparatus through a network, the server apparatus comprising:

a first display data generation means that generates first display data by referring to a storage means that stores information of targets that can be recognized by a user;

a first transmission means that transmits the generated first display data to a terminal apparatus;

a reception means that receives, from the terminal apparatus, user operation information for the first display data displayed on the terminal apparatus;

a calculation means that calculates degrees of interest of the user for the targets corresponding to information displayed by the first display data based on the received user operation information;

a specifying means that specifies a target for which the calculated degree of interest of the user satisfies a predetermined condition;

a second display data generation means that generates second display data by prioritizing another target with information including at least part of the information of the specified target; and a second transmission means that transmits the generated second display data to the terminal apparatus, the terminal apparatus comprising:

a first reception means that receives the first display data transmitted by the first transmission means;

a first display control means that causes a display unit to display the first display data received by the first reception means;

a transmission means that transmits, to the server apparatus, the user operation information for the first display data displayed on the display unit;

a second reception means that receives the second display data transmitted by the second transmission means; and a second display control means that causes the display unit to display the second display data received by the second reception means.

Advantageous Effects of Invention

According to the invention, the degrees of interest of the user for the targets corresponding to the information displayed by the terminal apparatus are calculated based on the user operation information, and the other target with information including at least part of the information of the target with the degree of interest of the user satisfying the predetermined condition can be preferentially displayed. Therefore, the information the user is interested in can be preferentially displayed without imposing a burden on the user in providing the information to the user.

BRIEF DESCRIPTION OF DRAWINGS

FIG. 7A is a diagram showing an example of content registered in a product DB 103.

FIG. 7B is a diagram showing an example of content registered in a keyword DB 104.

FIG. 8A and FIG. 8B are conceptual diagrams showing an example of narrowing down corresponding products obtained as search results according to degrees of interest of a user.

FIG. 9 is a diagram showing a screen display example of a search result page of a user terminal 2 according to the first embodiment.

FIG. 12A to FIG. 12C are diagrams showing an example of content registered in the keyword DB 104.

FIG. 13A to FIG. 13F are diagrams showing display examples of a sort result display area 240.

FIG. 14 is a diagram used for describing an order of display in displaying narrowed-down corresponding products.

FIG. 31 is a diagram showing an example of content stored in a storage unit 15B of a search server 1B according to a fifth embodiment.

FIG. 33 is a diagram showing an example of content registered in an attribute information DB.

FIG. 34 is a diagram showing an example of content registered in the attribute information DB.

MODE FOR CARRYING OUT THE INVENTION

1. First Embodiment

A first embodiment of the present invention will now be described in detail with reference to the drawings. The embodiment described below is an embodiment in which the present invention is applied to a shopping system for trading products by exchanging electronic information on a network.

[1.1. Summary of Configuration and Functions of Shopping System]

First, a configuration and general functions of a shopping system S according to a first embodiment will be described with reference to FIG. 1.

Figure 1:
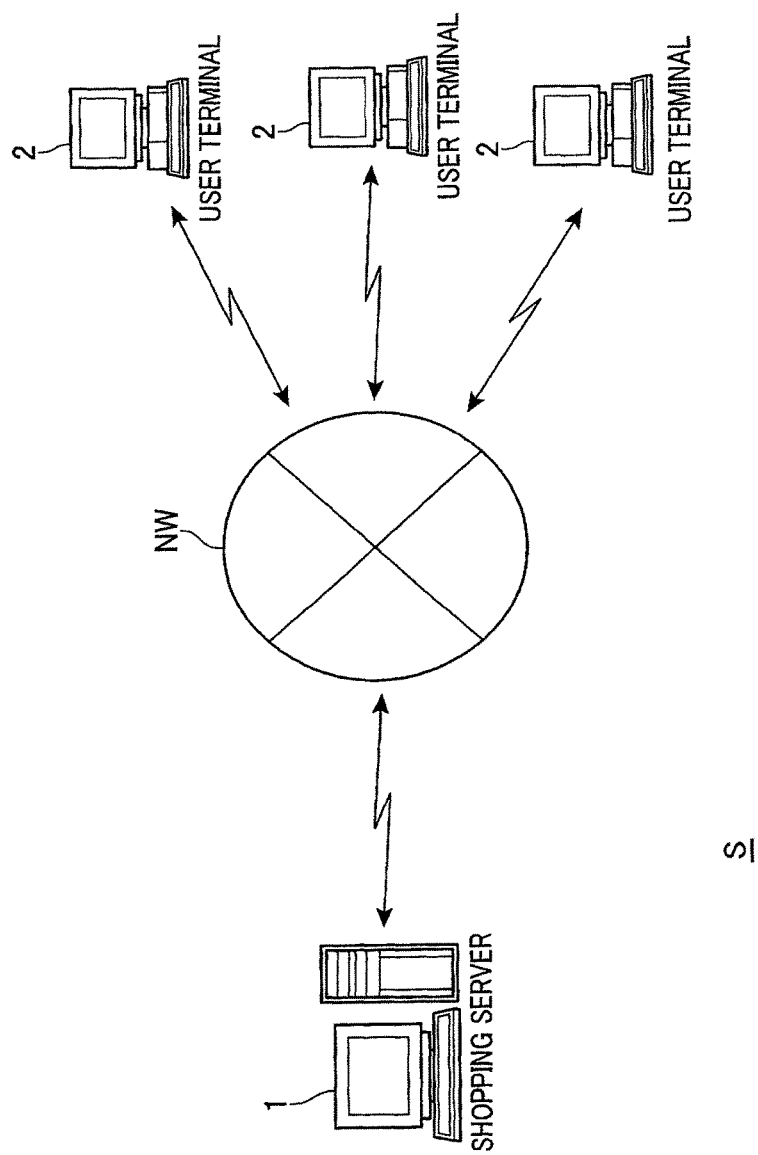
FIG. 1 is a diagram showing an example of a general configuration of a shopping system S according to a first embodiment.

FIG. 1 is a diagram showing an example of a general configuration of the shopping system S according to the first embodiment.

As shown in FIG. 1, the shopping system S (example of "information providing system") includes a shopping server 1 (example of "server apparatus") and a plurality of user terminals 2 (example of "terminal apparatus"). The shopping server 1 and the user terminals 2 can use, for example, a TCP/IP as a communication protocol to mutually transmit and receive data through a network NW. The network NW is constructed by, for example, the Internet, a dedicated communication line (for example, CATV (Community Antenna Television) line), a mobile communication network (including a base station and the like), and a gateway.

In the shopping system S with the configuration, the shopping server 1 is a Web server that transmits Web pages included in a shopping site to the user terminals 2 in response to requests from the user terminals 2. The shopping server 1 executes processes of searching or purchasing products based on requests from the user terminals 2 of users who have browsed the Web pages.

The user terminals 2 are terminal apparatuses used by the users who purchase products on the shopping site. Examples of the user terminals 2 include personal computers, PDAs (Personal Digital Assistants), and cell phones.

[1.2. Configuration of Shopping Server]

A configuration of the shopping server 1 will be described with reference to FIG. 2 and the like.

Figure 2:
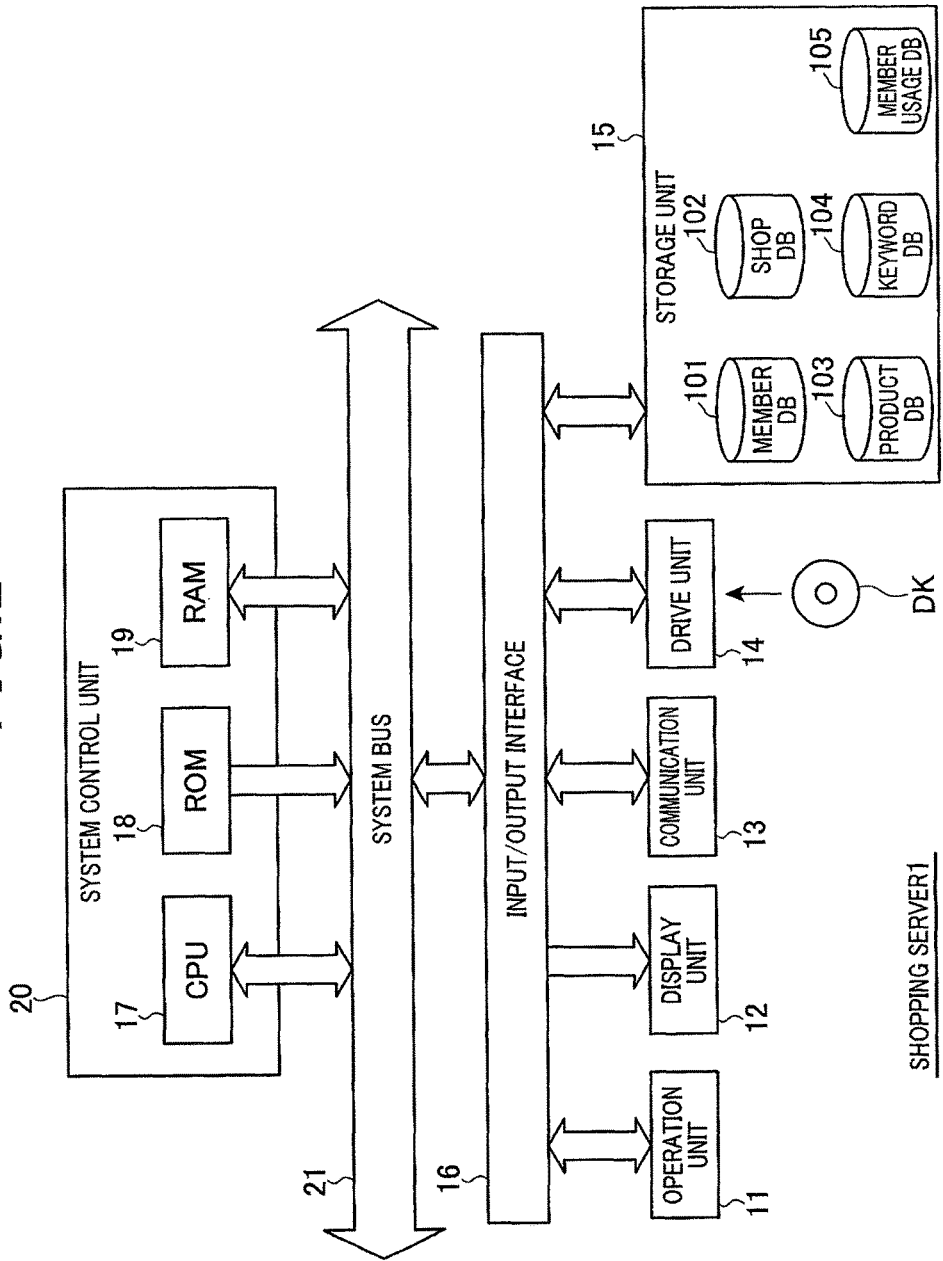
FIG. 2 is a block diagram showing an example of a general configuration of a shopping server 1 according to the first embodiment.

FIG. 2 is a block diagram showing an example of a general configuration of the shopping server 1 according to the first embodiment.

As shown in FIG. 2, the shopping server 1 includes an operation unit 11, a display unit 12, a communication unit 13, a drive unit 14, a storage unit 15, an input/output interface 16, and a system control unit 20. The system control unit 20 and the input/output interface 16 are connected through a system bus 21.

The operation unit 11 includes, for example, a keyboard and a mouse and is configured to receive an operation instruction from an operator or the like to output details of the instruction to the system control unit 20 as an instruction signal.

The display unit 12 includes, for example, a CRT (Cathode Ray Tube) display or a liquid crystal display, and is configured to display information of characters, images, and the like.

The communication unit 13 is configured to connect to the network NW or the like to control a state of communication with the user terminals 2 and the like.

The drive unit 14 is configured to read data and the like from a disk DK, such as a flexible disk, a CD (Compact Disc), and a DVD (Digital Versatile Disc), and to record data and the like in the disk DK.

The storage unit 15 (example of "storage means") includes, for example, a hard disk drive, and is configured to store various programs, data, and the like. Various databases are constructed in the storage unit 15, such as a member DB (database) 101, a shop DB 102, a product DB 103, a keyword DB 104, and a member usage DB 105.

In the member DB 101, information related to the users registered as members of the shopping site (for example, member IDs as identification information of the members, passwords, names, addresses, phone numbers, and email addresses) is registered in association with each user.

In the shop DB 102, information related to the shops that sell products on the shopping site (for example, shop IDs as identification information of the shops, passwords, names of the shops, addresses, phone numbers, email addresses, and guidance information of the shops) is registered in association with each shop.

As shown in FIG. 7A, product information (example of "information of targets") related to products (example of "targets that can be recognized by a user") sold in the shopping site, such as product IDs as identification information of the products, shop IDs of the shops that sell the products, product names, prices, explanatory information of the products, images related to the products, sale start date/time, reviews of the products, the numbers of reviews, tag information (for example, metadata), and related product IDs), is registered in the product DB 103 in association with each shop and product. A product ID of a product related to the product identified by the product ID or a product ID of the same product handled by another shop is registered for the related product ID.

As shown in FIG. 7B, keywords (example of "information of targets") related to the products sold in the shopping site are registered in the keyword DB 104 in association with each product ID. Words indicating manufacturer (producer) names of the products, performances (effects) of the products, and the like are registered as the keywords related to the products. For example, words indicating maker names, OS (Operating System) names, hard disk capacities, memory capacities, colors, and screen sizes are registered as the keywords related to products "notebook computers". Words indicating each shop name, the price of the product at each shop, the shipping cost at each shop, and the like may be registered as the keywords for each product ID and each shop ID. Words frequently used in the reviews of the products registered in the product DB 103 may be registered as the keywords. If a product is covered by mass media, words indicating the media names that have covered the product may be registered as the keywords. Although the product DB 103 and the keyword DB 104 are separated in the present embodiment, a DB integrating the product DB 103 and the keyword DB 104 based on the product ID may also be used.

In the member usage DB 105, information of the user related to the usage of the shopping site (for example, information of member ID, purchase history, browsing history, and favorite product) is registered for each user.

The storage unit 15 stores various HTML (Hyper Text Markup Language) documents, image data, audio data, text data, and the like that form the Web pages of the shopping site.

The storage unit 15 further stores various programs. Specifically, a predetermined OS, a WWW (World Wide Web) server program, a shopping process program, and the like are stored. For example, the various programs may be acquired from another server apparatus or the like through the network NW or may be recorded in the disk DK, such as a CD-ROM, to be read through the drive unit 14.

The CPU 17 reads and executes the various programs stored in the ROM 18 or the storage unit 15, and in this way, the system control unit 20 controls the components of the shopping server 1. The system control unit 20 is configured to function as a first display data generation means, a first transmission means, a reception means, a calculation means, a specifying means, a second display data generation means, and a second transmission means of the server apparatus according to the present invention.

The shopping server 1 may include a plurality of server apparatuses, such as a server that manages various databases, a search processing server that executes a search process of a product, and a WWW server that provides various pieces of information.

[1.3. Configuration of User Terminal 2]

A configuration of the user terminal 2 will be described with reference to FIG. 3.

Figure 3:
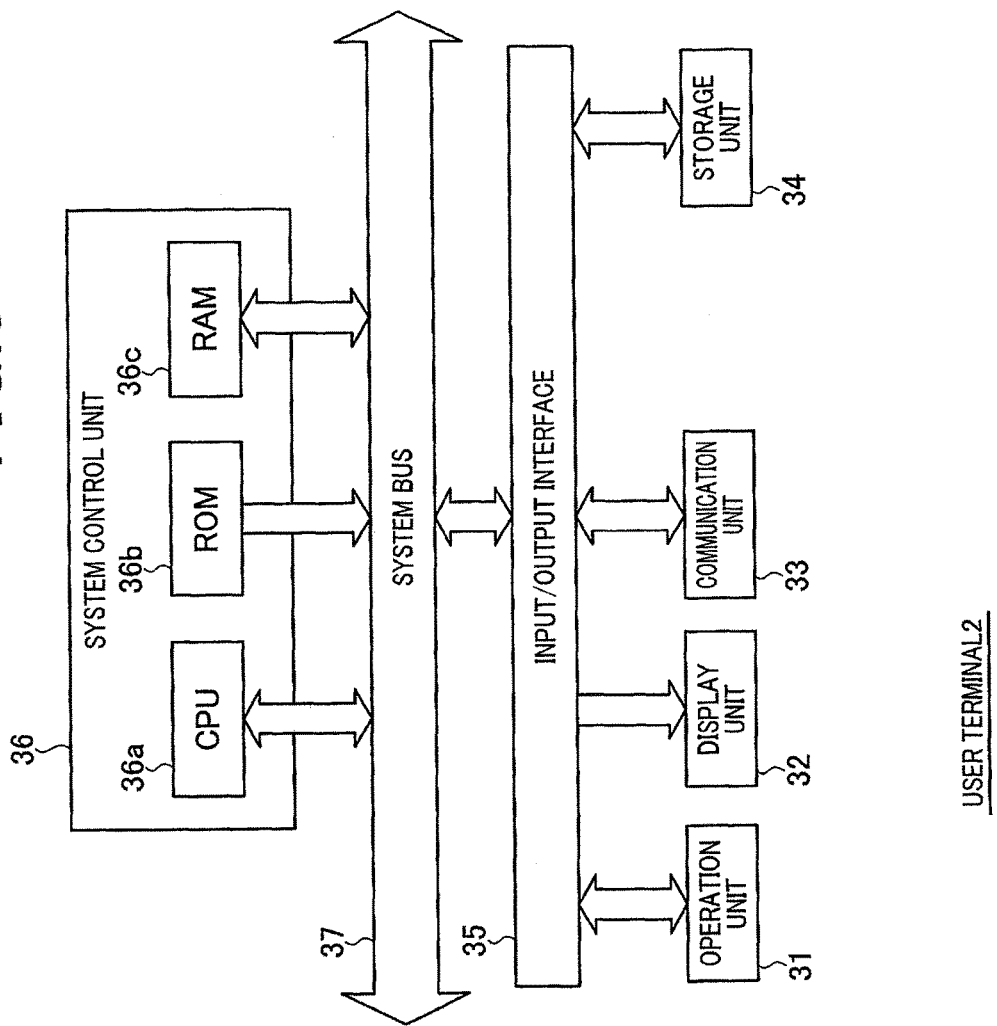
FIG. 3 is a block diagram showing an example of a general configuration of a user terminal 2 according to the first embodiment.

As shown in FIG. 3, the user terminal 2 includes an operation unit 31, a display unit 32, a communication unit 33, a storage unit 34, an input/output interface 35, and a system control unit 36. The system control unit 36 and the input/output interface 35 are connected through a system bus 37.

The operation unit 31, the display unit 32, the communication unit 33, and the storage unit 34 correspond to the operation unit 11, the display unit 12, the communication unit 13, and the storage unit 15 of the shopping server 1, respectively. Therefore, overlapping parts will not be described.

The input/output interface 35 is configured to execute interface processing between the units (the operation unit 31, the display unit 32, the communication unit 33, and the storage unit 34) and the system control unit 36.

The system control unit 36 includes a CPU 36a, a ROM 36b, a RAM 36c, and the like. The CPU 36a reads and executes various software programs stored in the ROM 36b or the storage unit 34, and in this way, the system control unit 36 functions as a first reception means, a first display control means, a transmission means, a second reception means, a second display control means, and the like of the terminal apparatus according to the present invention.

[1.4. Display of Search Results]

A display mode of search results when a product is searched in the shopping system S will be described with reference to FIG. 4.

When a product is searched, the shopping server 1 transmits, to the user terminal 2, search results that are Web pages indicating a list of information (example of "information") related to products (example of "targets") satisfying search conditions input by the user. The Web pages will be called "search result pages". FIG. 4 is a diagram showing a screen display example when the search result pages of the user terminal 2 are displayed. The products satisfying the search conditions input by the user will be called "corresponding products". Information related to the products may be simply called "product information".

Figure 4:
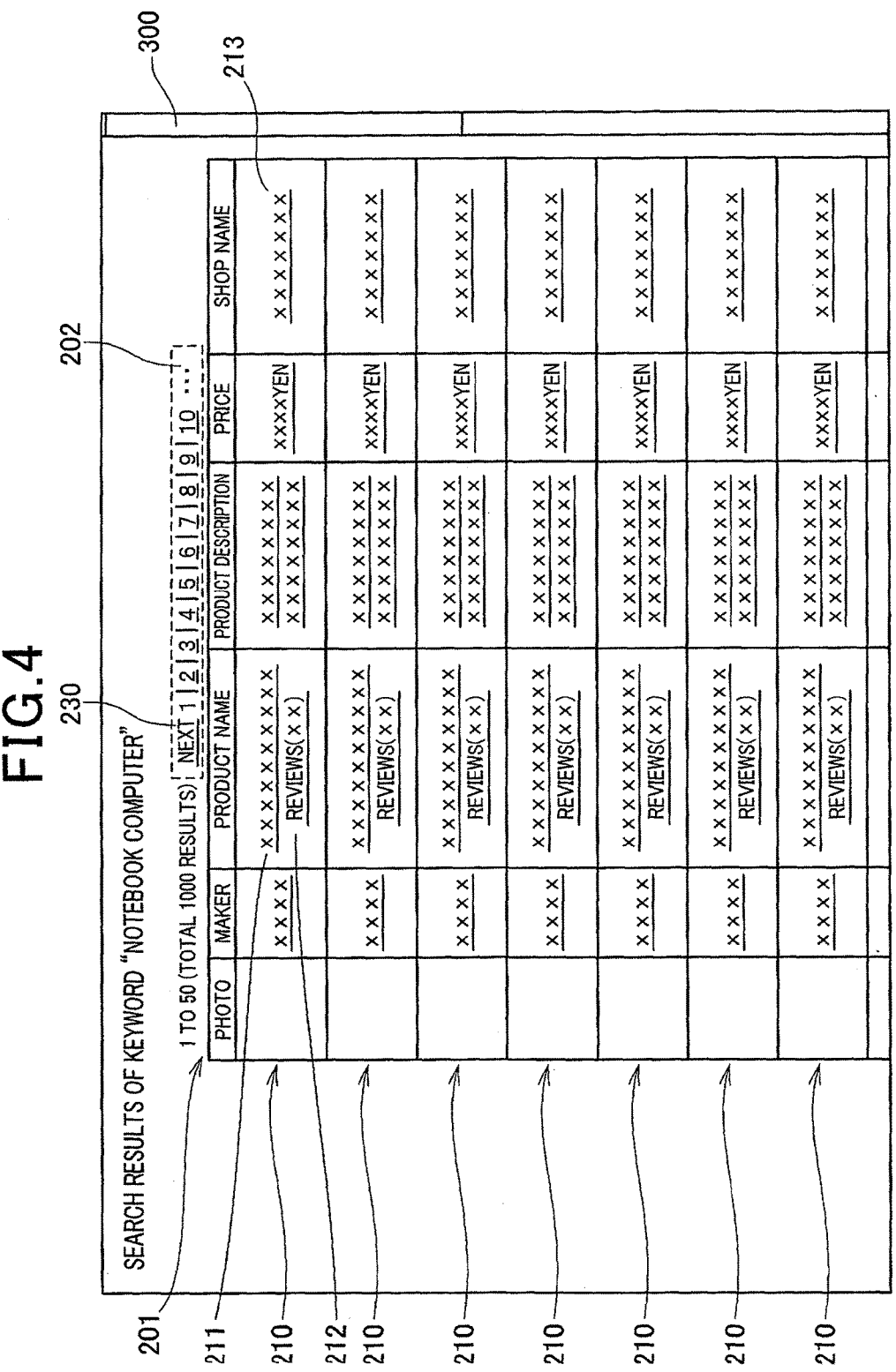
FIG. 4 is a diagram showing a screen display example of a search result page of a user terminal 2 according to the first embodiment.

As shown in FIG. 4, a corresponding product list 201, an other search result link group 202, and the like are displayed on the search result pages.

The corresponding product list 201 displays a list of the corresponding products satisfying the search conditions. Specifically, the corresponding product list 201 includes a plurality of pieces of individual product information 210. The individual product information 210 indicates production information of one corresponding product. The individual product information 210 includes an image of the product, a maker, a product link 211, a review link 212, a product description, a price of the product, and a shop link 213. The product link 211 is a link (hyperlink) displaying the name of the product, the URL, and the like corresponding to the link. The review link 212 is a link displaying the number of reviews of the product registered by the users who have purchased the product corresponding to the link. The shop link 213 is a link displaying details of the shop selling the product corresponding to the link.

The number of corresponding products displayed on the corresponding product list 201 will be called "the number of display items". An initial value of the number of display items (50 in the present embodiment) is predetermined in the shopping system S. The initial value of the number of display items can also be changed by user setting.

When the user selects (for example, clicks) the product link 211, the page is switched to a Web page for displaying detail information of the product corresponding to the link. The Web page will be called a "product detail page". The product detail page displays product information, such as the product name, image related to the product, description of the product, price of the product, settlement method, shipping cost, shipping method, and contact information.

When the user selects the review link 212, the page is switched to a Web page for displaying reviews of the product corresponding to the link. The Web page will be called a "review detail page". The review detail page displays product information, such as the nickname of the person who has posted the review, evaluation value, date of the post, and review sentences.

When the user selects the shop link 213, the page is switched to a Web page for displaying detail information of the shop selling the product corresponding to the link. The Web page will be called a "shop detail page". The shop detail page displays product information related to products, such as the name of the shop, guidance information of the shop, links to product detail pages of the products sold by the shop, settlement method, shipping cost, and shipping method. The product link 211, the review link 212, and the shop link 213 are examples of "link information".

The product detail page, the review detail page, and the shop detail page are generated by the shopping server 1 based on the information registered in the shop DB 102 and the product DB 103 and are stored in the storage unit 15.

The product detail page, the review detail page, and the shop detail page will be collectively called "detail pages". The detail pages are Web pages for displaying information related to one or more products among the products displayed on the corresponding product list 201 and are Web pages for displaying one or more pieces of information not displayed in the individual product information 210. The detail pages also include a plurality of links (example of "link information") for displaying further detailed information.

The other search result link group 202 includes a plurality of links for switching to search result pages displaying lists of products different from the products displayed as a list on the current corresponding product list 201 among the corresponding products satisfying the search conditions. For example, when the user selects a link displaying a page number, the page is switched to the search result page with the page number corresponding to the link. When the user selects a next result link 230 indicated "Next", the page is switched to the next search result page of the currently displayed search result page. For example, if the next result link 230 is selected when a list of 1st to 50th corresponding products are currently displayed, the page is switched to a search result page for displaying a list of 51st and subsequent corresponding products. In this way, a predetermined number of corresponding products are displayed on each page.

If the entire search result page cannot be displayed on one screen, a scroll bar 300 is displayed on the screen of the user terminal 2. When the scroll bar 300 is operated, scroll display of the search result page is presented.

In the search result pages, each piece of the individual product information 210 of the corresponding product list 201 displays the image of the product, the product name, the number of reviews, the price, and the shop name. When the user finds an interesting product while browsing the search result pages, the user can click the product link 211, the review link 212, or the shop link 213 to obtain the production information from each detail page.

If the corresponding products displayed on the search result pages can be displayed by narrowing down the corresponding products to products related to the product the user is interested in, the burden of the user in browsing can be reduced. Particularly, when the corresponding products obtained as the search results include a large amount of products the user is not interested in, the burden of browsing can be significantly reduced. Therefore, the shopping system S of the present embodiment specifies the product the user is interested in based on details of the operation when the user is browsing the search result pages. The corresponding products to be displayed on the search result pages are displayed by narrowing down the corresponding products to products related to the specified product.

To realize this, the shopping system S records the details of the operation when the user is browsing the search result pages. Specifically, the type of the operation by the user (for example, click operation or drag operation), the target of the operation (for example, the product link 211), the time of the operation, and the like are recorded. The time here may not necessarily be the actual time, but the time can be an elapsed time from a reference time, in which time of predetermined control (for example, time of display of the search result pages or time of display (or update) of the corresponding product list 201) serves as a reference (0 second). More specifically, based on the recorded details of operation, the shopping system S can determine when, for what, and what kind of operation the user has performed, or when the user was not performing the operation. Examples of the operations performed by the user include an operation of using the mouse, the keyboard, or the like to select (for example, click) the link of the product link 211, the review link 212, the shop link 213, or the other search result link group 202 and an operation of changing the position of the scroll bar 300. The recorded details of operation are limited to operation related to the shopping system S. For example, an operation performed by the user to operate spreadsheet application software is not recorded.

The fact that there is an operation for a product displayed on the list can mean that the user at least has an interest in the operated product. On the other hand, the fact that there is no operation for a product displayed on the list can mean that the user has no interest in the product. Therefore, the shopping system S specifies the product the user is interested in based on the details of the operation of the user when the search result pages are displayed.

[1.5. Operation of Shopping System S]

Figure 5:
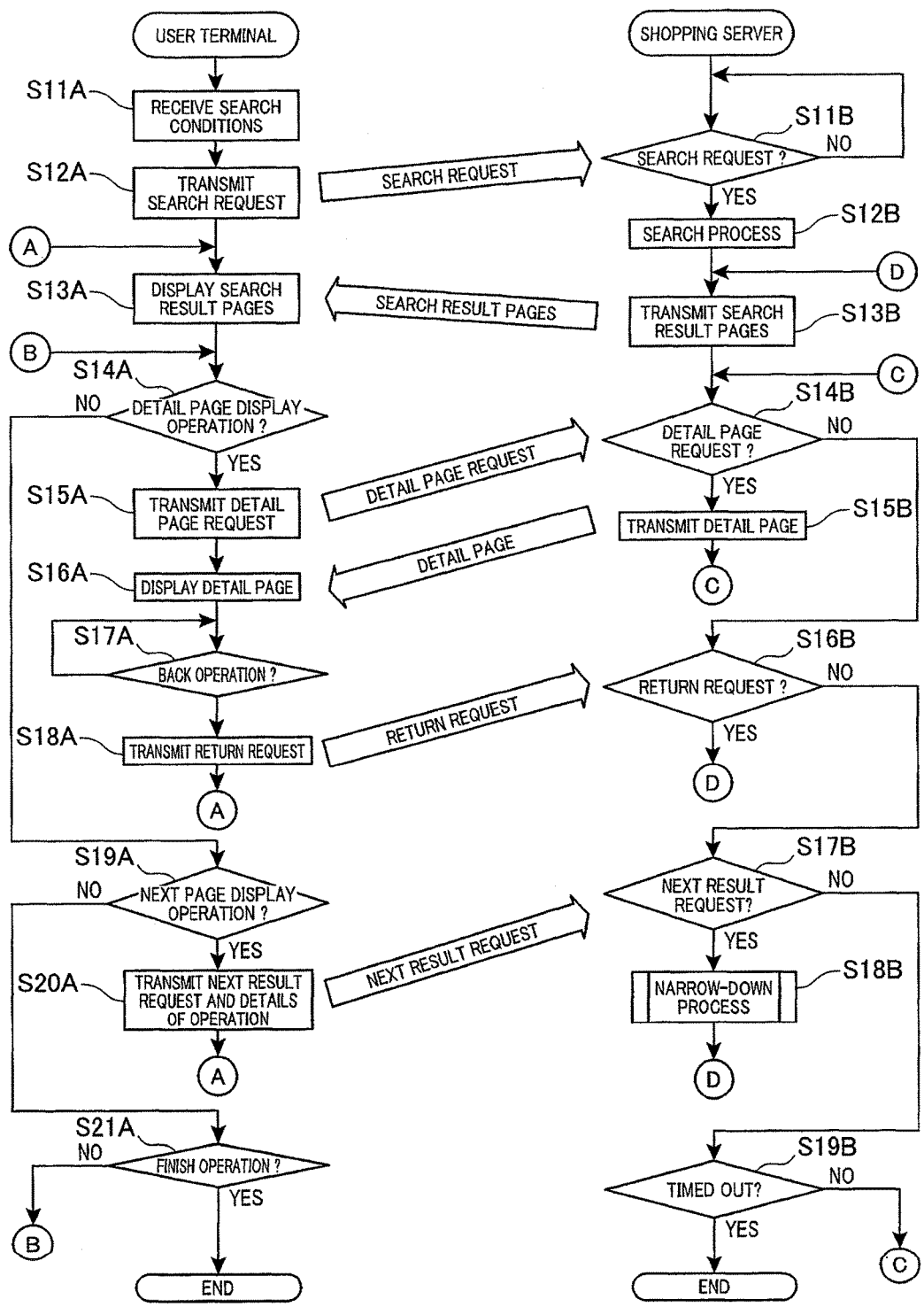
FIG. 5 is flow chart showing a process example of the shopping system S according to the first embodiment.

A summary of operation of the shopping system S in displaying the search result pages will described. FIG. 5 is a flow chart showing a process example of the shopping system S according to the first embodiment.

As shown in FIG. 5, the system control unit 36 of the user terminal 2 first receives input of search conditions by the user (step S11A). Examples of the search conditions that can be designated include keywords, a range of the price of the product, and a category of the product. The system control unit 36 of the user terminal 2 then transmits a search request including the input search conditions to the shopping server 1 (step S12A).

On the other hand, the system control unit 20 of the shopping server 1 is in a standby state until the search request is received (step S11B: NO). When the search request is received (step S11B: YES), the system control unit 20 executes a search process based on the search conditions included in the received search request (step S12B). The system control unit 20 transmits, to the user terminal 2, a search result page (example of "first display data") displaying a list of corresponding products equivalent to the number of display items (step S13B).

When the search result page is received, the system control unit 36 of the user terminal 2 displays the search result page on the display unit 32 (step S13A). The system control unit 36 determines whether an operation for displaying a detail page is detected (step S14A). The operation for displaying the detail page is an operation of selecting the product link 211, the review link 212, or the shop link 213. If the system control unit 36 determines that the operation for displaying the detail page is not detected (step S14A: NO), the process moves to step S19A. On the other hand, if the system control unit 36 determines that the operation for displaying the detail page is detected (step S14A: YES), the system control unit 36 transmits, to the shopping server 1, a detail page request including link identification information indicating the operated link (step S15A).

After the process of step S13B, the system control unit 20 of the shopping server 1 is in the standby state until one of the detail page request, a return request, and a next result request is received, or until the communication with the user terminal 2 is timed out (step S14B: NO, step S16B: NO, step S18B: NO, step S19B: NO). When the detail page request is received (step S14B: YES), the system control unit 20 analyzes the link identification information included in the detail page request and specifies the link operated by the user and the product corresponding to the link. Based on the product ID of the specified product, the system control unit 20 acquires information to be displayed on the detail page corresponding to the operated link from the shop DB 102, the product DB 103, and the like to generate the detail page. When the detail page is generated, the system control unit 20 transmits the detail page to the user terminal 2 (step S15B).

When the detail page is received, the system control unit of the user terminal 2 causes the display unit 32 to display the detail page (step S16A). The system control unit 36 then determines whether a back operation is detected (step S17A). The back operation is an operation for returning to the search result page displayed when the process of step S14A is executed. Specifically, the back operation is an operation of pressing a back button arranged on the Web browser. The system control unit 36 is in the standby state until the back operation is detected (step S17A: NO). When the system control unit 36 determines that the back operation is detected (step S17A: YES), the system control unit 36 transmits a return request to the shopping server 1 (step S18A).

When the return request is received (step S16B: YES), the system control unit 20 of the shopping server 1 retransmits the search result page displayed on the user terminal 2 when the process of step S14B is executed (step S13B). When the search result page is to be transmitted in the process of step S13B, the system control unit 20 holds the search result page in the storage unit 15 so that the search result page can be retransmitted. More specifically, in the retransmission of the search result page based on the reception of the return request, the system control unit 20 retransmits the search result page transmitted in the most recent process of step S13B. When the retransmitted search result page is received, the system control unit 36 of the user terminal 2 causes the display unit 32 to display the search result page (S13A).

The system control unit 36 of the user terminal 2 determines whether a next page display operation is detected when the search result page is displayed (step S19A). The next page display operation is an operation for displaying the next page, and specifically, is an operation of selecting the next result link 230. If the system control unit 36 determines that the next page display operation is not detected (step S19A: NO), the process moves to step S21A. On the other hand, if the system control unit 36 determines that the next page display operation is detected (step S19A: YES), the system control unit 36 transmits the next result request and user operation information indicating the details of the operation of the user to the shopping server 1 (step S20A). The system control unit 36 records, in the storage unit 34, the details of the operation of the user from the display of the search result page received from the shopping server 1 to the detection of the next page display operation. In step S20A, the user operation information indicating the recorded details of operation is transmitted. Although the system control unit 36 transmits the next result request and the user operation information to the shopping server 1 in the process of step S20 here, the next result request and the user operation information may not necessarily be transmitted at the same time. For example, the system control unit 36 may transmit the user operation information before or after the process of step S20A, separately from the next result request.

When the next result request and the user operation information indicating the details of the operation are received (step S17B: YES), the system control unit 20 of the shopping server 1 executes a narrow-down process (step S18B).

Figure 6:
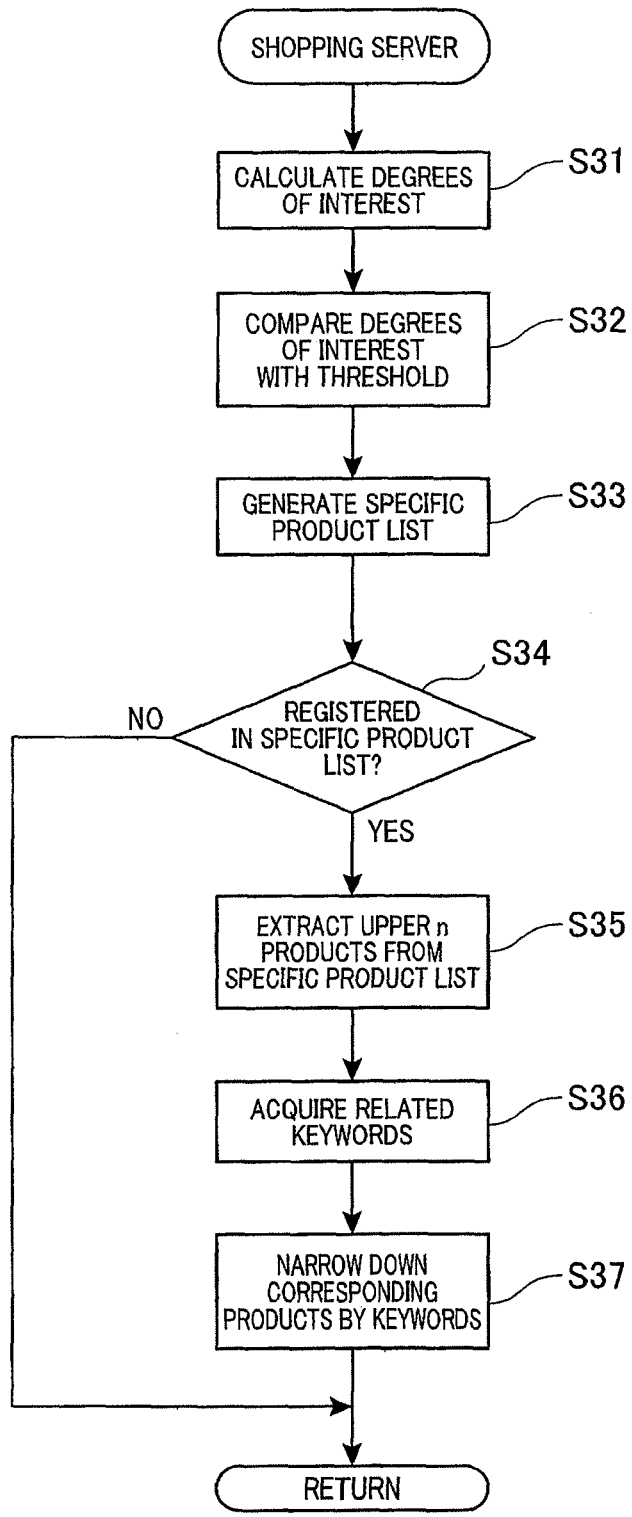
FIG. 6 is a flow chart showing a process example of a system control unit 20 of the shopping server 1 according to the first embodiment.

The narrow-down process by the system control unit 20 of the shopping server 1 will be described with reference to FIG. 6 and FIG. 7B. FIG. 6 is a flow chart showing an example of the narrow-down process by the system control unit 20 according to the first embodiment. FIG. 7B is a diagram showing an example of part of the keyword DB 104 according to the first embodiment, and FIG. 7B particularly illustrates a part corresponding to a product "digital camera". For example, FIG. 7B illustrates that keywords "Company A", "5 million pixels", and "10× zoom" are registered in association with the digital camera with the product ID "DC0001".

As shown in FIG. 6, the system control unit 20 of the shopping server 1 first calculates degrees of interest of the user for corresponding products (will be called "degree-of-interest calculation target products") displayed on the search result pages when the next result request is transmitted (step S31). In this case, the system control unit 20 calculates the degrees of interest of the user based on the details of the operation of the user indicated in the user operation information received along with the next result request in the process of step S17B of FIG. 5. Specifically, the system control unit 20 calculates the degrees of interest of the user for the products based on the numbers of selections of the links (the product link 211, the review link 212, and the shop link 213) displayed in the individual product information 210 corresponding to the products. For each selection of the link, the system control unit 20 adds two points to the degree of interest of the user for the product. More specifically, when each of the product link 211 and the review link 212 are selected once, the degree of interest of the user has four points. An upper limit (for example, ten points) may be set for the degree of interest of the user for one product.

The system control unit 20 then compares the degrees of interest for the degree-of-interest calculation target products with a predetermined threshold (for example, three points) (step S32). The system control unit 20 generates a specific product list including only the products with the degrees of interest of the user higher than the predetermined threshold (step S33). In fact, the product IDs of the products with the degrees of interest of the user higher than the predetermined threshold are registered in the specific product list. More specifically, the process of step S33 corresponds to an example of "specifying the target" of the present invention.

The system control unit 20 then determines whether products are registered in the specific product list (step S34).

If the system control unit 20 determines that products are not registered in the specific product list (step S34: NO), the process in the flow chart is finished. On the other hand, if the system control unit 20 determines that products are registered in the specific product list (step S34: YES), the system control unit 20 extracts a predetermined number of upper products (for example, two products) from the specific product list (step S35). The upper products denote products with greater degrees of interest. If the predetermined number of products are not registered in the specific product list, all registered products may be extracted.

The system control unit 20 then acquires keywords (will be called "narrow-down keywords") associated with the extracted products (step S36). Specifically, the system control unit 20 searches the keyword DB 104 based on the product IDs of the extracted products and acquires the keywords associated with the product IDs. For example, in the example of FIG. 7B, the system control unit 20 acquires the keywords "Company A", "5 million pixels", and "10× zoom" if the product ID of the extracted product is "DC0001".

The system control unit 20 then narrows down the corresponding products based on the acquired narrow-down keywords (step S37). Specifically, the system control unit 20 acquires the keywords associated with the corresponding products from the keyword DB 104. The corresponding products are narrowed down to products associated with one or more same keywords as the narrow-down keywords. For example, if only one product is extracted in the process of step S35 and the product ID of the product is "DC0001", the products are narrowed down to products associated with at least one of "Company A", "5 million pixels", and "10× zoom". More specifically, at least the products with the product IDs "DC0003" and "DC0004" remain in the narrowed-down products. The corresponding products may be narrowed down only to products associated with equal to or more than a predetermined number (for example, two) of same keywords as the narrow-down keywords.

In this way, the corresponding products are narrowed down in the present embodiment every time the process of step S37 in the narrow-down process is executed. An upper limit may be set for the number of times of narrowing down the corresponding products in the narrow-down process.

When the process of step S37 is finished, the system control unit 20 finishes the process in the flow chart.

Returning to FIG. 5, when the narrow-down process (step S18B) is finished, the system control unit 20 transmits the search result page for displaying the corresponding products to the user terminal 2 (step S13B). Specifically, if the process of step S37 of the narrow-down process (see FIG. 6) is not executed (if the degrees of interest are not higher than the predetermined threshold), the system control unit 20 transmits the search result page for displaying products to be displayed following the products displayed when the most recent next result request is received. If the process of step S37 of the narrow-down process (see FIG. 6) is executed (if the degrees of interest are higher than the predetermined threshold), the system control unit 20 transmits the search result page (example of "second display data") for displaying, from the first product, the corresponding products narrowed down in the process. If the upper limit is set for the number of times of narrowing down the corresponding products in the narrow-down process as described above, the system control unit 20 skips the narrow-down process (step S18B) if the number of times of narrowing down has reached the upper limit. The system control unit 20 transmits the search result page for displaying the products to be displayed following the products displayed when the most recent next result request is received.

Meanwhile, the system control unit 36 of the user terminal 2 determines whether a finish operation is detected when the search result pages are displayed (step S21A). Examples of the finish operation include an operation of closing the Web browser and an operation for logging out from the shopping system S. If the system control unit 36 determines that the finish operation is not detected (step S21A: NO), the process moves to step S14A. On the other hand, if the system control unit 36 determines that the finish operation is detected (step S21A: YES), the process in the flow chart is finished.

If the system control unit 20 of the shopping server 1 determines that the communication with the user terminal 2 has timed out (step S19B: YES), the process in the flow chart is finished.

As described, 50 pieces (example of "predetermined number of pieces") of product information of the corresponding products (example of "targets") are displayed in each of the search result pages in the first embodiment. The system control unit 20 of the shopping server 1 receives the next result request (example of "an acquisition request of a next predetermined number of pieces of information") and the user operation information indicating the details of the operation of the user for the products displayed when the next result request is transmitted, calculates the degrees of interest of the user for the products based on the received user operation information, specifies the products with the calculated degrees of interest of the user higher than the predetermined threshold, acquires the keywords based on the specified products, narrows down the corresponding products based on the acquired keywords, and generates and transmits the search result pages including product information of the narrowed-down corresponding products.

Therefore, according to the shopping server 1 of the first embodiment, 50 corresponding products are displayed on each page. If the degrees of interest of the user for the products corresponding to the displayed product information are high, the product information of the products narrowed down based on the degrees of interest of the user in the previous page is displayed on the page displayed next based on the next page display operation. More specifically, the user can check the product information of the products in each page, and if there is an interesting product in the displayed page, the user can check only the product information of the products related to the interesting product in the next page.

The search result pages transmitted by the system control unit 20 of the shopping server 1 in the first embodiment display, for each product, the product link 211, the review link 212, and the shop link 213 (example of "link information") for displaying the detail page that displays the related information corresponding to the product. In this way, the user can acquire the related information corresponding to the product that the user is interested in based on the links 211 to 213.

In the first embodiment, the system control unit 20 of the shopping server 1 calculates higher degrees of interest of the user for products corresponding to the links 211 to 213 with greater numbers of operations of the user. In this way, the product information displayed on the search result pages can be narrowed down to the product information of the products associated with the same keywords as the products with greater numbers of operations for the links 211 to 213 and with higher degrees of interest of the user.

In the first embodiment, the system control unit 20 of the shopping server 1 receives the search conditions transmitted from the user terminal 2 and searches the products based on the received search conditions to generate the search result pages including the product information of the searched corresponding products. In this way, even if a large amount of corresponding products are searched by the search conditions, the product information can be displayed by narrowing down the product information to the product information the user is interested in, without imposing a burden on the user in providing the product information to the user.

In the first embodiment, the products with the degrees of interest of the user higher than the predetermined threshold are registered in the specific product list (step S33 of FIG. 6), and the predetermined number of upper products are extracted (step S35). However, instead of generating the specific product list, the keywords associated with the specified product may be acquired every time a product with the degree of interest of the user higher than the predetermined threshold is specified (step S36).

[1.6. Sorting Process]

In the first embodiment, the product information is displayed by narrowing down the product information of the corresponding products displayed on the search result pages to the product information of the products related to the product the user is interested in (products with the same keywords as the product the user is interested in). In place of this, the burden of the user in browsing can also be reduced by preferentially displaying the product information of the products related to the product the user is interested in. Particularly, if the corresponding products obtained as search results include a large amount of products the user is not interested in, the burden in browsing can be significantly reduced. Therefore, the shopping system S specifies the product the user is interested in based on the details of the operation when the user is browsing the search result pages. In the display of the product information of the corresponding products in the search result pages, the order of display of the products related to the specified products may be higher.

Figure 10:
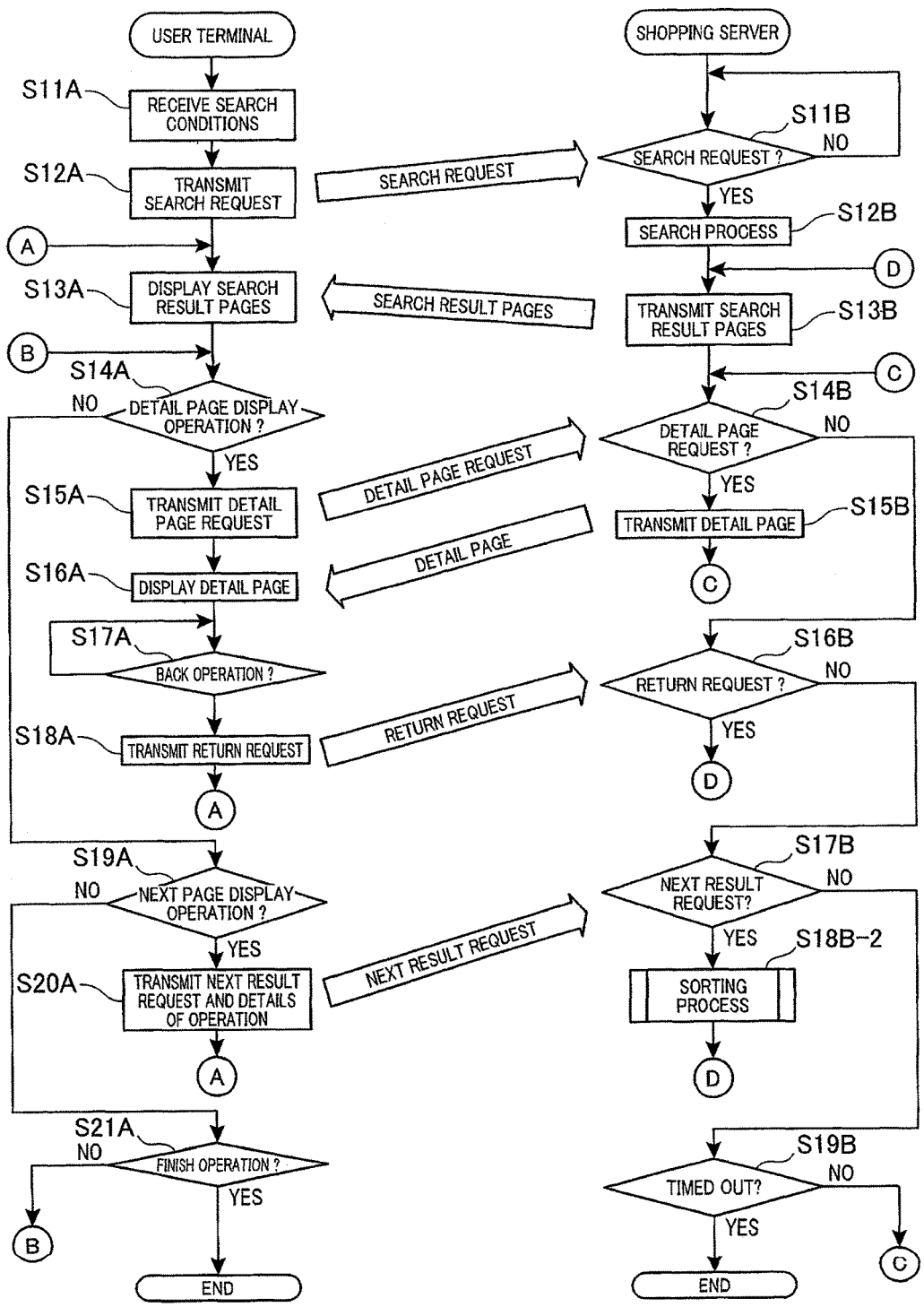
FIG. 10 is a flow chart showing a process example of the shopping system S according to the first embodiment.
Figure 11:
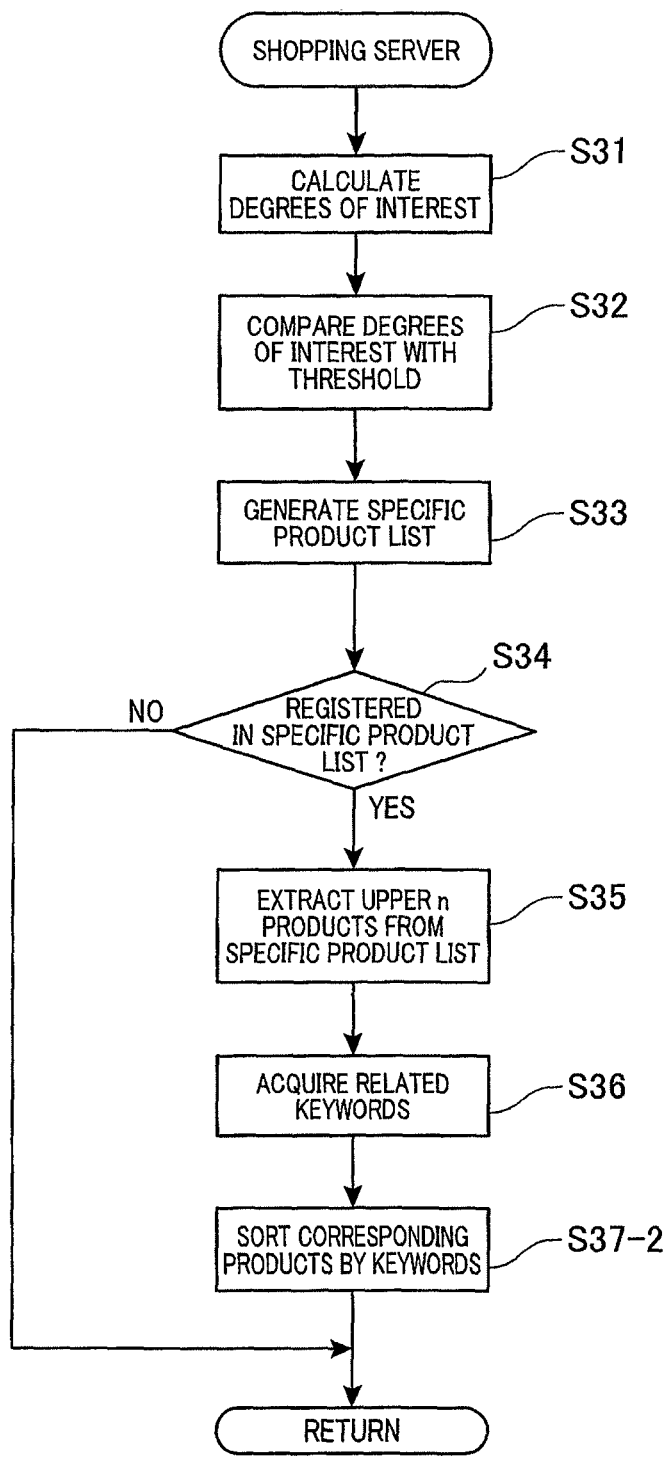
FIG. 11 is a flow chart showing a process example of the system control unit 20 of the shopping server 1 according to the first embodiment.

The case of preferentially displaying the product information of the products related to the product the user is interested in on the search result pages will be described with reference to FIG. 9 to FIG. 13. Differences from the case of displaying the product information by narrowing down the product information to the product information of the products related to the product the user is interested in will be mainly described. FIG. 9 is a diagram showing a screen display example when the search result pages are displayed. FIG. 10 is a flow chart showing a process example of the shopping system S in the case of preferentially displaying the product information of the products related to the product the user is interested in. FIG. 11 is a flow chart showing an example of a sorting process by the system control unit 20 when the product information of the products related to the product the user is interested in is preferentially displayed. FIG. 12A to FIG. 12C are diagrams showing an example of the keyword DB 104. FIG. 12A to FIG. 12C illustrate an example in which keywords "Company A", "5 million pixels", and "10× zoom" are registered in association with the product with the product ID "DC0001".

As shown in FIG. 9, a sort result display area 240 is displayed on the search result pages. In a process of step S13B of FIG. 10, an order of display of the products in displaying the corresponding products is determined by a preset order of sort (initial) in the search result pages (example of "first display data") transmitted by the system control unit 20 of the shopping server 1 to the user terminal 2. The user can also set the order of sort (initial). For example, an ascending order (or a descending order) of the product ID is set as the order of sort (initial). An ascending order (or a descending order) of the product name, the price, or the number reviews may also be set.

In a process of step S18B-2 of FIG. 10, the system control unit 20 of the shopping server 1 executes a sorting process. The sorting process by the system control unit 20 of the shopping server 1 will be described with reference to FIG. 11 to FIG. 12C. In the process of step S36 of FIG. 11, the system control unit 20 acquires keywords (will be called "sorting keywords") associated with the product extracted in the process of step S35 of FIG. 11 (step S36). Specifically, the system control unit 20 searches the keyword DB 104 based on the product ID of the extracted product and acquires the keywords associated with the product ID. For example, if the product ID of the extracted product is "DC0001" in the example of FIG. 12A, the keywords "Company A", "5 million pixels", and "10× zoom" are acquired.

The system control unit 20 then sorts the corresponding products based on the acquired sorting keywords (step S37-2). Specifically, the system control unit 20 acquires the keywords associated with the corresponding products from the keyword DB 104. The system control unit 20 updates the order of sort so that the order of display of the products associated with the same keywords as the sorting keywords becomes higher and determines the order of display of the corresponding products (more specifically, sorts the corresponding products) based on the updated order of sort. If a plurality of sorting keywords are acquired and if there are products associated with a plurality of keywords among the keywords, the order of display of the products with more associated keywords is raised. If there are a plurality of products in the same conditions in determining the order of display of the corresponding products based on the updated order of sort, the order of display between the products is arbitrary (for example, the order of sort (initial) may be followed).

A process of step S37-2 will be described with reference to FIG. 12A to FIG. 12C. The case in which "Company A", "5 million pixels", and "10× zoom" corresponding to the product ID "DC0001" are acquired as the sorting keywords will be described. In this case, the order of sort is updated as follows.

Order of sort I (No. 1 priority): products associated with all of the keywords "Company A", "5 million pixels", and "10× zoom"

Order of sort II (No. 2 priority): products associated with two of the keywords "Company A", "5 million pixels", and "10× zoom"

Order of sort III (No. 3 priority): products associated with one of the keywords "Company A", "5 million pixels", and "10× zoom"

When the products shown in FIG. 12A are sorted based on the orders of sort I to III, there is only one product with the product ID "DC0001" corresponding to the order of sort I. Therefore, the order of display of the product with the product ID "DC0001" is No. 1 as shown in FIG. 12B. There is only one product with the product ID "DC0008" corresponding to the order of sort II. Therefore, the order of display of the product with the product ID "DC0008" is No. 2. There are four products with the product IDs "DC0003", "DC0004", "DC0010", and "DC0013" corresponding to the order of sort III. Therefore, the orders of display of the four products are from No. 3 to No. 6. Seven products not corresponding to the orders of sort I to III are one of No. 7 to No. 13.

The order of display between the four products corresponding to the order of sort III and the order of display between the seven products not corresponding to the orders of sort I to III are arbitrary. According to the "ascending order of product ID" as an example of the order of sort (initial), regarding the order of display between the four products corresponding to the order of sort III, the order of display of the product with the product ID "DC0003" is No. 3, the order of display of the product with the product ID "DC0004" is No. 4, the order of display of the product with the product ID "DC0010" is No. 5, and the order of display of the product with the product ID "DC0013" is No. 6 as shown in FIG. 12B. Similarly, regarding the order of display between the seven products not corresponding to the orders of sort I to III, the order of display of the product with the product ID "DC0002" is No. 7, the order of display of the product with the product ID "DC0005" is No. 8, the order of display of the product with the product with the product ID "DC0006" is No. 9, the order of display of the product with the product ID "DC0007" is No. 10, the order of display of the product with the product ID "DC0009" is No. 11, the order of display of the product with the product ID "DC0011" is No. 12, and the order of display of the product with the product ID "DC0012" is No. 13.

The sorting process (step S18B-2 of FIG. 10) is executed every time the next result request is received (step S17B of FIG. 10: YES). In the present embodiment, the order of sort is updated every time the sorting process is executed so that the order of display of the products with higher degrees of interest of the user becomes higher (except when step S34 of FIG. 11 is "NO"). A case in which a second process of step S37 is executed from a state in which the process of step S37 is executed once as described (see FIG. 12B) will be described. A case in which sorting keywords "Company F", "5 million pixels", and "12× zoom" corresponding to the product ID "DC0010" are newly acquired in the second process of step S36 will be described. In this case, the order of sort is updated as follows.

Order of sort I (No. 1 priority): products associated with all of the keywords "Company A", "5 million pixels", "10× zoom", "Company F", and "12× zoom"

Order of sort II (No. 2 priority): products associated with four of the keywords "Company A", "5 million pixels", "10× zoom", "Company F", and "12× zoom"

Order of sort III (No. 3 priority): products associated with three of the keywords "Company A", "5 million pixels", "10× zoom", "Company F", and "12× zoom"

Order of sort IV (No. 4 priority): products associated with two of the keywords "Company A", "5 million pixels", "10× zoom", "Company F", and "12× zoom"

Order of sort V (No. 5 priority): products associated with one of the keywords "Company A", "5 million pixels", "10× zoom", "Company F", and "12× zoom"

The order of display is as shown in FIG. 12C when the products shown in FIG. 12B are sorted based on the orders of sort I to V. The keyword "5 million pixels" is acquired as the sorting keyword both in the first and second processes. Therefore, if there are a plurality of products in the same condition, the order of display of the products associated with the keyword "5 million pixels" may be further raised. For example, although the product with the product ID "DC0003" and the product with the product ID "DC0004" are products with the same condition corresponding to the order of sort V (No. 5 priority) in FIG. 12C, the order of display of the product with the product ID "DC0004" associated with the keyword "5 million pixels" may be No. 3, while the order of display of the product with the product ID "DC0003" not associated with the keyword "5 million pixels" may be No. 4.

In this way, in the present embodiment, the order of display of the corresponding products is changed according to the degrees of interest of the user every time the process of step S37-2 in the sorting process is executed. An upper limit may be set for the number of changes in the order of display of the corresponding products in the sorting process.

Returning to FIG. 10, when the sorting process (step S18B-2) is finished, the system control unit 20 transmits a search result page for displaying a list of the corresponding products to the user terminal 2 (step S13B). Specifically, if the system control unit 20 executes the process of step S37-2 in the last sorting process (see FIG. 11) (if the degree of interest is higher than the predetermined threshold), the system control unit 20 transmits a search result page (example of "second display data") for displaying the products equivalent to the number of display items from the products with the No. 1 order of display determined in the process of step S37-2. On the other hand, if the system control unit 20 does not execute the process of step S37-2 in the last sorting process (see FIG. 11) (if the degree of interest is not higher than the predetermined threshold), the system control unit 20 transmits a search result page for displaying the products to be displayed on the next page based on the order of display at this point.

When the upper limit is set for the number of changes in the order of display of the corresponding products in the sorting process as described above, the system control unit 20 skips the sorting process (step S18B-2) if the number of changes has reached the upper limit and transmits the search result page for displaying the products to be displayed next based on the order of display at this point.

When the order of display of the corresponding products is changed in the sorting process (step S18B-2), the system control unit 20 transmits, to the user terminal 2, the search result page that displays information related to the processing results on the sort result display area 240. A display example of the sort result display area 240 when the order of display of the corresponding products is changed in the sorting process (step S18B-2) will be described with reference to FIG. 13A to FIG. 13F.

FIG. 13A and FIG. 13B illustrate display examples of the sort result display area 240 when the sorting keyword is only the "Company A". In the example of FIG. 13A, the order of display of the products associated with the same keywords as the sorting keywords is displayed along with the sorting keywords.

Meanwhile, in the example of FIG. 13B, a ratio bar 241 and a display position icon 242 are displayed along with the sorting keywords. The ratio bar 241 includes a keyword section 241a and a non-keyword section 241b. In the ratio bar 241, the keyword section 241a indicates a proportion of products associated with the sorting keywords regarding the corresponding product, and the non-keyword section 241b indicates a proportion of products not associated with the sorting keywords. The order of display of a product farther to the left on the ratio bar 241 is higher. More specifically, the keyword section 241a indicates a range of the order of display of the products associated with the sorting keywords. For example, the example of FIG. 13B indicates that the order of display of the products associated with the sorting keywords is in a range of No. 1 to No. 300. Meanwhile, the non-keyword section 241b indicates a range of the order of display of the products not associated with the sorting keywords. Meanwhile, the display position icon 242 indicates display positions of the products displayed on the corresponding product list 201.

From the display of FIG. 13A or FIG. 13B, the user can figure out that the products related to "Company A" are displayed on 1st to 300th items. From the display of FIG. 13B, the user can figure out that there are 1000 corresponding products and can figure out the display positions of the products displayed on the corresponding product list 201.

FIG. 13C and FIG. 13D illustrate display examples of the sort result display area 240 when the sorting keywords are "Company A" and "5 million pixels". The example of FIG. 13C includes a plurality of sorting keywords. Therefore, the order of display of the products associated with the plurality of sorting keywords ("Company A" and "5 million pixels") is displayed on the top. Below this, the order of display of the products associated with the same keywords as the sorting keywords are displayed for each of the sorting keywords "Company A" and "5 million pixels" as in the example of FIG. 13A.

Meanwhile, in the example of FIG. 13D, the ratio bar 241 and the display position icon 242 are displayed on the top, along with the plurality of sorting keywords ("Company A" and "5 million pixels"). Below this, the ratio bar 241 is displayed for each of the sorting keywords "Company A" and "5 million pixels".

From the display of FIG. 13C or FIG. 13D, the user can figure out that the products related to "Company A" and "5 million pixels" are displayed from 1st to 150th items, the products related to "Company A" are displayed from 1st to 300th items, and the products related to "5 million pixels" are displayed from 1st to 150th and from 301st to 500th items. From the display of FIG. 13D, the user can figure out that there are 1000 corresponding products and can figure out the display positions of the products displayed on the corresponding product list 201.

FIG. 13E and FIG. 13F illustrate display examples of the sort result display area 240 when the sorting keywords are "5 million pixels", "Company A", and "Company B". In the example of FIG. 13E, the order of display of the products associated with the same keywords as the sorting keywords are displayed for each of the sorting keywords "5 million pixels", "Company A", and "Company B".

Meanwhile, in the example of FIG. 13F, the ratio bar 241 corresponding to the sorting keyword "5 million pixels" is displayed on the top. Below this, a ratio bar 245 is displayed, indicating the whole keyword section 241a of the ratio bar 241. The ratio bar 245 includes keyword sections 245a, 245b, and a non-keyword section 245c. Keyword display bubbles 243a, 243b, and 243c indicating the sorting keywords are displayed in association with the keyword sections 241a, 245a, and 245b of the ratio bars 241 and 245, respectively.

From the display of FIG. 13E or FIG. 13F, the user can figure out that the products related to "5 million pixels" are displayed from 1st to 350th items, the products related to "Company A" are displayed from 1st to 50th items, and the products related to "Company B" are displayed from 51st to 80th items. From the display of FIG. 13F, the user can figure out that there are 1000 corresponding products and can figure out the display positions of the products displayed on the corresponding product list 201.

As described, when the product information of the products related to the product the user is interested in is preferentially displayed, 50 (example of "predetermined number") pieces of product information of the corresponding products (example of "targets") are displayed in each of the search result pages. The system control unit 20 of the shopping server 1 receives the next result request (example of "acquisition request of a next predetermined number of pieces of information") and the user operation information indicating the details of the operation of the user for the products displayed when the next result request is transmitted, calculates the degrees of interest of the user for the products based on the received user operation information, specifies the products with the calculated degrees of interest of the user higher than the predetermined threshold, acquires the keywords based on the specified products, determines the order of display of the product information of the corresponding products based on the acquired keywords, and transmits the search result pages for displaying the product information of the corresponding products in the determined order of display.

Therefore, according to the shopping server 1 when the product information of the products related to the product the user is interested in is preferentially displayed, 50 corresponding products are displayed on each page, and if the degree of interest of the user for a displayed product is high, the product information of the corresponding products are sorted and displayed based on the degree of interest of the user in the previous page, in the next and subsequent pages displayed by the next page display operation. More specifically, the user can check the product information of the products in each page, and if there is an interesting product in the displayed page, the user can preferentially check the product information of the products related to the interesting product in the next and subsequent pages.

When the product information of the products related to the product the user is interested in is preferentially displayed, the search result pages transmitted by the system control unit 20 of the shopping server 1 display, for each product, the product link 211, the review link 212, and the shop link 213 (example of "link information") for displaying the detail pages that display the related information associated with the corresponding product. In this way, the user can acquire the related information corresponding to the product the user is interested in based on the links 211 to 213.

When the product information of the products related to the product the user is interested in is preferentially displayed, the system control unit 20 of the shopping server 1 calculates the degrees of interest of the user higher for products corresponding to the links 211 to 213 with more numbers of operations of the user. In this way, the product information of the products associated with the same keywords as the products with more numbers of operations for the links 211 to 213 and with higher degrees of interest of the user can be preferentially displayed.

When the product information of the products related to the product the user is interested in is preferentially displayed, the system control unit 20 of the shopping server 1 receives the search conditions transmitted from the user terminal 2 and searches the products based on the received search conditions to generate the search result pages including the product information of the searched corresponding products. In this way, even if a large amount of corresponding products are searched by the search conditions, the product information of the corresponding products the user is interested in can be preferentially displayed without imposing a burden on the user in providing the product information to the user.

[1.7. Change in Display Mode]

In the first embodiment, the product information of the corresponding products displayed on the search result pages are displayed by narrowing down the product information to the product information of the products related to the product the user is interested in (products with the same keywords as the product the user is interested in). In place of this, (1) the display mode of the product information of the products related to the product the user is interested in may be different from the display mode of the product information of the products related to other products (products other than the product the user is interested in), or (2) a display mode may be adopted in which the product information of the products related to other products (products other than the product the user is interested in) is collapsed and not displayed until a collapse cancellation operation of the user is detected. Examples of (1) include enlarging the display character size of the product information of the products related to the product the user is interested in, changing the color of the characters or background color of the part displaying the product information, and applying a mask process to the part displaying the product information of the products related to the products other than the product the user is interested in. In this way, even if the product information of the products related to the product the user is interested in is preferentially displayed, the burden of the user in browsing can be reduced.

[1.8. Modified Examples]

Modified examples of the first embodiment will be described.

[1.8.1. Method of Calculating Degree of Interest of User]

A modified example in relation to the method of calculating the degree of interest of the user will be described.

[1.8.1.1. Calculation Method Based on Order of Operation of Links]

Among the links (the product link 211, the review link 212, and the shop link 213) displayed for each product of the search result pages, the links corresponding to the products the user is more interested in are estimated to be selected earlier. Therefore, the degrees of interest of the user for the corresponding products can be calculated based on the order of selecting the links 211 to 213. For example, it is assumed that the system control unit 20 sets higher degrees of interest for products with earlier order of selection of the links, such as by setting five points to the degree of interest for the product corresponding to the link selected first, four points to the degree of interest for the product corresponding to the link selected second, . . . , and one point to the degree of interest for the product corresponding to the link selected fifth. In this way, the product information displayed on the search result pages can be narrowed down to the product information of the products associated with the same keywords as the products with earlier order of operation for the links 211 to 213 and with higher degrees of interest of the user. When the product information of the products related to the product the user is interested in is preferentially displayed, the product information of the products associated with the same keywords as the product with earlier order of operation for the links 211 to 213 and with higher degrees of interest of the user can be preferentially displayed.

[1.8.1.2. Calculation Method Based on Display Time of Detail Pages]

The display time of the detail pages (product detail pages, review detail pages, and shop detail pages) is estimated to be longer for detail pages corresponding to the products the user is highly interested in. Therefore, the degrees of interest of the user for the corresponding products can be calculated based on the display time of the detail pages. For example, it is assumed that the system control unit 20 adds one point to the degree of interest of the product, every 30 seconds of the display time of the detail page. In a specific example, if the display time of the product detail page corresponding to a product is 65 seconds, the display time of the review detail page is 120 seconds, and the display time of the shop detail page is 25 seconds, the degree of interest of the user for the product has "2+4+0=6" points.

The examples of the flow charts shown in FIG. 5 and FIG. 10 have flows in which the detail page is switched from the search result page and displayed on the same window (the same tab in a tab browser) as the search result page. However, the detail page may be displayed on a different window (different tab in the tab browser) from the search result page. In this case, the time from opening to closing of the window displaying the detail page may be the display time of the detail page.

There can be two methods for the system control unit 20 of the shopping server 1 to acquire the display time of the detail pages. A first method is causing the user terminal 2 to measure the display time of the detail pages and transmit the information indicating the measured display time. A second method is a method of calculating the display time from a time difference between the time of transmission of the detail pages based on the reception of the detail page request by the system control unit 20 (step S15B) and time of transmission of the search result pages based on the reception of the return request (step S13B).

In the calculation of the degree of interest of the user based on the display time of the detail page, it is preferable to take into account whether the user has actually been browsing the detail pages. More specifically, if the display time of the detail page is long because the user has been performing another operation, it is preferable that the degree of interest of the user is not calculated high. Therefore, if the display time of the detail page exceeds a predetermined time, it is determined that the user is not browsing the detail page, and the degree of interest for the product is set to "0" point. An example of the predetermined time that can be set includes a time that is n times of the average time of browsing the detail page.

According to the modified example, the product information displayed on the search result pages can be narrowed down to the product information of the products associated with the same keywords as the product with long browsing time and high degree of interest of the user. When the product information of the products related to the product the user is interested in is preferentially displayed, the product information of the products associated with the same keywords as the product with long browsing time and high degree of interest of the user can be preferentially displayed.

[1.8.2.1 Target of Narrow-Down Process]

As described, the system control unit 20 of the shopping server 1 narrows down the products (corresponding products) searched in the search process (step S12B of FIG. 5) in the narrow-down process (step S18B of FIG. 5) every time the next result request is received. As shown in FIG. 8A, for example, if 1000 products are searched in the search process (step S12B), the products equivalent to the number of display items (50 in the example of FIG. 8A and FIG. 8B) among the 1000 items are displayed on the search result page (step S13B and step S13A). When the user performs the next page display operation, the narrow-down process (step S18B) is applied to the 1000 products searched in the search process (step S12B), and the products are narrowed down to, for example, 300 products. The products equivalent to the number of display items (50) among the 300 narrowed-down products are displayed on the search result page (step S13B and step S13A). When the user further performs the next page display operation, the narrow-down process (step S18B) is applied again to the 300 products narrowed down in the last narrow-down process (step S18B), and the products are narrowed down to, for example, 70 products. The products equivalent to the number of display items (50) among the narrowed-down 70 products are displayed on the search result page (step S13B and step S13A). In this way, the products to be displayed are narrowed down every time the user performs the next page display operation.

In a modified example, the products already displayed on the search result page can be removed from the target of the narrow-down process. The modified example will be described with reference to FIG. 8B. When 1000 products are searched in the search process (step S12B), products equivalent to the number of display items (50 in the example of FIG. 8A and FIG. 8B) are displayed on the search result page (step S13B and step S13A). So far, this is the same as in the example of FIG. 8A. When the user performs the next page display operation, the narrow-down process (step S18B) is applied to 950 products excluding the 50 products already displayed on the search result page from the 1000 products searched in the search process (step S12B). As a result, it is assumed that the products are narrowed down to 290 products. The products equivalent to the number of display items (50) among the narrowed-down 290 products are displayed on the search result page (step S13B and step S13A). When the user further performs the next page display operation, the narrow-down process (step S18B) is applied to 240 products excluding the 50 products already displayed on the search result page from the 290 products narrowed down in the last narrow-down process (step S18B). As a result, assuming that the products are narrowed down to 45 products, the number of products to be displayed does not fulfill the number of display items (50), and 45 products are displayed on the search result page (step S13B and step S13A). In this way, the system control unit 20 removes the products already displayed on the search result page, from the target of the narrow-down process. Therefore, the user does not check the same products again and again, and the burden of the user in browsing can be reduced.

[1.8.2.2 Target of Sorting Process]

As described, when the products related to the product the user is interested in are preferentially displayed, the system control unit 20 of the shopping server 1 calculates the degree of interest of the user every time the next result request is received and applies the sorting process to the products (corresponding products) searched in the search process (step S12B of FIG. 10) if the calculated degree of interest is higher than the predetermined threshold. When the sorting process is executed, the products are sequentially displayed again from the No. 1 product in the order of display. In this case, the user needs to check again the products that are already checked. Therefore, in a modified example, the products already displayed on the search result page are removed from the target of the sorting process. For example, when 1000 products are searched in the search process (step S12B), the products equivalent to the number of display items (50) among the 1000 products are displayed on the search result page (step S13B and step S13A). When the user performs the next page display operation, the sorting process (step S18B-2) is applied to 950 products excluding the 50 products already displayed on the search result page from the 1000 products searched in the search process (step S12B). In this way, the system control unit 20 removes the products already displayed on the search result page, from the target of the sorting process. Therefore, the user does not have to check the same products again and again, and the burden of the user in browsing can be reduced.

[1.8.3. Cancellation of Narrowing Down]

As described, in the first embodiment, the narrow-down process (step S18B) is executed every time the user performs the next page display operation, and the corresponding products to be displayed on the search result page are narrowed down. However, in some cases, the products are not narrowed down as the user has expected. In such a case, it can be preferable for the user to terminate the narrowing-down to return the state of the corresponding products to be displayed to the state before the narrowing-down. In a modified example, the narrowing-down is cancelled if it is determined that the products are not narrowed down as the user has expected.

If the next page display operation is performed within a predetermined time (for example, 15 seconds) after the display of the products narrowed down in the narrow-down process (step S18B) on the search result page, this can mean that the narrowing-down in the narrow-down process is not executed as the user has expected. Therefore, in a modified example, if the next page display operation is performed within the predetermined time (for example, 15 seconds) after the products narrowed down in the narrow-down process are displayed on the search result page, the system control unit 20 displays the search result page indicating the list of the corresponding products in the state before the last narrow-down process. The corresponding products in the state before the last narrow-down process are the products searched in the search process (step S12B) if the last narrow-down process is the first narrow-down process. If the last narrow-down process is an n-th (natural number two or greater) or subsequent narrow-down process, the corresponding products in the state before the last narrow-down process are products narrowed down in an "n−1"th narrow-down process. The state before any of the narrow-down processes may be restored, instead of the state before the last narrow-down process. The modified example can prevent the continuation of the display of the products narrowed down in a user's unintended format.

[1.8.4.1. Narrowing Down by Narrow-Down Keywords]

In the first embodiment, the corresponding products are narrowed down to the products associated with one or more same keywords as the narrow-down keywords in the process of step S37. In a modified example, if there are a plurality of narrow-down keywords, the corresponding products may be narrowed down to products associated with all the same keywords as the narrow-down keywords.

In another modified example, each product may be associated in advance with keywords in each genre, and the user may acquire the narrow-down keywords based on the product and the genre the user is interested in to narrow down the corresponding products by the acquired narrow-down keywords. Specifically, a digital camera is associated with keywords related to a maker genre and a spec genre. A maker hyper link to a page for displaying detail information related to the maker and a spec hyperlink to a page for displaying detail information related to the spec are arranged in the individual product information 210 of the corresponding product list 201. In this case, for example, if there are more operations for the maker hyperlinks than the operations for the spec hyperlinks, the system control unit 20 determines that the user has an interest in the maker genre and acquires the keywords of the maker genre as the narrow-down keywords. In this case, the corresponding products can be narrowed down to products of the same maker as the product the user is interested in.

[1.8.4.2. Sort by Sorting Keywords]

When the product information of the products related to the product the user is interested in is preferentially displayed, the products associated with more sorting keywords are preferentially displayed (step S37-2) if a plurality of sorting keywords are acquired (step S36 of FIG. 11). In a modified example, each product is associated in advance with keywords in each genre, and the order of display of the corresponding products may be determined based on the product and the genre the user is interested in.

Specifically, the digital camera is associated with keywords related to the maker genre and the spec genre. The maker hyperlink to the page for displaying the detail information related to the maker and the spec hyperlink to the page for displaying the detail information related to the spec are arranged in the individual product information 210 of the corresponding product list 201. At this time, the system control unit 20 specifies the product the user is interested in based on the operation of the user as described above and specifies the genre the user is interested in. For example, if there are more operations for the maker hyperlink than the operations for the spec hyperlink, the system control unit 20 determines that the user is interested in the maker genre. The system control unit 20 sets the No. 1 display priority to the products associated with the keywords that are associated with the specified product and that are corresponding to the specified genre. The products associated with more sorting keywords among the products of the No. 1 display priority may be further preferentially displayed.

[1.8.5. Order of Display after Narrow-Down Process]

In the first embodiment, the order of display of the products in displaying the product information of the products on the search result pages after the narrow-down process is not particularly defined. In the display of the product information of the products on the search result pages, the burden of the user in browsing can be reduced if the products with higher degrees of interest of the user are sequentially displayed. Therefore, in a modified example, the order of display of the products in displaying the products on the search result pages is a descending order of the degree of interest of the user after the narrow-down process.

The modified example will be described with reference to FIG. 14. FIG. 14 illustrates an example of the degrees of interest of the user for the products calculated in the narrow-down process (see FIG. 6). In the example of FIG. 14, the degree of interest of the user for a product E is "7", the degree of interest of the user for a product B is "6", the degree of interest of the user for a product R is "5", the degree of interest of the user for a product S is "3", and the degree of interest of the user for a product A is "2". In this case, the product E, the product B, and the product R with the degrees of interest of the user greater than a predetermined threshold (three points here) are registered in the specific product list. The products extracted in the process of step S36 and step S37 of FIG. 6 and for which the related keywords are acquired are the product E and the product B included in a predetermined number of upper products (two products here). The related keywords of the product E and the product B are acquired in the narrow-down process, and the corresponding products displayed on the search result pages are narrowed down based on the acquired related keywords. In generating the search result pages for displaying the product information of the narrowed-down corresponding products in the modified example, the system control unit 20 generates search result pages so that the order of display of the products associated with the related keywords of the product E with the highest degree of interest of the user becomes higher. The order of display of the products associated with both the related keywords of the product B with the degree of interest of the user lower than that of the product E and with the related keywords of the product E may be further raised.

[1.8.6. Relative Evaluation for Degrees of Interest of User]

The products with high degrees of interest of the user are registered in the specific product list in the first embodiment (step S33 of FIG. 6 and FIG. 11), and whether the degree of interest of the user is high is determined by whether the degree of interest is higher than the predetermined threshold (step S32 of FIG. 6 and FIG. 11). In a modified example as an alternative, the system control unit 20 may calculate the degrees of interest for all degree-of-interest calculation target products in the narrow-down process (or the sorting process) and compare the degrees of interest to register the products with higher degrees of interest of the user in the specific product list as the products with high degrees of interest of the user. The products with higher degrees of interest of the user may be, for example, top three products or may be products included in top 20% of the degree-of-interest calculation target products. The products with higher degrees of interest of the user may not be registered in the specific product list if the degrees of interest are below the predetermined threshold. According to the modified example, the corresponding products are narrowed down to the products associated with the keywords corresponding to the products with high degrees of interest of the user. Therefore, the corresponding products can be narrowed down to the products that the user is interested in, without imposing a burden on the user. When the product information of the products related to the product the user is interested in is preferentially displayed, the product information of the products associated with the keywords corresponding to the products with high degrees of interest of the user can be preferentially displayed. Therefore, the user can preferentially acquire the product information of the products the user is interested in, without any burden.

[1.8.7. Generation of Keyword DB 104]

A manager of the shopping server 1 may generate the keyword DB 104, or the system control unit 20 of the shopping server 1 may generate the keyword DB 104. To describe the latter case in detail, when, for example, the user selects (clicks) the product link 211, the review link 212, or the shop link 213 of the search result page (see FIG. 4 and FIG. 9) (when the detail page request is received (step S14B of FIG. 5 and FIG. 10: YES)), the system control unit 20 may access the product DB 103 based on the product ID of the product corresponding to the selected link to acquire appropriate words as keywords from the product information and register the keywords in the keyword DB 104 in association with the product ID. When a back operation for closing the detail page is detected (when browsing of the detail page is finished), the system control unit 20 may access the product DB 103 based on the product ID corresponding to the product of the referrer of the detail page to acquire appropriate words as keywords from the product information and register the keywords in the keyword DB 104 in association with the product ID. When the time from the transmission of the detail page (step S15B) to the reception of the return request (step S16B: YES) exceeds a predetermined time (for example, 30 seconds), the system control unit 20 may access the product DB 103 based on the product ID corresponding to the product of the referrer of the detail page to acquire appropriate words as keywords from the product information and register the keywords in the keyword DB 104 in association with the product ID. Furthermore, when operation of selecting (clicking) equal to or more than a predetermined number of links among the plurality of links arranged in the detail page is detected, the system control unit 20 may access the product DB 103 based on the product ID corresponding to the product of the referrer of the detail page to acquire appropriate words as keywords from the product information and register the keywords in the keyword DB 104 in association with the product ID. TF (Term Frequency)/IDF (Inverse Document Frequency), morphological analysis, or the like as a known algorithm can be used when the system control unit 20 acquires appropriate words as keywords from the product information.

[1.8.8. Execution Period of Narrow-Down Process and Sorting Process]

The system control unit 20 executes the narrow-down process or the sorting process when the next result request is received (step S17B of FIG. 5 and FIG. 10: YES). In place of this, the system control unit 20 may execute the narrow-down process or the sorting process when the return request is received (step S16B of FIG. 5 and FIG. 10: YES). In this case, the search result pages applied with the narrow-down process or the sorting process are transmitted to the user terminal 2.

In the configuration of opening and activating another window for displaying the detail page and inactivating the window for displaying the search result page when the user selects (clicks) the product link 211, the review link 212, or the shop link 213, the system control unit 20 may execute the narrow-down process or the sorting process when close information indicative of a close operation for closing the other window for displaying the detail page (for example, an operation of clicking the close button) is received from the user terminal 2. In this case, the system control unit 20 retransmits the search result pages applied with the narrow-down process or the sorting process (therefore, the search result pages displaying the narrowed-down product information or the search result pages displaying the sorted product information) to the user terminal 2 to display the retransmitted search result pages on the window that is activated again by the close operation and that has been displaying the search result pages.

A window system in the user terminal 2 will be described. The storage unit 34 of the user terminal 2 stores system software for managing the window in the window system. The system software will be called a "window manager". The window system is integrated with, for example, an operating system. The storage unit 34 also stores a Web browser for displaying Web pages. When the Web browser is launched, the system control unit 36 of the user terminal 2 acquires information of the windows displayed on the screen to determine overlapping of the windows. The state of the windows can change depending on an event related to the windows. Examples of the types of the event include opening of a window (display of a new window), closing of a window (removal of a window), change in an active window, movement of a window, and resizing (expansion or reduction of a window). The system control unit acquires information of the windows every time such a particular event occurs. The particular event related to the window will be called a "specific event". For example, the window manager can notify the Web browser of the specific event to allow the system control unit 36 that is launching the Web browser to recognize the specific event. Examples of the information transferred from the window manager in the notification of the specific event include a type of the specific event and a window identifier of the window with the specific event. The window identifier is unique information provided by the window manager every time the window is newly opened. Examples of the information of the window to be acquired include the window identifier, identification information of an application program allocated to the window, position information of the window, position information of a client area, and a display priority. The information can be acquired through, for example, an API (Application Program Interface) provided by the window system.

The identification information of the application program includes, for example, the file name of the application program or the name of the application program. The position information of the window includes, for example, screen coordinates at the upper left end of the window (coordinates indicating the position on the screen, with the upper left end of the screen as an origin) and the numbers of vertical and horizontal pixels of the window. The position information of the client area includes, for example, screen coordinates at the upper left end of the client area and the numbers of vertical and horizontal pixels of the client area. The display priority denotes a priority used to determine which window is to be displayed in the overlapped range when the display positions of a plurality of windows overlap. The window with the highest display priority among the plurality of windows with overlapped display positions is preferentially displayed in the overlapped range. The window with the No. 1 display priority is the active window. The active window is the target of input of characters and the like and operation by the user. The windows other than the active window are the inactive windows. The display priorities of the windows are occasionally changed by user operation. If the API for acquiring the display priorities of the windows is not provided, the system control unit 36 determines the display priorities of the windows according to the type of the notified specific event. Specifically, when a window is opened, the opened window becomes active. Therefore, the system control unit 36 sets the No. 1 display priority to the opened window and lowers, by one, each of the display priorities of the other windows displayed on the screen. One browser window is opened when the Web browser is launched. Therefore, the system control unit 36 sets the No. 1 display priority to the opened browser window. At this time, if a plurality of windows other than the browser window are opened, the Web browser cannot recognize accurate display priorities of the windows. In this case, the system control unit 36 randomly allocates the second and subsequent priorities to the windows. If a window is closed, the system control unit 36 raises, by one, each of the display priorities of the windows with display priorities lower than the closed window. If the active window is changed, the system control unit 36 sets the No. 1 display priority to the window that has become active and lowers, by one, each of the display priorities of the windows with higher display priorities than the display priorities before the window has become active. If a window is moved or resized, the moved or resized window becomes active. Therefore, the process is the same as when the active window is changed. The way the display priorities are changed upon the specific event may vary depending on the specifications of the window system or the specifications of individual application programs. In that case, the Web browser can be configured to determine the display priorities according to the specifications.

In this way, the user terminal 2 manages the windows and transmits the information indicating the operations or states of the windows displaying the search result pages or detail pages to the shopping server 1. The system control unit 20 of the shopping server 1 can recognize which windows are open or closed or which windows are active or inactive based on the information.

The system control unit 20 may execute the narrow-down process or the sorting process when information indicating activation operation for activating an inactive window displaying the search result pages (for example, operation of clicking the inactive window) is received from the user terminal 2. In this case, the system control unit 20 retransmits the search result pages applied with the narrow-down process or the sorting process to the user terminal 2 to display the retransmitted search result pages on the window that is activated again by the activation operation and that has been displaying the search result pages.

The narrow-down process or the sorting process may be executed when any of the links 211 to 213 is selected (clicked) for a predetermined number of products in one search result page. For example, the system control unit 20 executes the narrow-down process or the sorting process when detail page requests for two products (product with the product ID "DC0001" and product with the product ID "DC0003") are received and transmits the search result pages applied with the narrow-down process or the sorting process to the user terminal 2 when a return request is received next. In this case, if there are common related keywords between the related keywords acquired from the product ID "DC0001" and the related keywords acquired from the product ID "DC0003" in the process of step S37 of the narrow-down process shown in FIG. 6 or in the process of step S37-2 of the sorting process shown in FIG. 11, the system control unit 20 can narrow down or sort the products based on the common related keywords ("Company A" and "10×" in the example of FIG. 7B). Although the predetermined number is two in the example described here, the predetermined number may be three or more.

The narrow-down process or the sorting process may be executed when any of the links 211 to 213 is selected (clicked) for a predetermined number of products within a predetermined time from the display of one search result page. For example, the system control unit 20 executes the narrow-down process or the sorting process when detail page requests for three products (product with the product ID "DC0001", product with the product ID "DC0002", and product with the product ID "DC0003") are received within five minutes from the transmission of the search result pages and transmits the search result pages applied with the narrow-down process or the sorting process to the user terminal 2 when five minutes have passed. In this case, if there are common related keywords between the related keywords acquired from the product ID "DC0001", the related keywords acquired from the product ID "DC0002", and the related keywords acquired from the product ID "DC0003" in the process of step S37 of the narrow-down process shown in FIG. 6 or in the process of step S37-2 of the sorting process shown in FIG. 11, the system control unit 20 can narrow down or sort the products based on the common related keywords. Although the predetermined time is five minutes in the example described here, an arbitrary time may be set.

[1.8.9. Acquisition of Related Keywords]

In the acquisition of the related keywords in the process of step 36 of FIG. 6 or FIG. 11, the system control unit 20 may not only search the keyword DB 104 based on the product ID of the product extracted in the process of step S35 to acquire the keywords associated with the product ID, but may also refer to a thesaurus DB to acquire synonyms of the keywords associated with the product ID as the related keywords. The thesaurus DB may be arranged on the storage unit 15, or a thesaurus DB arranged on a storage unit of an apparatus other than the shopping server 1 may be referenced.

In the acquisition of the related keywords in the process of step 36 of FIG. 6 or FIG. 11, the system control unit 20 may acquire the related product ID from the product DB 103 based on the product ID of the product extracted in the process of step S35 and then search the keyword DB 104 based on the acquired related product ID to acquire the keywords associated with the related product ID as the related keywords.

[1.9. First Display Data and Second Display Data]

The "first display data" of the present invention is a concept including not only the search result pages transmitted in the process of step S13B executed following the process of step S12B of FIG. 5 or FIG. 10, but is a concept also including the search result pages ("second display data" of the present invention) transmitted in the process of step S13B executed following the process of step S18B. More specifically, in the present invention, a process in which generated second display data serves as new first display data, and new second display data is further generated based on the operation information of the user for the new first display data can be repeated. The information displayed in the second display data is further narrowed down or sorted according to the repetition of the process.

2. Second Embodiment

A second embodiment of the present invention will be described with reference to FIG. 15 to FIG. 17.

In the first embodiment described above, the product information of the corresponding products satisfying the search conditions are displayed in a list format (the corresponding product list 201). The second embodiment described below is characterized in that the product information of the corresponding products is displayed in a slide show format.

A shopping server and a user terminal of a shopping system according to the second embodiment have substantially a similar configuration as that of the shopping server 1 and the user terminal 2 of the shopping system S according to the first embodiment. Therefore, the same reference numerals are used for the same members and processes to skip part of the description, and differences will be mainly described.

[2.1. Display of Search Result]

Figure 15:
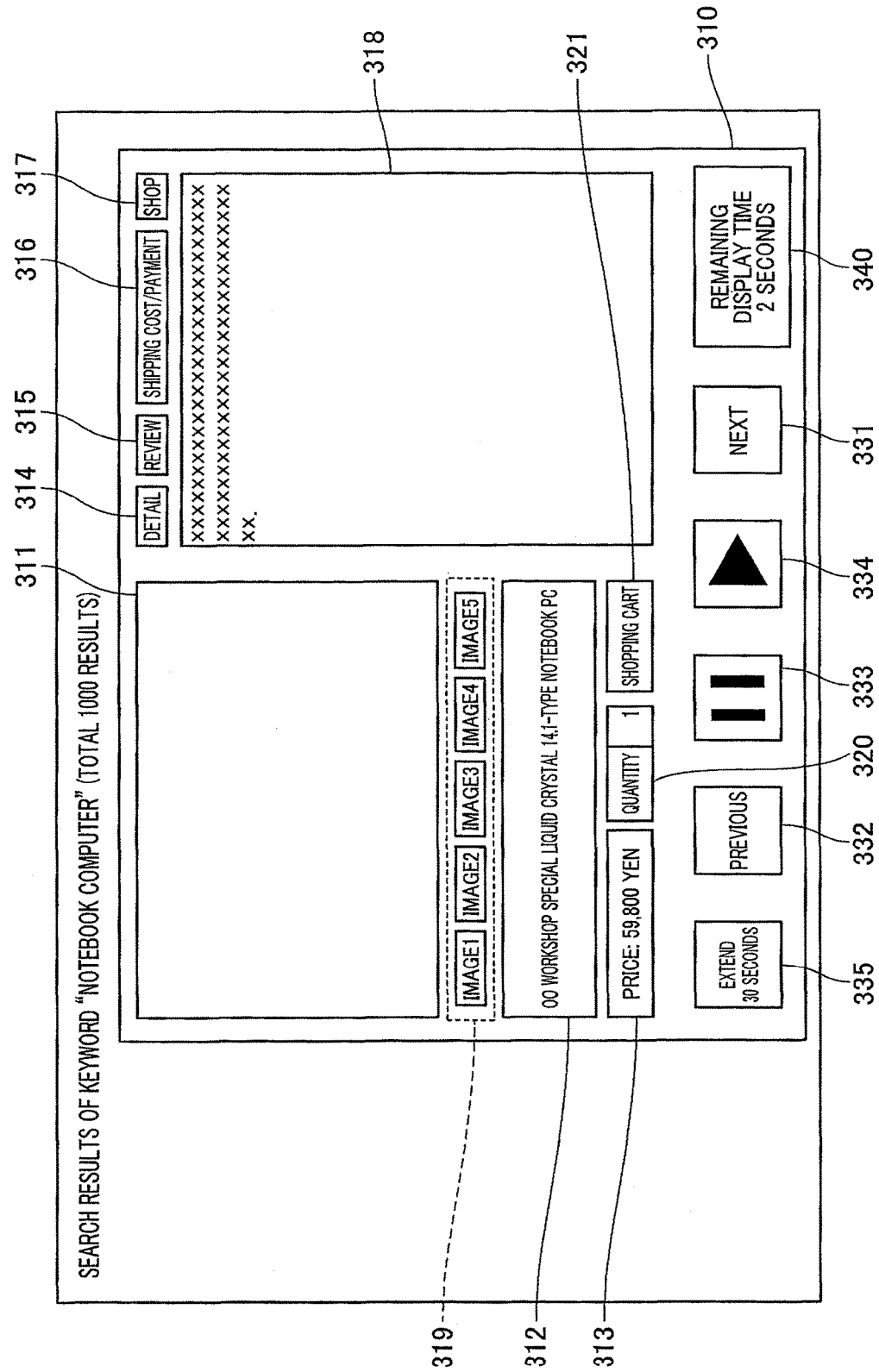
FIG. 15 is a diagram showing a screen display example of a search result page of the user terminal 2 according to a second embodiment.

In the second embodiment, a search result page shown in FIG. 15 is displayed on the display unit 32 of the user terminal 2.

As shown in FIG. 15, a slide show area 310 is displayed on the search result page. In the slide show area 310, information of one corresponding product is switched and displayed every time a predetermined switch time (for example, five seconds) has passed.

An image display section 311 is arranged on the upper left of the slide show area 310, and an image switch button group 319 for selecting an image displayed on the image display section 311 is arranged below the image display section 311. Corresponding images are displayed on the image display section 311 by selecting image switch buttons included in the image switch button group 319.

A name display section 312 is arranged below the image switch button group 319, and a price display section 313, a quantity input section 320, and a shopping cart button 321 are arranged below the name display section 312. The name display section 312 displays the name of the product, and the price display section 313 displays the price of the product. The quantity of purchase of the product can be input by the keyboard in the quantity input section 320, and the product can be registered in a shopping cart by further selecting the shopping cart button 321.

A product detail button 314, a review button 315, a shipping cost/payment button 316, and a shop button 317 are arranged on the upper right of the slide show area 310. An information display area 318 is arranged below the buttons 314 to 317. When the product detail button 314 is selected, details of the product are displayed in the information display area 318. When the review button 315 is selected, reviews of the product are displayed in the information display area 318. When the shipping cost/payment button 316 is selected, the shipping cost, the shipping method, the payment method (settlement method), and the like are displayed in the information display area 318. When the shop button 317 is selected, the name of the shop, the guidance information of the shop, links to the product detail pages of the products sold in the shop, and the like are displayed in the information display area 318.

A next button 331, a previous button 332, a pause button 333, a restart button 334, an extension button 335, and a remaining display time display section 340 are arranged below the slide show area 310. When the next button 331 is selected, the display is switched to the next product even if the switch time has not passed. When the previous button 332 is selected, the display is switched to the previous product. When the pause button 333 is selected, measurement of the switch time is suspended. When the restart button 334 is selected, the measurement of the time suspended by the section of the pause button 333 is restarted. When the extension button 335 is selected, the switch time is extended for a predetermined time (for example, 30 seconds). The remaining display time display section 340 displays remaining time of the switch time.

If the product information of the corresponding products displayed in the slide show can be displayed by narrowing down the product information to the product information of the products related to the product the user is interested in, the burden of the user in browsing can be reduced. Therefore, the shopping system S of the second embodiment specifies the product the user is interested in based on the details of the operation when the user is browsing the search result page. The product information of the corresponding products displayed on the search result pages are displayed by narrowing down the product information to the product information of the products related to the specified product.

To realize this, the shopping system S according to the second embodiment records the details of the operation when the user is browsing the search result pages, as in the first embodiment. Specifically, the type of the operation by the user (for example, click operation or drag operation), the target of the operation (for example, the product detail button 314), and the time of the operation are recorded.

Operation of the pause button 333 or the extension button 335 in the slide show area 310 can mean that the user at least has an interest in the operated product. Meanwhile, selection of the next button 331 just after the display in the slide show area 310 can mean that the user has no interest in the product. In this way, which product the user is interested in and which product the user is not interested in can be estimated from the details of the operation of the user when the search result pages are displayed. Therefore, the shopping system S according to the second embodiment specifies the product the user is interested in from the details of the operation of the user.

[2.2. Operation of Shopping System S]

A summary of operation of the shopping system S in displaying the search result pages will be described. FIG. 16 is a flow chart showing a process example of the shopping system S according to the second embodiment.

Figure 16:
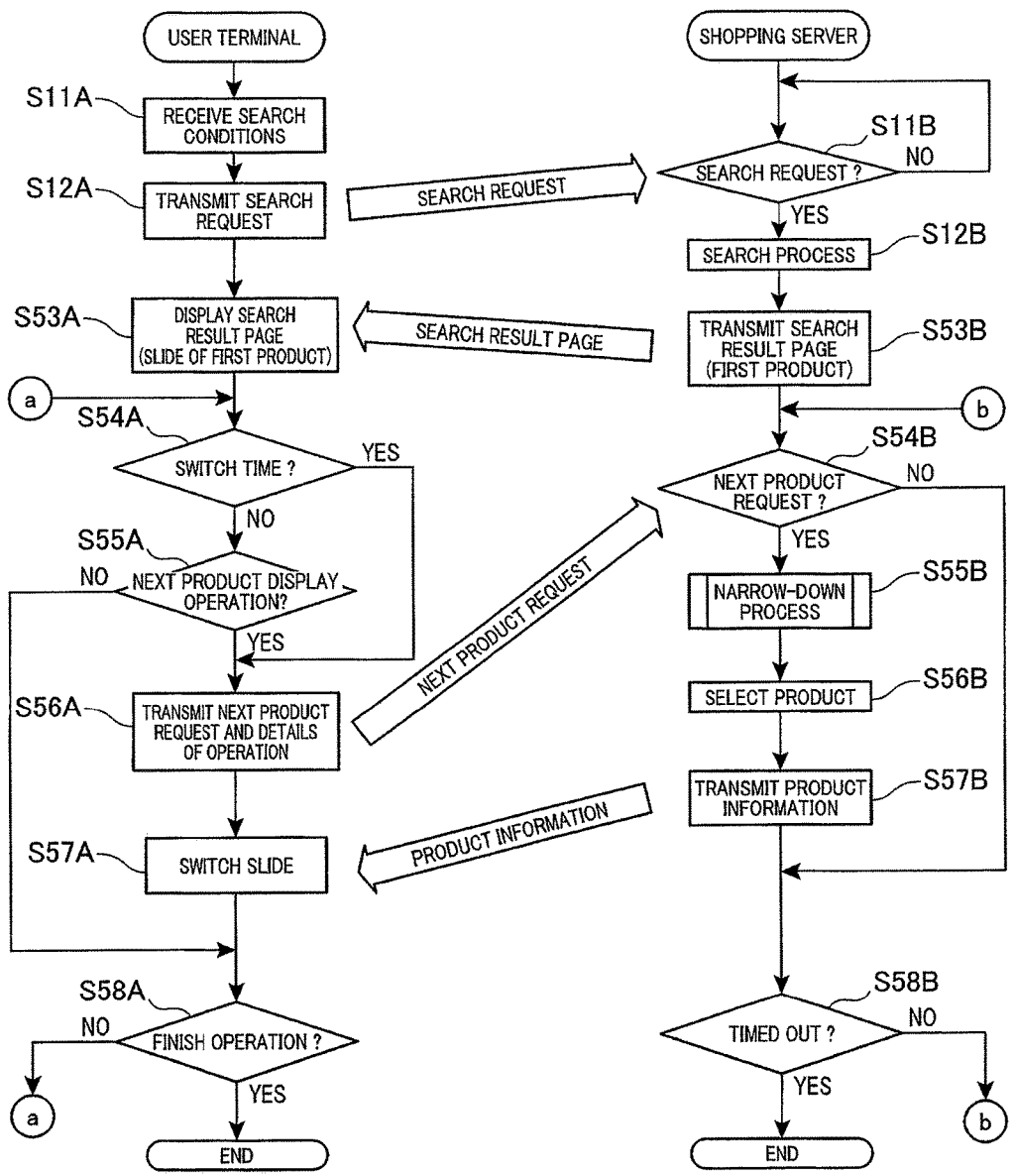
FIG. 16 is a flow chart showing a process example of the shopping system S according to the second embodiment.

As shown in FIG. 16, the process of step S11A and the process of step S12A by the system control unit 36 of the user terminal 2 as well as the process of step S11B and the process of step S12B by the system control unit 20 of the shopping server 1 are the same as the processes shown in FIG. 5 and will not be described.

When the search process is executed (step S12B), the system control unit 20 of the shopping server 1 transmits, to the user terminal 2, a search result page (example of "first display data") for displaying the information of a first corresponding product in the slide show area 310 (step S53B).

When the search result page is received, the system control unit 36 of the user terminal 2 causes the display unit 32 to display the search result page (step S53A). In this case, the slide show area 310 displays the product information of the first corresponding product. The system control unit 36 determines whether the predetermined switch time has passed since the display of the product information of the corresponding product on the search result page (step S54A). The system control unit 36 measures the switch time again every time the display of the slide show is switched. If the system control unit 36 determines that the switch time has passed (step S54A: YES), the system control unit 36 transmits a next product request and the user operation information indicating the details of the operation of the user to the shopping server 1 (step S56A). The system control unit 36 records the details of the operation of the user in the storage unit 34 after the reception of the search result page from the shopping server 1. The details of the operation indicated by the user operation information transmitted in step S56A at least includes details of the operation of the user when the product displayed in the slide show area 310 at the end of the switch time or at the selection of the next button 331 is displayed. Although the system control unit 36 transmits the next product request and the user operation information to the shopping server 1 in the process of step S56A, the next product request and the user operation information may not necessarily be transmitted at the same time. For example, the system control unit 36 may transmit the user operation information before or after the process of step S56A, separately from the next product request.

When the system control unit 36 determines that the switch time has not passed (step S54A: NO), the system control unit determines whether a next product display operation is detected (step S55A). The next product display operation is an operation for displaying the next product, and specifically, is an operation for selecting the next button 331. If the system control unit 36 determines that the next product display operation is not detected (step S55A: NO), the process moves to step S58A. On the other hand, if the system control unit 36 determines that the next product display operation is detected (step S55A: YES), the system control unit 36 transmits the next product request and the user operation information indicating the details of the operation to the shopping server 1 (step S56A).

Meanwhile, after the process of step S53B, the system control unit 20 of the shopping server 1 is in the standby state until the next product request is received or until the communication with the user terminal 2 has timed out (step S54B: NO, step S58B: NO). When the next product request and the user operation information indicating the details of the operation are received (step S54B: YES), the system control unit 20 of the shopping server 1 executes a narrow-down process (step S55B).

The narrow-down process by the system control unit 20 of the shopping server 1 will be described with reference to FIG. 17. FIG. 17 is a flow chart showing an example of the narrow-down process by the system control unit 20 according to the second embodiment.

The system control unit 20 of the shopping server 1 first calculates the degree of interest of the user for the corresponding product displayed in the slide show area 310 of the search result page when the next product request is transmitted (step S71). In this case, the system control unit 20 calculates the degree of interest of the user based on the details of the operation of the user indicated by the user operation information received along with the next product request in the process of step S54B of FIG. 16. Specifically, the system control unit 20 calculates the degree of interest of the user for the product based on the display time of the display of the information of the product in the slide show area 310. The system control unit 20 adds one point to the degree of interest of the corresponding product every 20 seconds of the display time.

The system control unit 20 then determines whether the degree of interest of the user calculated in the process of step S71 is greater than a predetermined threshold (for example, three points) (step S72). If the system control unit 20 determines that the degree of interest of the user is not higher than the predetermined threshold (step S72: NO), the process in the flow chart is finished. On the other hand, if the system control unit 20 determines that the degree of interest of the user is higher than the predetermined threshold (step S72: YES), the system control unit 20 acquires keywords (will be called "narrow-down keywords") associated with the product (step S73). Specifically, the system control unit 20 searches the keyword DB 104 based on the product ID of the product to acquire keywords associated with the product ID.

The system control unit 20 then narrows down the corresponding products based on the acquired narrow-down keywords (step S74). Specifically, the system control unit 20 acquires the keywords associated with the corresponding products from the keyword DB 104. The system control unit 20 narrows down the corresponding products to only the products associated with one or more same keywords as the narrow-down keywords. As in the first embodiment, the corresponding products may be narrowed down to only the products associated with equal to or more than a predetermined number (for example, two) of same keywords as the narrow-down keywords. An upper limit may be set for the number of times of narrowing down the corresponding products in the narrow-down process.

When the process of step S74 is finished, the system control unit 20 finishes the process in the flow chart.

Returning to FIG. 16, when the narrow-down process (step S55B) is finished, the system control unit 20 selects the product to be displayed on the user terminal 2 from the corresponding products (step S56B).

Patterns in selecting the product by the system control unit 20 in the process of step S56B will be described.

<Pattern 1: With Narrowing-Down>

If the next product request is received and the process of step S74 of the narrow-down process (see FIG. 17) is executed (if the degree of interest is higher than the predetermined threshold), the system control unit 20 selects the product with No. 1 order of display among the corresponding products narrowed down in the process of step S74.

<Pattern 2: Without Narrowing-Down>

If the next product request is received and the process of step S74 of the narrow-down process (see FIG. 17) is not executed (if the degree of interest is not higher than the predetermined threshold), the system control unit 20 selects the corresponding product next in the order of display following the corresponding product displayed on the user terminal 2.

The system control unit 20 of the shopping server 1 then transmits, to the user terminal 2, display data (the display data correspond to example of "second display data" if the product information is related to the product with No. 1 order of display among the corresponding products narrowed down in the process of step S74) for displaying the product information of the corresponding product selected in the process of step S56B (step S57B). If the system control unit 20 determines that the communication with the user terminal 2 has timed out (step S58B: YES), the process in the flow chart is finished.

Meanwhile, when the product information of the corresponding product is received from the shopping server 1, the system control unit 36 of the user terminal 2 switches the display of the slide show area 310 based on the product information (step S57A).

The system control unit 36 of the user terminal 2 then determines whether a finish operation is detected when the search result page is displayed (step S58A). Examples of the finish operation include a close operation for closing the Web browser and an operation for logging out from the shopping system S. If the system control unit 36 determines that the finish operation is not detected (step S58A: NO), the process moves to step S54A. On the other hand, if the system control unit 36 determines that the finish operation is detected (step S58A: YES), the process in the flow chart is finished.

As described, the product information of the corresponding products (example of "targets") is switched and displayed one by one (example of "predetermined number") on the search result page along with the passage of time in the second embodiment. The system control unit 20 of the shopping server receives the user operation information indicating the details of the operation of the user for the product displayed on the user terminal 2, calculates the degree of interest of the user for the displayed product based on the received user operation information, acquires the keywords associated with the product ID of the product if the calculated degree of interest of the user is higher than the predetermined threshold, and narrows down the corresponding products displayed on the search result pages based on the acquired keywords.

Therefore, according to the shopping server 1 of the second embodiment, the corresponding product is switched and displayed along with the passage of time. If the degree of interest of the user for the product corresponding to the displayed product information is high, the product information to be displayed is narrowed down to the product information of the products associated with the same keywords as the product that the user is highly interested in. More specifically, the user can check the products in a so-called slide show format, and if there is an interesting product in the products corresponding to the displayed product information, the user can check only the product information of the products related to the interesting product.

According to the shopping server 1 of the second embodiment, the system control unit 20 calculates a higher degree of interest of the user for a product with a longer display time displayed on the user terminal 2. Therefore, the product information displayed on the search result pages can be narrowed down to the product information corresponding to the products associated with the same keywords as the product with long browsing time and high degree of interest of the user.

The extension button 335 is arranged on the slide show area 310, and when the extension button 335 is selected, the switch time is extended for the predetermined time (for example, 30 seconds). The system control unit 20 extends the switch time (example of "display time") of the displayed product based on the detection of the operation of selecting the extension button 335. As a result, the display time becomes long, and the degree of interest of the user for the product with the extended display time is calculated high.

Therefore, according to the shopping server 1 of the second embodiment, the user can select the extension button 335 to slowly check the product when an interesting product is displayed. The high interest of the user for the product displayed when the extension button 335 is selected can be reflected on the calculation of the degree of interest.

[2.3. Sorting Process]

In the second embodiment, the product information of the corresponding products is displayed on the search result pages by narrowing down the products to the products related to the product the user is interested in. In place of this, the product information of the products related to the product the user is interested in may be preferentially displayed.

Figure 18:
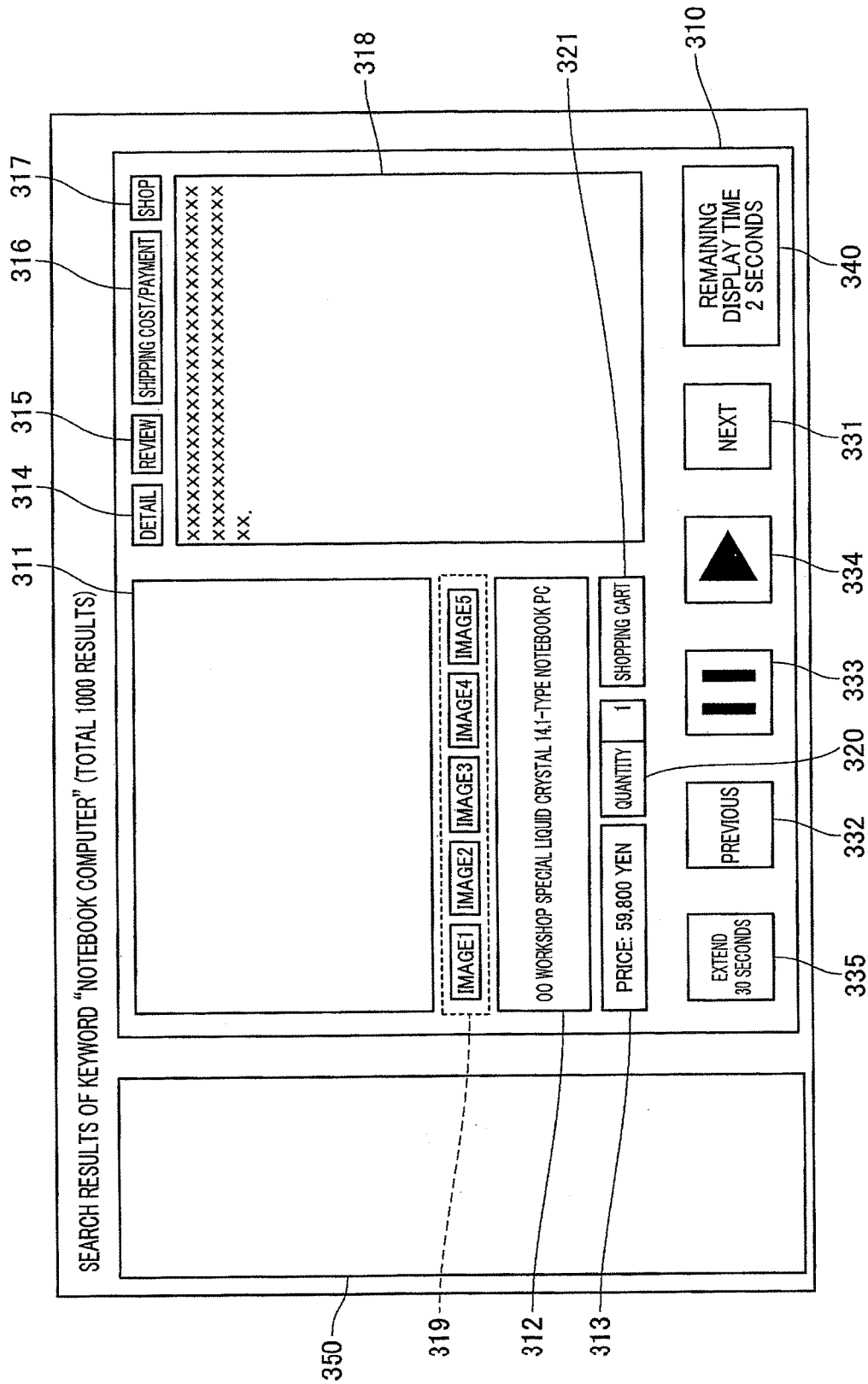
FIG. 18 is a diagram showing a screen display example of a search result page of the user terminal 2 according to the second embodiment.
Figure 19:
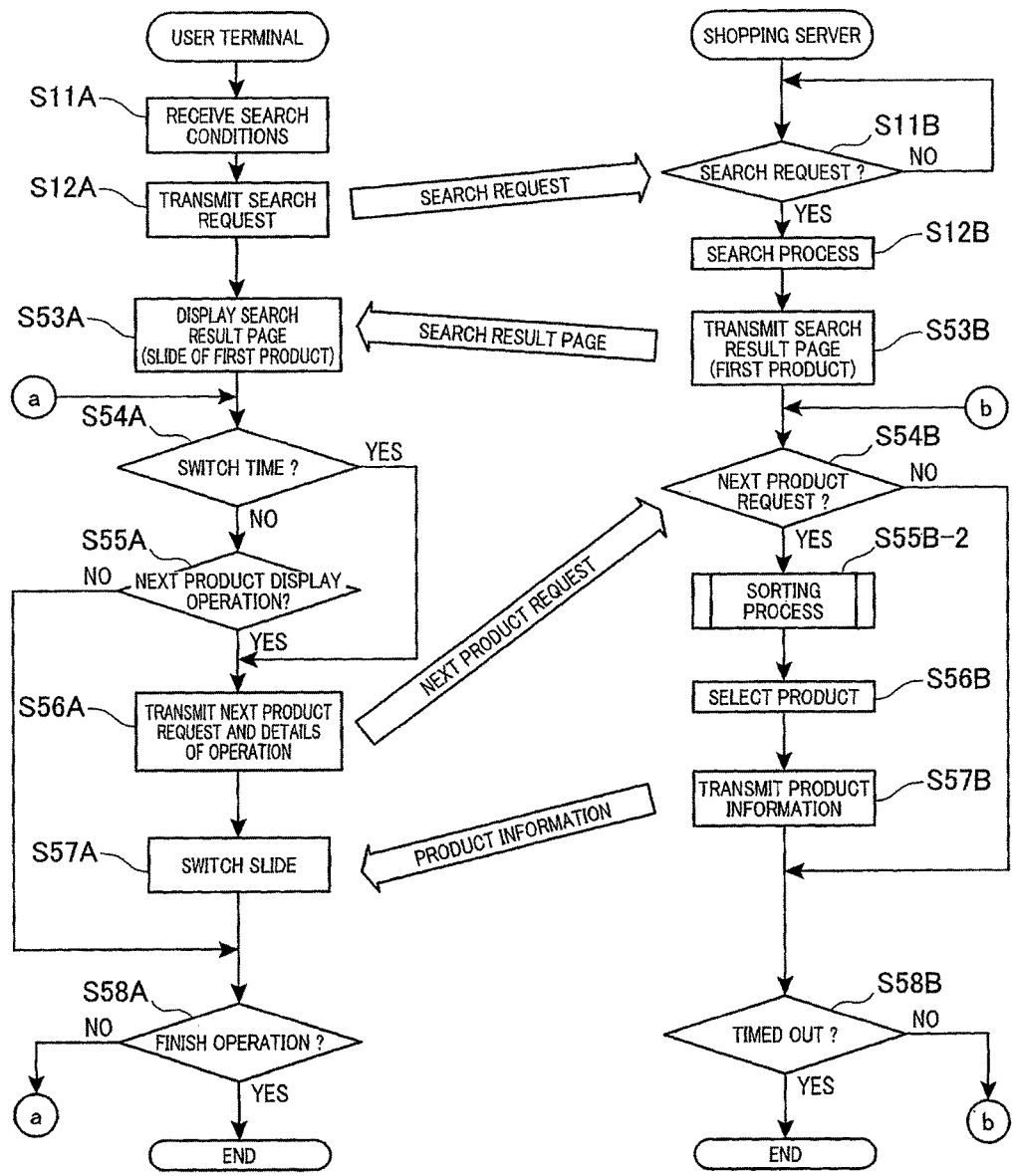
FIG. 19 is a flow chart showing a process example of the shopping system S according to the second embodiment.
Figure 20:
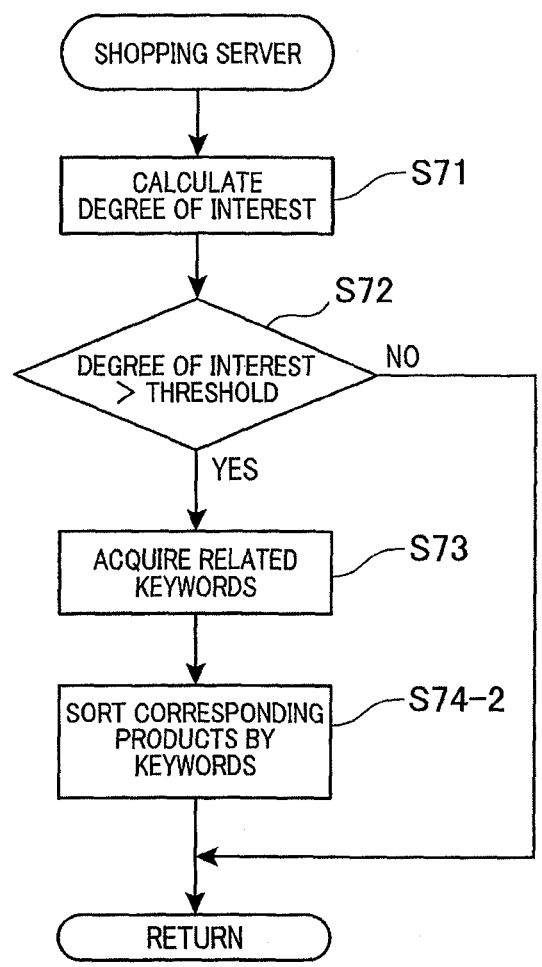
FIG. 20 is a flow chart showing a process example of the system control unit 20 of the shopping server 1 according to the second embodiment.

A case of preferentially displaying the product information of the products related to the product the user is interested in on the search result pages will be described with reference to FIG. 18 to FIG. 20. Differences from the case of displaying the product information by narrowing down the product information to the product information of the products related to the product the user is interested in will be mainly described. FIG. 18 is a diagram illustrating a screen display example when the search result page is displayed. FIG. 19 is a flow chart illustrating a process example of the shopping system S when the product information of the products related to the product the user is interested in is preferentially displayed. FIG. 20 is a flow chart illustrating an example of the sorting process by the system control unit 20 when the product information of the products related to the product the user is interested in is preferentially displayed.

As shown in FIG. 18, a sort result display area 350 is displayed on the search result page. As in the first embodiment, information related to the processing result when the sorting process is executed is displayed in the sort result display area 350.

As shown in FIG. 19, when a search process is executed (step S12B), the system control unit 20 of the shopping server 1 transmits, to the terminal 2, a search result page (example of "first display data") for displaying the product information of the first corresponding product in the slide show area 310 (step S53B).

In a process of step S53A of FIG. 19, when the search result page transmitted by the system control unit 20 of the shopping server 1 is received, the system control unit 36 of the user terminal 2 causes the display unit 32 to display the search result page (step S53A). At this time, the product information of the corresponding product with the No. 1 order of display is displayed in the slide show area 310. The order of display is determined by a preset order of sort (initial). The user can also set the order of sort (initial). An example of the order of sort (initial) that can be set includes an ascending order (or a descending order) of the product ID. An ascending order (or a descending order) of the product name, the price, or the number of reviews may also be set.

In a process of step S55B-2 of FIG. 19, when the next product request and the user operation information indicating the details of the operation are received (step S54B: YES), the system control unit 20 of the shopping server 1 executes a sorting process (step S55B-2). The sorting process by the system control unit 20 of the shopping server 1 will be described with reference to FIG. 20. In a process of step S73 of FIG. 20, the system control unit 20 acquires keywords (will be called "narrow-down keywords for sorting") associated with a product with the degree of interest of the user determined to be higher than the predetermined threshold (step S73). Specifically, the system control unit 20 searches the keyword DB 104 based on the product ID of the product and acquires the keywords associated with the product ID.

The system control unit 20 then sorts the corresponding products based on the acquired sorting keywords (step S74-2). Specifically, the system control unit 20 acquires the keywords associated with the corresponding products from the keyword DB 104. The system control unit 20 updates the order of sort so that the order of display of the products associated with the same keywords as the sorting keywords becomes higher, and the order of display of the corresponding products is determined based on the updated order of sort (therefore, the corresponding products are sorted). As in the first embodiment, if there are products associated with a plurality of keywords among the sorting keywords when a plurality of sorting keywords are acquired, the order of display of the products with more associated keywords is raised. In the determination of the order of display of the corresponding products based on the updated order of sort, the order of display between the products is arbitrary if there are a plurality of products in the same conditions (for example, the order of sort (initial) may be followed).

Returning to FIG. 19, when the sorting process (step S55B) is finished, the system control unit 20 selects the product to be displayed on the user terminal 2 based on the current order of display (step S56B).

Patterns in selecting the product by the system control unit 20 in the process of step S56B will be described.
<Pattern 1: With Sorting Process>

If the next product request is received and the process of step S74 of the sorting process (see FIG. 20) is executed (if the degree of interest is higher than the predetermined threshold), the system control unit 20 selects the product with the No. 1 order of display determined in the process of step S74.
<Pattern 2: Without Sorting Process>

If the next product request is received and the process of step S74 of the sorting process (see FIG. 20) is not executed (if the degree of interest is not higher than the predetermined threshold), the system control unit 20 selects the corresponding product next in the order of display following the corresponding product displayed on the user terminal 2.

The system control unit 20 of the shopping server 1 then transmits, to the user terminal 2, the display data (the display data correspond to example of "second display data" if the product information is related to the product with the No. 1 order of display determined in the process of step S74) for displaying the product information of the corresponding product selected in the process of step S56B (step S57B). If the system control unit 20 determines that the communication with the user terminal 2 has timed out (step S58B: YES), the process in the flow chart is finished.

As described, when the product information of the products related to the product the user is interested in is preferentially displayed in the second embodiment, the corresponding products (example of "targets") are switched and displayed one by one (predetermined number) on the search result page along with the passage of time. The system control unit 20 of the shopping server 1 receives the user operation information indicating the details of the operation of the user for the product corresponding to the product information displayed on the user terminal 2, calculates the degree of interest of the user for the displayed product based on the received user operation information, acquires the keywords associated with the product ID of the product if the calculated degree of interest of the user is higher than the predetermined threshold, determines the order of display of the corresponding products based on the acquired keywords, and transmits the search result pages for displaying the product information of the corresponding products in the determined order of display.

Therefore, according to the shopping server 1 when the product information of the products related to the product the user is interested in is preferentially displayed in the second embodiment, the corresponding products are switched and displayed along with the passage of time, and if the degree of interest of the user for the product corresponding to the displayed product information is high, the product information of the products associated with the same keywords as the product the user is highly interested in is preferentially displayed. Therefore, the user can check the products in a so-called slide show format, and if there is an interesting product among the products corresponding to the displayed product information, the user can preferentially check the product information of the products related to the interesting product.

According to the shopping server 1 when the product information of the products related to the product the user is interested in is preferentially displayed in the second embodiment, the system control unit 20 calculates a higher degree of interest of the user for a product with a longer display time displayed on the user terminal 2. Therefore, the product information of the products associated with the same keywords as the product with long browsing time and high degree of interest of the user can be preferentially displayed.

[2.4. Change in Display Mode]

In the second embodiment, the product information of the corresponding products displayed on the search result pages is displayed by narrowing down the product information to the product information of the products related to the product the user is interested in (products with the same keywords as the product the user is interested in). In place of this, (1) the display mode of the product information of the products related to the product the user is interested in may be different from the display mode of the product information of the products related to other products (products other than the product the user is interested in), or (2) a display mode may be adopted in which the product information of the products related to other products (products other than the product the user is interested in) is collapsed and not displayed until a collapse cancellation operation of the user is detected. Examples of (1) include enlarging the display character size of the product information of the products related to the product the user is interested in, changing the color of the characters or background color of the part displaying the product information, and applying a mask process to the part displaying the product information of the products related to the products other than the product the user is interested in. In this way, even if the product information of the products related to the product the user is interested in is preferentially displayed, the burden of the user in browsing can be reduced.

[2.5. Modified Examples]

Modified examples of the second embodiment will be described.

[2.5.1. Method of Calculating Degree of Interest of User: The Number of Operations of Various Buttons]

Operation of selecting various buttons (the image switch buttons, the product detail button 314, the review button 315, the shipping cost/payment button 316, the shop button 317, the pause button 333, and the extension button 335) displayed in the slide show area 310 can mean that the user at least has an interest in the product displayed on the search result page. Therefore, in a modified example, the degree of interest of the user for the product is calculated based on the number of selections of the various buttons. For example, the system control unit 20 can add two points to the degree of interest of the user for the product each time one of the buttons is selected. In this case, the product information displayed on the search result page can be narrowed down to the product information of the products associated with the same keywords as the product with a large number of operations for various buttons and with a high degree of interest of the user. When the product information of the products related to the product the user is interested in is preferentially displayed, the product information of the products associated with the same keywords as the product with a large number of operations for the various buttons and with a high degree of interest of the user can be preferentially displayed.

[2.5.2. Method of Calculating Degree of Interest of User: The Number of Link Operations]

In the second embodiment, the product information of the product is displayed in the information display area 318 when the product detail button 314, the review button 315, the shipping cost/payment button 316, or the shop button 317 is selected. In a modified example as an alternative, for example, a product link, a review link, a shipping cost/payment link, and a shop link (the product link, the review link, the shipping cost/payment link, and the shop link are examples of "link information") for displaying detail pages, such as a product detail page, a review detail page, a shipping cost/payment detail page, and a shop detail page, may be arranged in the slide show area 310 as in the first embodiment. In this way, the user can acquire the related information corresponding to the product the user is interested in based on the links.

The degree of interest of the user for the product may be calculated according to the number of operations of the links. Specifically, as in the first embodiment, the system control unit 20 calculates the degree of interest of the user for the product based on the number of selections of the links (the product link, the review link, the shipping cost/payment link, and the shop link) displayed in the slide show area 310. For example, the system control unit 20 can add two points to the degree of interest of the user for the product for each of the number of selections of the links. In this case, the product information displayed on the search result pages can be narrowed down to the product information corresponding to the products associated with the same keywords as the product with a large number of operations for the links and with a high degree of interest of the user. When the product information of the products related to the product the user is interested in is preferentially displayed, the product information of the products associated with the same keywords as the product with a large number of operations for the links and with a high degree of interest of the user can be preferentially displayed.

[2.5.3.1. Narrowing Down by Narrow-Down Keywords]

Figure 17:
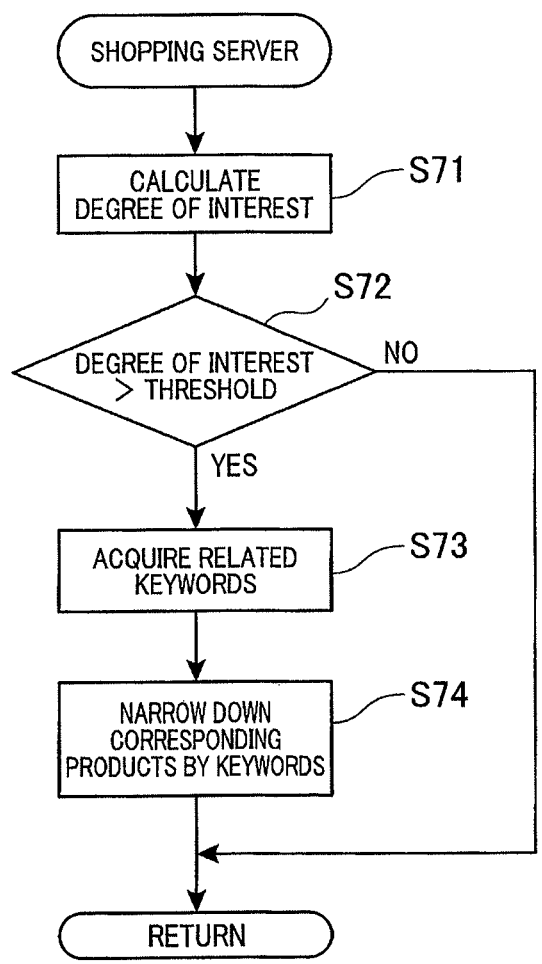
FIG. 17 is a flow chart showing a process example of the system control unit 20 of the shopping server 1 according to the second embodiment.

In the second embodiment, the corresponding products are narrowed down to the products associated with at least one same keyword as the narrow-down keywords in the process of step S74 of FIG. 17. In a modified example, if there are a plurality of narrow-down keywords, the corresponding products may be narrowed down to the products associated with all same keywords as the narrow-down keywords.

In another modified example, each product may be associated in advance with keywords in each genre, and the narrow-down keywords may be acquired based on the product and the genre the user is interested in to narrow down the corresponding products by the acquired narrow-down keywords. Specifically, a digital camera is associated with keywords related to a maker genre and a spec genre. In place of the product detail button 314, a maker button for displaying the detail information related to the maker in the information display area 318 and a spec button for displaying the detail information related to the spec in the information display area 318 are arranged in the slide show area 310. If, for example, there are more operations for the maker button than the operations for the spec button, the system control unit 20 determines that the user is interested in the maker genre and acquires the keywords of the maker genre as the narrow-down keywords. In this case, the corresponding products can be narrowed down to the products of the same maker as the product the user is interested in.

[2.5.3.2. Sort by Sorting Keywords]

If a plurality of sorting keywords are acquired (step S73 of FIG. 20) when the product information of the products related to the product the user is interested in is preferentially displayed, the products associated with more sorting keywords are preferentially displayed (step S74-2 of FIG. 20). In a modified example, each product may be associated in advance with keywords in each genre, and the order of display of the corresponding products may be determined based on the product and the genre the user is interested in.

Specifically, the digital camera is associated with keywords related to the maker genre and the spec genre. In place of the product detail button 314, the maker button for displaying the detail information related to the maker in the information display area 318 and the spec button for displaying the detail information related to the spec in the information display area 318 are arranged in the slide show area 310. At this time, the system control unit 20 specifies the product the user is interested in based on the operation of the user as described above and specifies the genre the user is interested in. For example, if there are more operations for the maker button than the operations for the spec button, the system control unit 20 determines that the user is interested in the maker genre. The system control unit 20 sets No. 1 display priority to the products that are associated with the keywords corresponding to the specified product and that are associated with the keywords corresponding to the specified genre. The product information of the products associated with more sorting keywords among the products with the No. 1 display priority may be further preferentially displayed.

[2.5.4. Manual Slide Show]

In the second embodiment, the product displayed in the slide show area 310 is switched every time the predetermined switch time has passed. In a modified example as an alternative, the product displayed in the slide show area 310 may be switched only if a next product display operation by the user is detected. In this case, the corresponding product is switched and displayed based on the next product display operation of the user, and if the degree of interest of the user for the displayed product is high, the products to be displayed are narrowed down to the products related to the product the user is highly interested in. More specifically, the user can check the product information at the pace of the user, and if there is an interesting product in the displayed products, the user can check only the product information of the corresponding products related to the interesting product. When the product information of the products related to the product the user is interested in is preferentially displayed, the corresponding product is switched and displayed based on the next product display operation of the user, and if the degree of interest of the user for the displayed product is high, the order of display of the products related to the product the user is highly interested in is raised. More specifically, the user can check the products at the pace of the user, and if there is an interesting product in the displayed products, the user can preferentially check the product information of the corresponding products related to the interesting product.

[2.5.5.1. Target of Narrow-Down Process]

As described, every time the next product request is received, the system control unit 20 calculates the degree of interest of the user for the product displayed on the user terminal 2 in the narrow-down process (step S55B of FIG. 16) and narrows down the corresponding products searched in the search process (step S12B of FIG. 16) if the degree of interest is higher than the predetermined threshold. In a modified example as an alternative, the products already displayed in the slide show may be removed from the target of the narrow-down process as described in a modified example of the first embodiment. When the products already displayed in the slide show are removed from the target of the narrow-down process, the user does not check the same products again and again, and the burden of the user in browsing can be reduced.

[2.5.5.2. Target of Sorting Process]

As described, when the product information of the products related to the product the user is interested in is preferentially displayed, the system control unit 20 calculates the degree of interest of the user for the product displayed on the user terminal 2 every time the next product request is received and applies the sorting process (step S55B-2 of FIG. 19) to all corresponding products searched in the search process (step S12B of FIG. 19) if the degree of interest is higher than the predetermined threshold. In a modified example as an alternative, the products already displayed in the slide show may be removed from the target of the sorting process as described in a modified example of the first embodiment. When the products already displayed in the slide show are removed from the target of the sorting process, the user does not have to check the same products again and again, and the burden of the user in browsing can be reduced.

[2.5.6. Cancellation of Narrowing Down]

If the next product display operation is performed just after (for example, three seconds) the display of the corresponding products narrowed down in the narrow-down process (step S55B of FIG. 16) in the slide show area 310, this can mean that the narrowing-down in the narrow-down process is not performed as the user has expected. In a modified example, if the next product display operation is performed within a predetermined time (for example, three seconds) from the slide show display of the products narrowed down in the narrow-down process, the corresponding products in the state before the last narrow-down process are displayed in the slide show. The corresponding products in the state before the last narrow-down process are products searched in the search process (step S12B) if the last narrow-down process is the first narrow-down process. The corresponding products in the state before the last narrow-down process are products narrowed down in an "n−1"th narrow-down process if the last narrow-down process is an n-th (natural number two or greater) or subsequent narrow-down process. The state before any of the narrow-down processes may be restored, instead of the sate before the last narrow-down process. According to the modified example, the continuation of the display of the products narrowed down in a user's unintended format can be prevented.

[2.5.7. The Number of Display Items]

Although the corresponding products are displayed one by one in the slide show area 310 in the present embodiment, an arbitrary predetermined number of corresponding products may be displayed each time. For example, the previously displayed product and the product to be displayed next may be displayed on the left and right of the slide show area 310.

[2.5.8. Generation of Keyword DB 104]

As described in a modified example of the first embodiment, the manger of the shopping server 1 may generate the keyword DB 104, or the system control unit 20 of the shopping server 1 may generate the keyword DB 104 in the second embodiment. To describe the latter in detail, when, for example, the search result page is transmitted (step S53B), the system control unit 20 may access the product DB 103 to acquire appropriate keywords from the product information based on the product ID of the product displayed on the search result page and may register the keywords in the keyword DB 104 in association with the product ID. When the next product request is received (step S54B: YES), the system control unit 20 may access the product DB 103 to acquire appropriate keywords from the product information based on the product ID of the product displayed on the search result page and may register the keywords in the keyword DB 104 in association with the product ID. If the time from the transmission of the search result page (step S53B) or the transmission of the product information (step S57B) to the reception of the next product request (step S54B: YES) exceeds a predetermined time (for example, 30 seconds), the system control unit 20 may access the product DB 103 to acquire appropriate keywords from the product information based on the product ID of the product displayed on the search result page and may register the keywords in the keyword DB 104 in association with the product ID. The system control unit 20 may further receive click information indicating selection (click) of the image switch buttons, the product detail button 314, the review button 315, the shipping cost/payment button 316, the shop button 317, the pause button 333, and the extension button 335 of the search result page (see FIG. 15 and FIG. 18). When the click information is received, the system control unit 20 may access the product DB 103 to acquire appropriate keywords from the product information based on the product ID of the product displayed on the search result page and may register the keywords in the keyword DB 104 in association with the product ID.

[2.5.9. Acquisition of Related Keywords]

In the acquisition of the related keywords in the process of step 73 of FIG. 17 or FIG. 20, the system control unit 20 may not only search the keyword DB 104 based on the product ID of the product with the degree of interest of the user determined to be higher than the predetermined threshold in the process of step S72 to acquire the keywords associated with the product ID, but may also refer to the thesaurus DB to acquire synonyms of the keywords associated with the product ID as the related keywords. The thesaurus DB may be arranged on the storage unit 15, or a thesaurus DB arranged on a storage unit of an apparatus other than the shopping server 1 may be referenced.

In the acquisition of the related keywords in the process of step 36 of FIG. 6 or FIG. 11, the system control unit 20 may acquire the related product ID from the product DB 103 based on the product ID of the product extracted in the process of step S35 and then search the keyword DB 104 based on the acquired related product ID to acquire the keywords associated with the related product ID as the related keywords.

[2.6. First Display Data and Second Display Data]

The "first display data" of the present invention is a concept including not only the search result page transmitted in the process of step S13B executed following the process of step S12B of FIG. 16 or FIG. 19, but is a concept also including the search result page ("second display data" of the present invention) transmitted in the process of step S13B executed following the process of step S18B. More specifically, in the present invention, a process in which generated second display data serves as new first display data, and new second display data is further generated based on the operation information of the user for the new first display data can be repeated. The information displayed in the second display data is further narrowed down or sorted according to the repetition of the process.

3. Third Embodiment

A third embodiment of the present invention will be described. The third embodiment is an embodiment in which the present invention is applied to a display apparatus (example of "information display apparatus") that displays image information.

[3.1. Configuration of Display Apparatus]

A configuration of a display apparatus 500 will be described with reference to FIG. 21.

Figure 21:
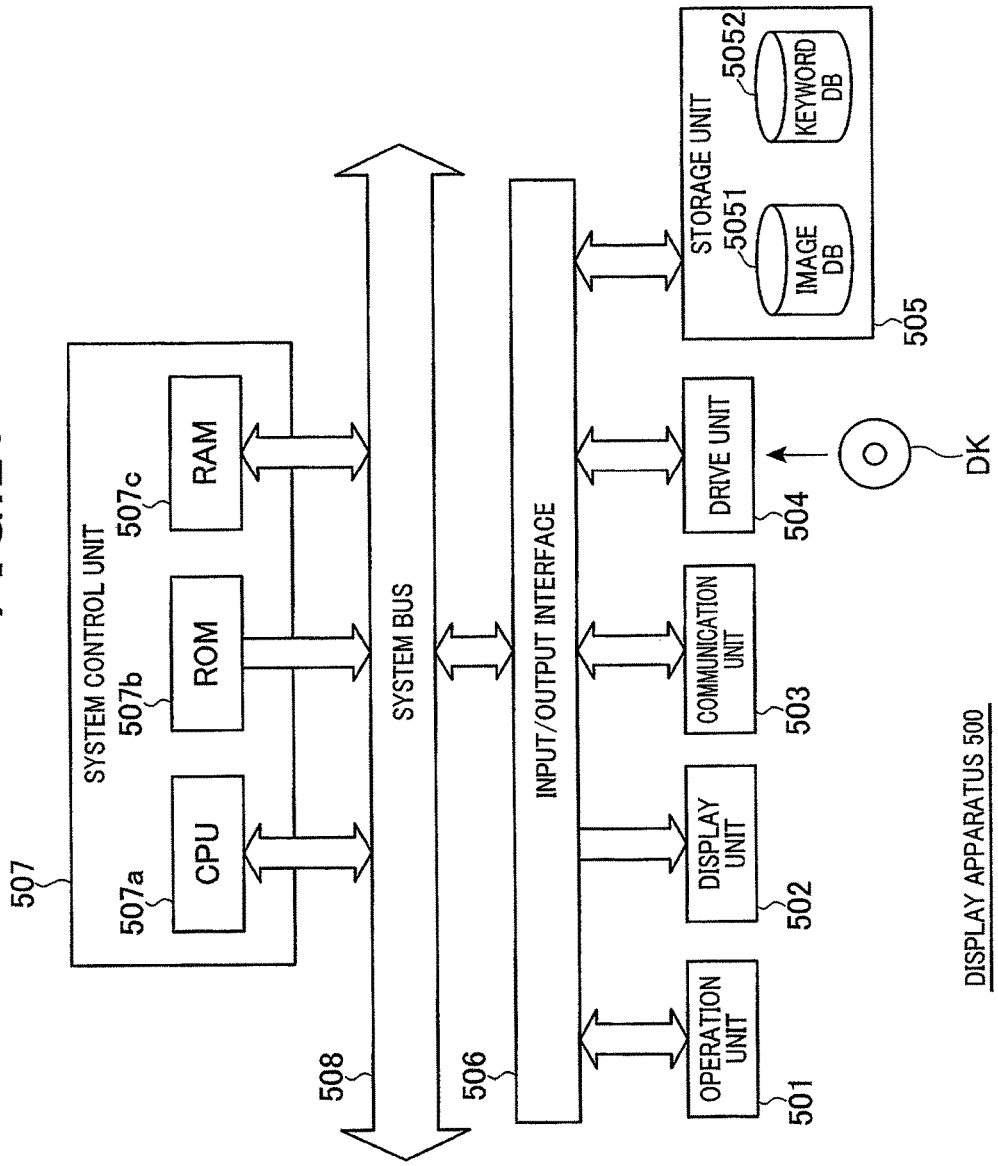
FIG. 21 is a block diagram showing an example of a general configuration of a display apparatus 500 according to a third embodiment.

As shown in FIG. 21, the display apparatus 500 includes an operation unit 501, a display unit 502, a communication unit 503, a drive unit 504, a storage unit 505, an input/output interface 506, and a system control unit 507. The system control unit 507 and the input/output interface 506 are connected through a system bus 508.

The operation unit 501, the display unit 502, the communication unit 503, the drive unit 504, and the storage unit 505 correspond to the operation unit 11, the display unit 12, the communication unit 13, and the storage unit 15 of the shopping server 1 in the first embodiment, respectively. Therefore, the overlapping parts will not be described here.

Various databases, such as an image DB 5051 and a keyword DB 5052, are constructed in the storage unit 505 (example of "storage means").

Information (example of "information of targets") related to images of athletes (hereinafter, "athlete images", example of "targets that can be recognized by a user"), such as image IDs as identification information of the images, image data for displaying the images, tag information (for example, metadata), and related image IDs), is registered in the image DB 5051 in association with each image. An image related to the image identified by the image ID is registered for the related image ID.

Keywords (example of "information of targets") related to the athlete images are registered in the keyword DB 5052 in association with each image ID. Words expressing the name of the athlete, age, sex, athletic event, organization of the athlete, appearance of the athlete (such as physical size and length of hair), and the like are registered as the keywords related to the athlete image. Words expressing the characteristics (for example, statistical characteristics such as composition and tone) of the athlete image are also registered. Not all the words are registered for each athlete image, but at least part of the words is registered. Although the product DB 103 and the keyword DB 104 are separated in the present embodiment, a DB integrating the product DB 103 and the keyword DB 104 based on the product ID may also be used.

The storage unit 505 stores a predetermined OS and application software (will be called "image display application") for displaying the athlete images on the display unit 502. The image data registered in the image DB 5051, the keywords registered in the keyword DB 5052, or various programs may be acquired from, for example, another server apparatus through a network or may be recorded in a disk DK, such as a CD-ROM, and read through the drive unit 504.

The system control unit 507 includes a CPU 507a, a ROM 507b, a RAM 507c, and the like. The CPU 507a reads and executes various software programs stored in the ROM 507b and the storage unit 507, and in this way, the system control unit 507 functions as a first display data generation means, a first display control means, an acquisition means, a calculation means, a specifying means, a second display data generation means, and a second display control means.

[3.2. Display of Athlete Images]

A display mode of the athlete images when the image display application is launched in the display apparatus 500 will be described with reference to FIG. 22.

When the image display application is launched, the display apparatus 500 generates display data for displaying a list of all athlete images registered in the image DB 5051 and displays the display data on the display unit 502. FIG. 22 is a diagram showing a screen display example in the operation of the image display application.

Figure 22:
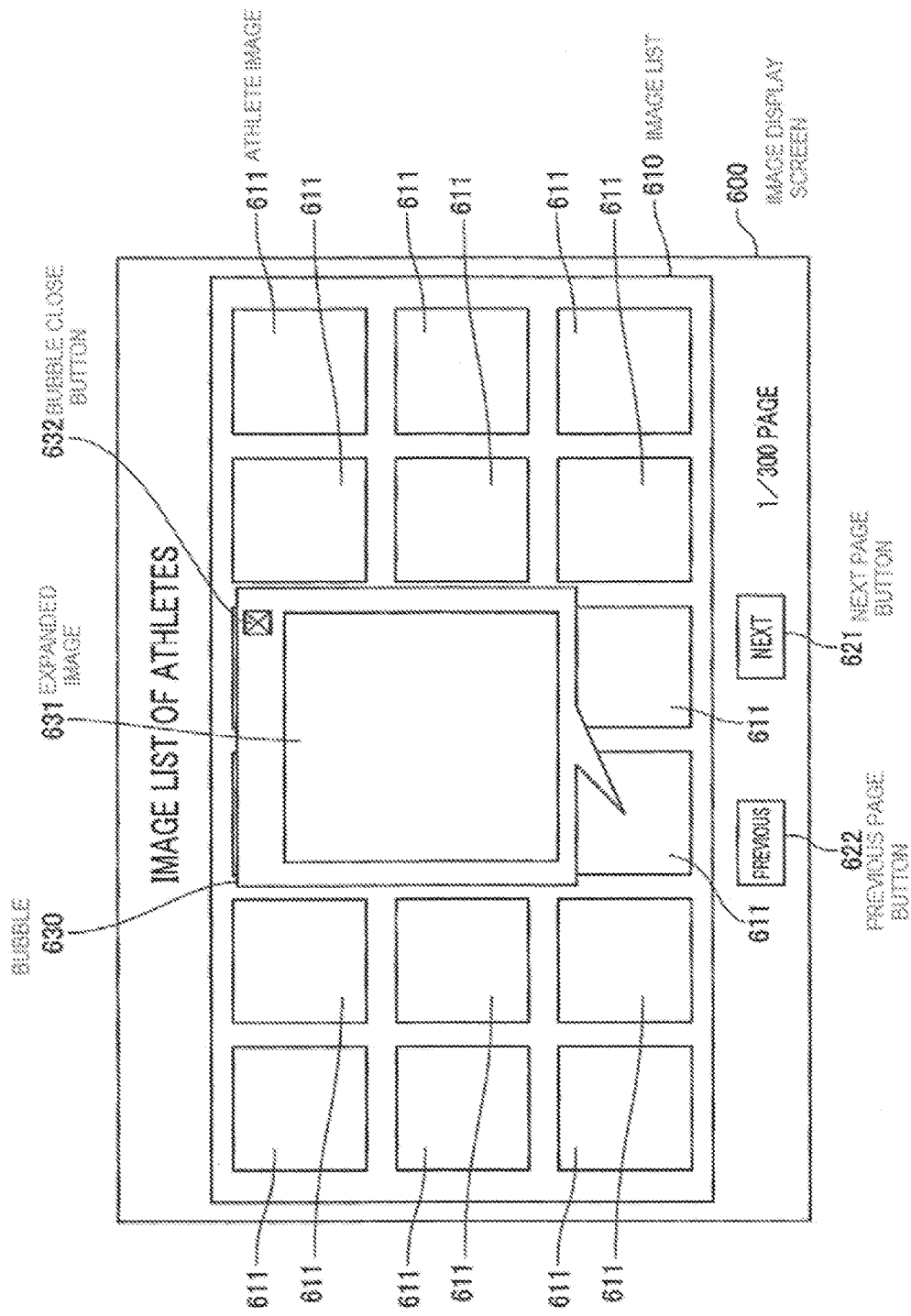
FIG. 22 is a diagram showing a display example of an image display screen of the display apparatus 500 according to the third embodiment.

As shown in FIG. 22, an image display screen 600 for displaying images to be displayed includes an image list 610, a next page button 621, and a previous page button 622. The image data of the images to be displayed is divided into a plurality of pages equivalent to the number of display items (18 in the example of FIG. 22) and displayed on the image display screen 600.

Athlete images 611 equivalent to the number of display items are displayed on the image list 610. The athlete images 611 can be selected (for example, clicked) by a mouse and the like. A bubble 630 is displayed when the user selects the athlete image 611. An expanded image 631 of the selected athlete image 611 is displayed in the bubble 630. A bubble close button 632 is arranged in the bubble 630, and the bubble 630 is closed when the user selects the bubble close button 632.

When the user selects the next page button 621 or the previous page button 622, an athlete image group different from the athlete image group displayed on the image list 610 is displayed on the image list 610. The order of display (for example, ascending order of image ID) of the images to be displayed is set in the display apparatus 500 (however, the user can also set the order of display), and 18 images are sequentially displayed on each page. When the next page button 621 is selected, a page to be displayed following the currently displayed page is displayed based on the order of display. Meanwhile, when the previous page button 622 is selected, a page to be displayed prior to the currently displayed page is displayed.

If the image data of the athlete images displayed on the image display screen 600 can be displayed by narrowing down the image data to image data of athlete images related to an athlete image the user is interested in, the burden of the user in browsing can be reduced. Therefore, the display apparatus 500 of the present embodiment specifies the athlete image the user is interested in based on the details of the operation when the user is browsing the athlete images. The image data of the images to be displayed are displayed by narrowing down the image data to image data of the athlete images related to the specified athlete image.

To realize this, the display apparatus 500 records the details of the operation when the user is browsing the image display screen 600. Specifically, the type of the operation by the user (for example, click operation or drag operation), the target of the operation (for example, the athlete images 611), the time of the operation, and the like are recorded. The display apparatus 500 specifies the athlete image the user is interested in from the details of the operation of the user.

[3.3. Operation of Display Apparatus 500]

Figure 23:
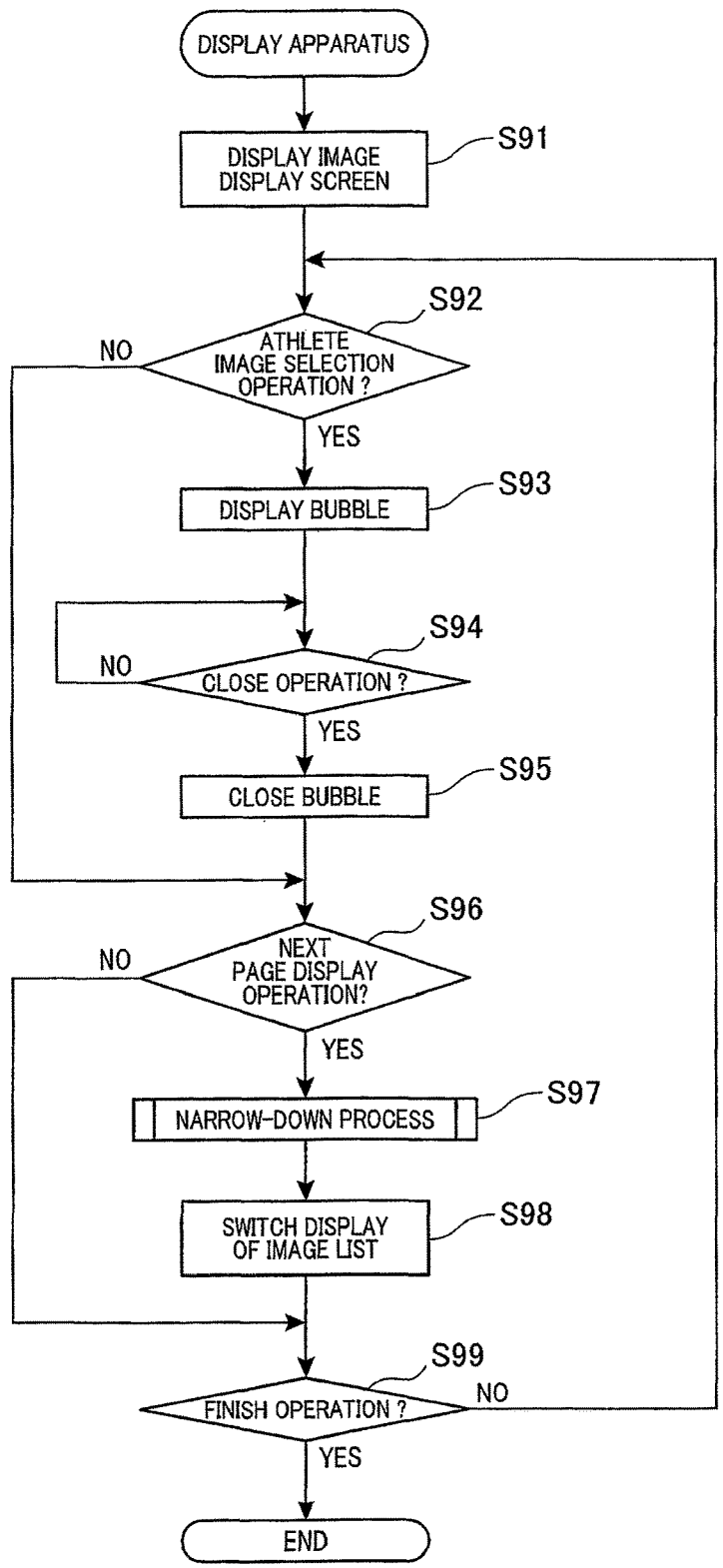
FIG. 23 is a flow chart showing a process example of a system control unit 507 of the display apparatus 500 according to the third embodiment.
Figure 24:
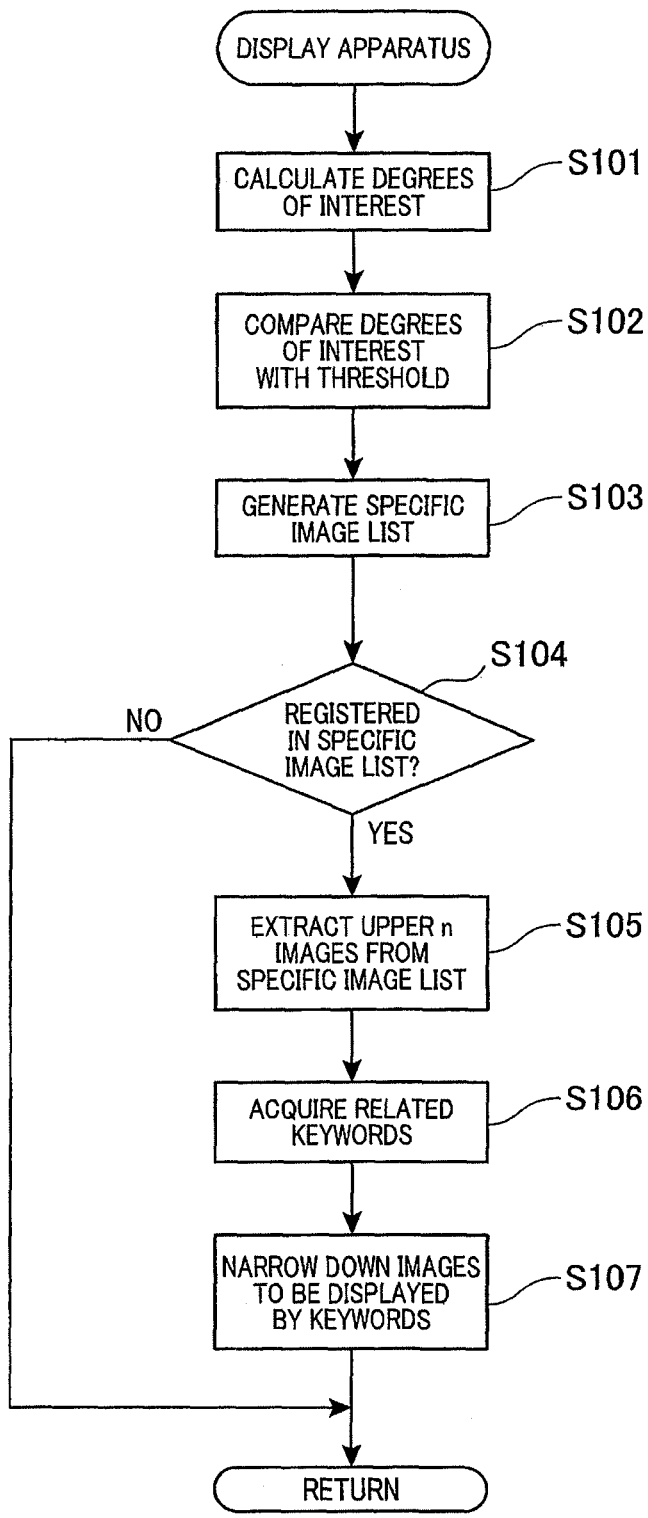
FIG. 24 is a flow chart showing a process example of the system control unit 507 of the display apparatus 500 according to the third embodiment.

A summary of operation of the display apparatus 500 in displaying the image display screen 600 will be described. FIG. 23 and FIG. 24 are flow charts showing a process example of the display apparatus 500 according to the third embodiment.

As shown in FIG. 23, when the system control unit 507 of the display apparatus 500 detects a launching operation of the image display application by the user, the system control unit 507 generates display data (first display data) for displaying a list of athlete images and causes the display unit 502 to display the image display screen 600 (step S91). In this case, the system control unit 507 causes the image list 610 to display 18 athlete images to be displayed on the first page based on the order of display.

The system control unit 507 then determines whether an operation of selecting the athlete image 611 is detected (step S92). If the system control unit 507 determines that the operation of selecting the athlete image 611 is not detected (step S92: NO), the process moves to step S96. On the other hand, if the system control unit 507 determines that the operation of selecting the athlete image 611 is detected (step S92: YES), the system control unit 507 displays the bubble 630 displaying the expanded image 631 of the selected athlete image 611 (step S93).

When the bubble 630 is displayed, the system control unit 507 then determines whether a close operation is detected (step S94). The close operation is an operation of selecting the bubble close button 632. The system control unit 507 is in a standby state until the close operation is detected (step S94: NO). If the system control unit 507 determines that the close operation is detected (step S94: YES), the bubble 630 is closed (step S95), and the process moves to step S96.

The system control unit 507 then determines whether a next page display operation is detected (step S96). The next page display operation is a next page display operation according to the third embodiment, and specifically, is an operation of selecting the next page button 621. If the system control unit 507 determines that the next page display operation is detected (step S96: YES), the system control unit 507 executes a narrow-down process (step S97).

After the display of the image display screen 600, the system control unit 507 records the details of the operation of the user in the storage unit 505.

The narrow-down process by the system control unit 507 of the display apparatus 500 will be described with reference to FIG. 24. FIG. 24 is a flow chart showing an example of the narrow-down process by the system control unit 507 according to the third embodiment.

The system control unit 507 of the display apparatus 500 first calculates a degree of interest of the user for each athlete image (will be called "degree-of-interest calculation target image") displayed on the image list 610 when the next page display operation is detected (step S101). In this case, the system control unit 507 calculates the degree of interest of the user based on the details of the operation of the user between the display of the degree-of-interest calculation target image on the image display screen 600 and the detection of the next page display operation. Specifically, the system control unit 507 calculates the degree of interest of the user for the athlete image based on, for example, a length of a display time of the display of the expanded image 631 in the bubble 630 after the selection of the athlete image 611. When the athlete image 611 is selected, the system control unit 507 first adds one point and further adds one point every five seconds of the display time of the bubble 630. More specifically, although at least one point is added to the degree of interest for the image just by the selection of the athlete image 611 in the present embodiment, the degree of interest is zero point for the image if the athlete image 611 is not selected at all. An upper limit (for example, ten points) may be set for the degree of interest of the user for one image.

The system control unit 507 then compares the degree of interest of the user for each degree-of-interest calculation target image with a predetermined threshold (for example, three points) (step S102). The system control unit 507 generates a specific image list including athlete images with the degrees of interest of the user higher than the predetermined threshold (step S103). In fact, image IDs of the athlete images with the degrees of interest of the user higher than the predetermined threshold are registered in the specific image list. Therefore, the process of step S103 corresponds to an example of "specifying the target" of the present invention.

The system control unit 507 then determines whether the athlete images are registered in the specific image list (step S104). If the system control unit 507 determines that the athlete images are not registered in the specific image list (step S104: NO), the process in the flow chart is finished. On the other hand, if the system control unit 507 determines that the athlete images are registered in the specific image list (step S104: YES), the system control unit 507 extracts a predetermined number (for example, two) of upper athlete images from the specific image list (step S105). The upper athlete images denote images with higher degrees of interest. If the predetermined number of athlete images are not registered in the specific image list, all the registered athlete images may be extracted.

The system control unit 507 then acquires keywords (will be called "narrow-down keywords") associated with the extracted athlete images (step S106). Specifically, the system control unit 507 searches the keyword DB 5052 based on the image IDs of the extracted athlete images and acquires the keywords associated with the image IDs.

The system control unit 507 then narrows down the images to be displayed based on the acquired narrow-down keywords (step S107). Specifically, the system control unit 507 acquires keywords associated with each image to be displayed from the keyword DB 5052. The system control unit 507 narrows down the images to be displayed only to the athlete images associated with the same keywords as the narrow-down keywords.

In this way, in the present embodiment, the images to be displayed are narrowed down every time the narrow-down process is executed (except when the process is terminated by "NO" in step S104). An upper limit may be set for the number of times of narrowing down the images to be displayed in the narrow-down process.

When the process of step S107 is finished, the system control unit 507 finishes the process in the flow chart.

Returning to FIG. 23, when the narrow-down process (step S97) is finished, the system control unit 507 switches the display of the image list 610 (step S98). Specifically, when the images to be displayed are narrowed down in the narrow-down process (step S97), the system control unit 507 generates display data (second display data) for displaying a list of the narrowed-down athlete images and displays the display data in each page from images higher in the order of display. On the other hand, if the images to be displayed are not narrowed down in the narrow-down process (step S97), the system control unit 507 displays the page to be displayed following the displayed page.

If the system control unit 507 determines that the next page display operation is not detected in the process of step S96 (step S96: NO) or finishes the process of step S98, the system control unit 507 then determines whether a finish operation is detected (step S99). The finish operation is, for example, an operation of closing the image display screen 600. If the system control unit 507 determines that the finish operation is not detected (step S99: NO), the process moves to step S92. On the other hand, if the system control unit 507 determines that the finish operation is detected (step S99: YES), the process in the flow chart is finished.

In the third embodiment, the athlete images with the degrees of interest of the user higher than the predetermined threshold are registered in the specific image list (step S103 of FIG. 24), and the predetermined number of upper athlete images are extracted (step S105). However, instead of generating the specific image list, the keywords associated with the specified athlete image may be acquired every time an athlete image with the degree of interest of the user higher than the predetermined threshold is specified (step S106).

[3.4. Sorting Process]

In the third embodiment, the image data of the athlete images displayed on the image display screen 600 is displayed by narrowing down the image data to the image data of the athlete images related to the athlete image the user is interested in. In place of this, the image data of the athlete images related to the athlete image the user is interested in may be preferentially displayed.

Figure 25:
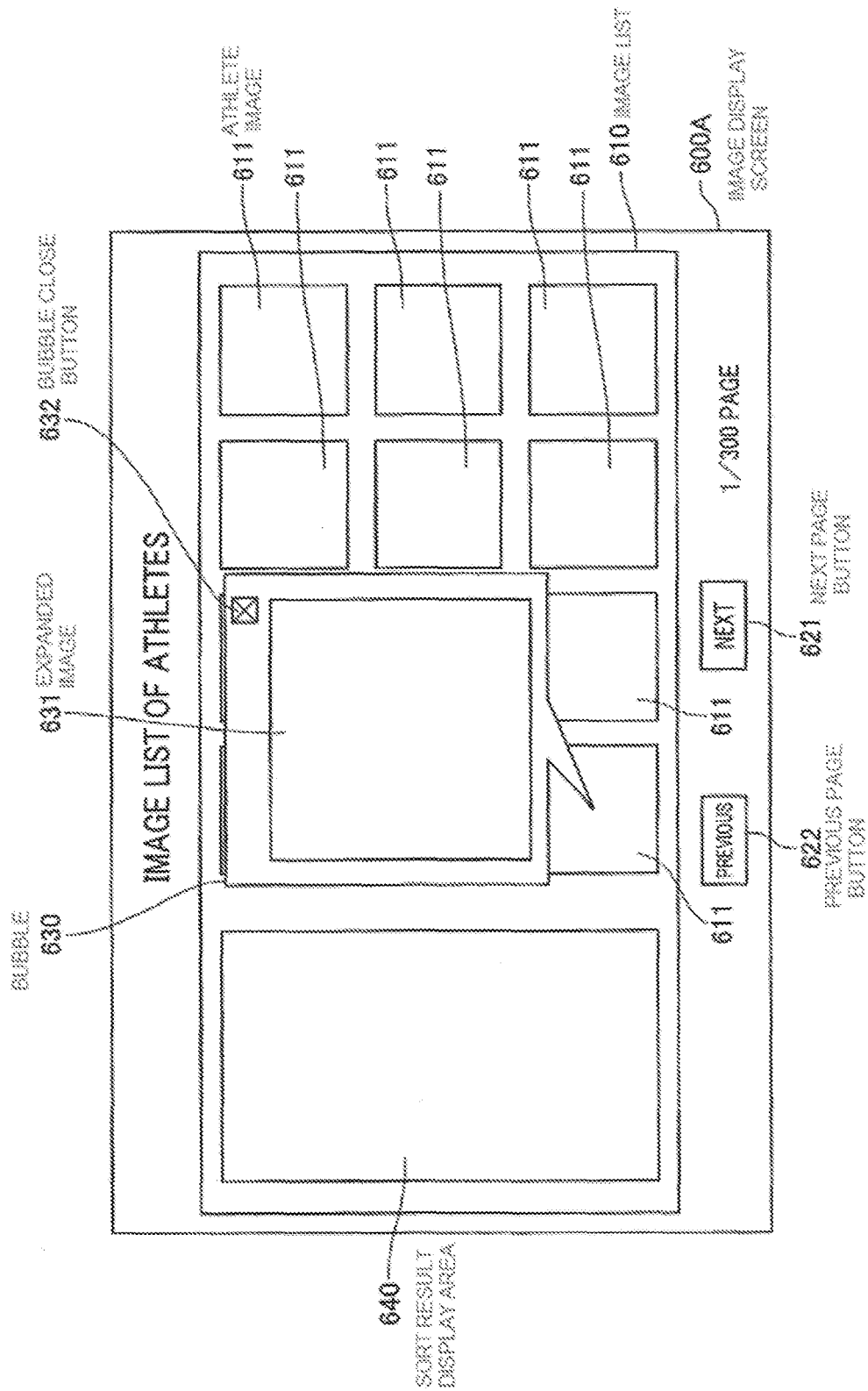
FIG. 25 is a diagram showing a display example of an image display screen of the display apparatus 500 according to the third embodiment.
Figure 26:
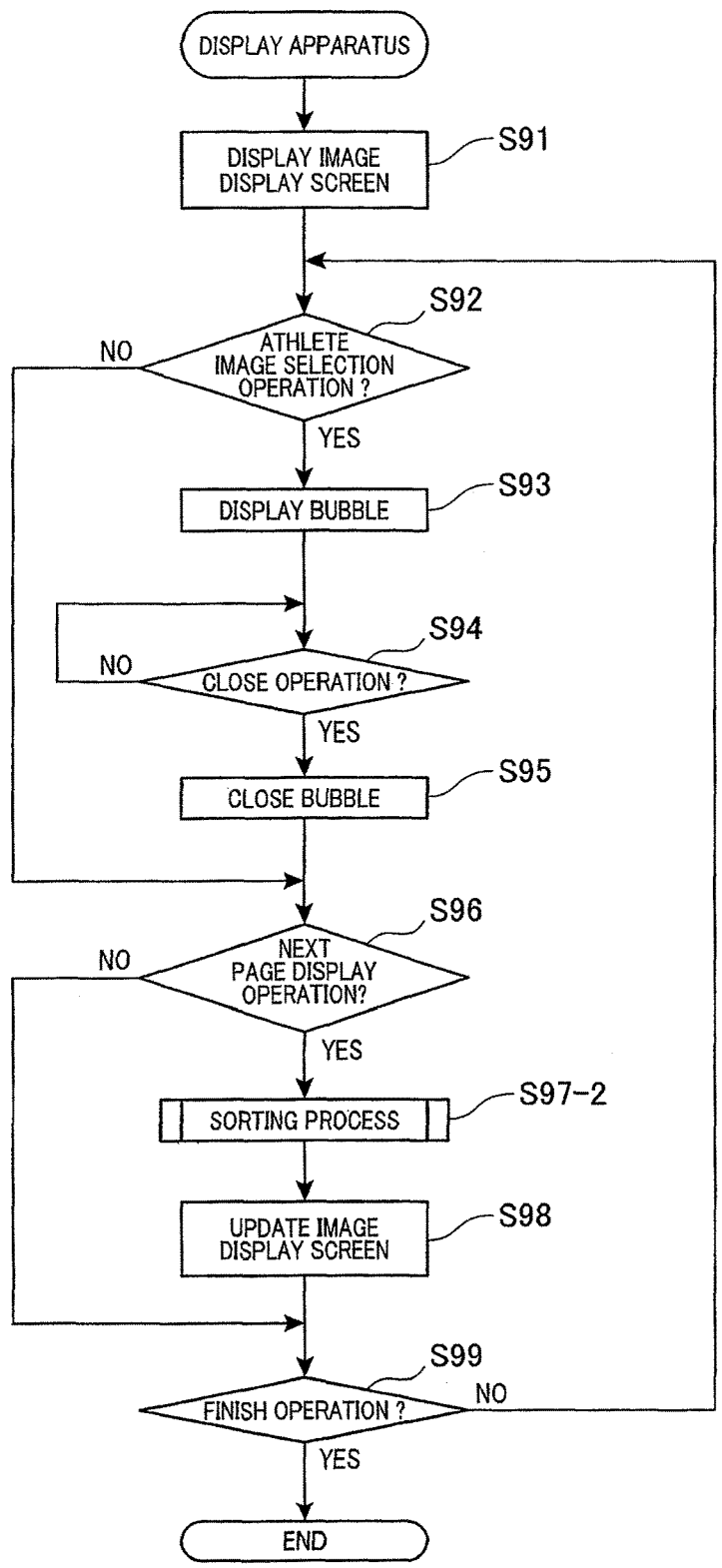
FIG. 26 is a flow chart showing a process example of the system control unit 507 of the display apparatus 500 according to the third embodiment.
Figure 27:
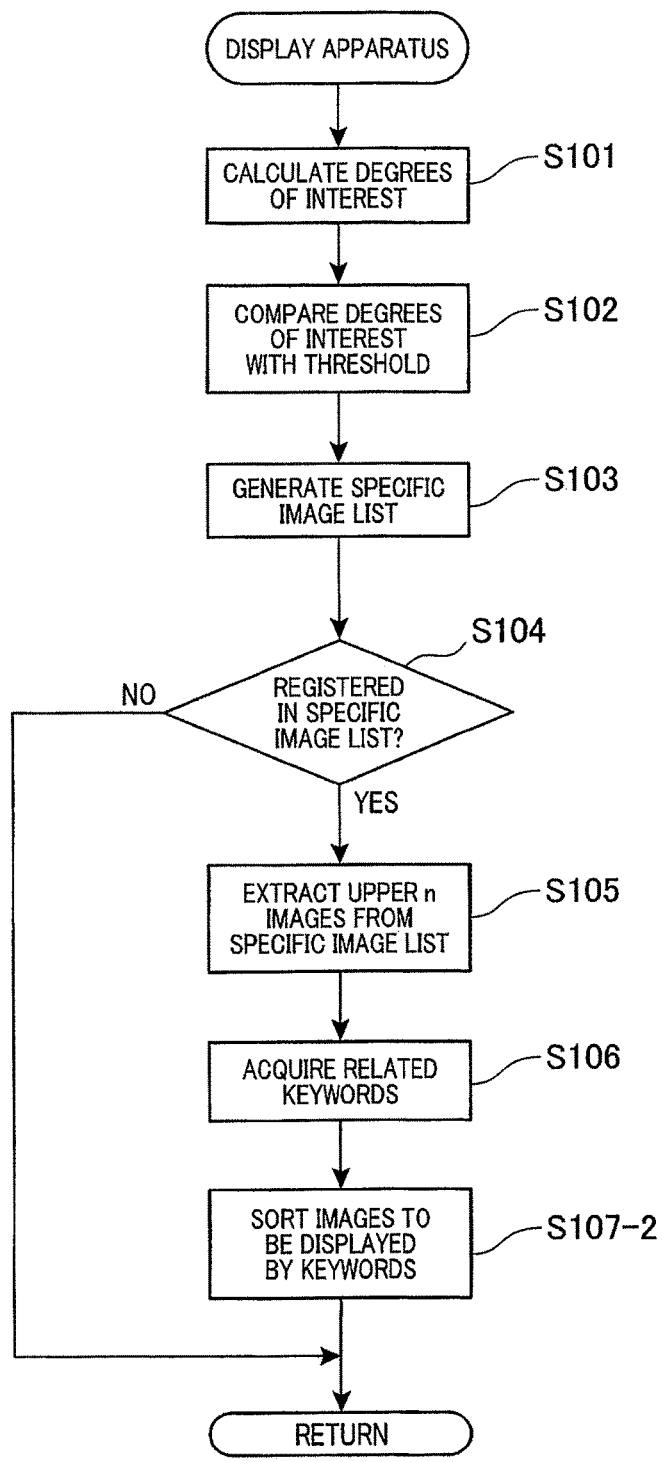
FIG. 27 is a flow chart showing a process example of the system control unit 507 of the display apparatus 500 according to the third embodiment.

Hereinafter, the case of preferentially displaying the image data of the athlete images related to the athlete image the user is interested in on the image display screen 600 will be described with reference to FIG. 25 to FIG. 27, and differences from the case of displaying the image data by narrowing down the image data to the image data of the athlete images related to the athlete image the user is interested in will be mainly described. FIG. 25 is a diagram showing a screen display example when the image display screen 600 is displayed. FIG. 26 is a flow chart showing a process example of the display apparatus 500 when the image data of the athlete images related to the athlete image the user is interested in is preferentially displayed. FIG. 27 is a flow chart showing an example of a sorting process by the system control unit 507 when the image data of the athlete images related to the athlete image the user is interested in is preferentially displayed.

As shown in FIG. 25, an image display screen 600A for displaying the images to be displayed includes a sort result display area 640. As in the first embodiment, the sort result display area 640 displays information related to the processing result when the sorting process is executed. The images to be displayed equivalent to the number of display items (twelve in the example of FIG. 25) are displayed in each of a plurality of pages on the image display screen 600A.

When the user selects the next page button 621 or the previous page button 622, an athlete image group different from the athlete image group displayed on the image list 610 is displayed on the image list 610. The display apparatus 500 determines the order of display of the images to be displayed. When the next page button 621 is selected, the page to be displayed following the currently displayed page is displayed based on the order of display. Meanwhile, when the previous page button 622 is selected, the page to be displayed prior to the currently display page is displayed.

As shown in FIG. 26, when the system control unit 507 of the display apparatus 500 detects a launching operation of the image display application by the user in the process of step S91, the system control unit 507 generates display data (first display data) for displaying a list of athlete images and causes the display unit 502 to display the image display screen 600 (step S91). In this case, the system control unit 507 displays twelve athlete images to be displayed on the first page on the image list 610 based on the order of display. The order of display is determined by a preset order of sort (initial). The user can also set the order of sort (initial). An example of the order of sort (initial) that can be set includes an ascending order (or a descending order) of the image ID. An ascending order (or a descending order) of the athlete name may also be set.

If the system control unit 507 determines that the next page display operation is detected in the process of step S96 of FIG. 26 (step S96: YES), the system control unit 507 executes a sorting process (step S97-2). The sorting process by the system control unit 507 of the display apparatus 500 will be described with reference to FIG. 27. In the process of step S106 of FIG. 27, the system control unit 507 acquires keywords (will be called "sorting keywords") associated with the extracted athlete images (step S106). Specifically, the system control unit 507 searches the keyword DB 5052 based on the image IDs of the extracted athlete images and acquires the keywords associated with the image IDs.

The system control unit 507 then sorts the images to be displayed based on the acquired sorting keywords (step S107-2). Specifically, the system control unit 507 acquires the keywords associated with the images to be displayed from the keyword DB 5052. The system control unit 507 updates the order of sort so that the order of display of the athlete images associated with the same keywords as the sorting keywords becomes higher and determines the order of display of the images to be displayed based on the updated order of sort (therefore, sorts the images to be displayed). If a plurality of sorting keywords are acquired and there are athlete images associated with the plurality of keywords among the keywords, the system control unit 507 raises the order of display of the athlete images with more keywords. If there are a plurality of athlete images in the same conditions in determining the order of display of the images to be displayed based on the updated order of sort, the order of display between the athlete images is arbitrary (for example, the order of sort (initial) may be followed).

In this way, when the image data of the athlete images related to the athlete image the user is interested in is preferentially displayed, the order of display of the images to be displayed is changed according to the degrees of interest every time the sorting process is executed (except when the process is terminated by "NO" in step S104). An upper limit may be set for the number of changes in the order of display of the images to be displayed in the sorting process.

Returning to FIG. 26, when the sorting process (step S97-2) is finished, the system control unit 507 updates the image display screen 600A (step S98). Specifically, if the process of step S107-2 in the last sorting process (see FIG. 27) is executed (if the degree of interest is higher than the predetermined threshold), the system control unit 507 generates display data (second display data) for displaying the athlete images equivalent to the number of display items from the athlete images with the No. 1 order of display determined in the process of step S107-2 and updates the image display screen 600A. On the other hand, if the process of step S107-2 in the last sorting process (see FIG. 27) is not executed (if the degree of interest is not higher than the predetermined threshold), the system control unit 507 updates the image display screen 600A to display the athlete images to be displayed on the next page based on the order of display at this point. If the order of display of the images to be displayed is changed in the sorting process (step S97-2), the system control unit 507 updates the image display screen 600A to display the information related to the processing result on the sort result display area 640.

If the upper limit is set for the number changes in the order of display of the images to be displayed in the sorting process as described above, the system control unit 507 skips the sorting process (step S97-2) if the number of changes has reached the upper limit and displays the athlete images to be displayed on the next page based on the order of display at this point.

[3.5. Change in Display Mode]

In the third embodiment, the athlete images to be displayed on the image display screen 600 is displayed by narrowing down the athlete images to the image data of the athlete images related to the athlete image the user is interested in (athlete images with the same keywords as the athlete image the user is interested in). In place of this, (1) the display mode of the display data of the athlete images related to the athlete image the user is interested in may be different from the display mode of the image data of the athlete images related to other athlete images (athlete images other than the athlete image the user is interested in), or (2) a display mode may be adopted in which the image data of the athlete images related to other athlete images (athlete images other than the athlete image the user is interested in) is collapsed and not displayed until a collapse cancellation operation of the user is detected. Examples of (1) include enlarging the display size of the image data of the athlete images related to the athlete image the user is interested in, changing the color of the part displaying the image data of the athlete images, and applying a mask process to the part displaying the image data of the athlete images related to athlete images other than the athlete image the user is interested in. In this way, even if the image data of the athlete images related to the athlete image the user is interested in is preferentially displayed, the burden of the user in browsing can be reduced.

[3.6. Modified Examples]

Modified examples of the third embodiment will be described.

[3.6.1. Relative Evaluation for Degrees of Interest of User]

In the third embodiment, the athlete images with high degrees of interest of user are registered in the specific image list (step S103 of FIG. 24 and FIG. 27), and whether the degrees of interest of the user are high is determined by whether the degrees of interest are higher than the predetermined threshold (step S102 of FIG. 24 and FIG. 27). In a modified example as an alternative, the system control unit 507 may calculate and compare the degrees of interest of all degree-of-interest calculation target images in the narrow-down process (or the sorting process) and register athlete images with higher degrees of interest of the user in the specific image list as athlete images with high degrees of interest of the user. The athlete images with higher degrees of interest of the user may be, for example, top three images or images included in top 20% of the degree-of-interest calculation target images. The athlete images with higher degrees of interest of the user may not be registered in the specific image list if the degrees of interest are below the predetermined threshold.

[3.6.2. Display of Athlete Information]

In a modified example, the system control unit 507 may display the keywords associated with the selected athlete image 611 in the bubble 630.

[3.6.3. Selection of Images to be Displayed]

In the third embodiment, all athlete images registered in the image DB 5051 are the initial images to be displayed. In a modified example as an alternative, the system control unit 507 may have the user input search conditions when the image display application is launched, and the athlete images may be searched according to the search conditions to set only the corresponding athlete images as the initial images to be displayed.

[3.6.4 Display 1 of Search Result Pages]

The various databases constructed in the storage unit 15 of the shopping server 1 in the first embodiment may be constructed in the storage unit 505, and the processes related to the display of the search result pages (see FIG. 4) in the first embodiment may be executed only by the display apparatus 500. Specifically, the system control unit 507 of the display apparatus 500 executes the processes related to the display of the search result pages (see FIG. 4) executed by the system control unit 20 of the shopping server 1 and the system control unit 36 of the user terminal 2. Therefore, the system control unit 507 also executes the narrow-down process (FIG. 6) or the sorting process (FIG. 11). In this case, the modified examples of the first embodiment described above may be applied.

[3.6.5. Display 2 of Search Result Pages]

The various databases constructed in the storage unit 15 of the shopping server 1 in the second embodiment may be constructed in the storage unit 505, and the processes related to the display of the search result pages (see FIG. 15) in the second embodiment may be executed only by the display apparatus 500. Specifically, the system control unit 507 of the display apparatus 500 executes the processes related to the display of the search result pages (see FIG. 15 and FIG. 18) executed by the system control unit 20 of the shopping server 1 and the system control unit 36 of the user terminal 2. Therefore, the system control unit 507 also executes the narrow-down process (FIG. 17) or the sorting process (FIG. 20). In this case, the modified examples of the second embodiment described above may be applied.

[3.6.6. Acquisition of Related Keywords]

In the acquisition of the related keywords in the process of step 106 of FIG. 24 or FIG. 27, the system control unit 507 may not only search the keyword DB 5052 based on the image ID of the athlete image extracted in the process of step S105 to acquire the keywords associated with the image ID, but may also refer to a thesaurus DB to acquire synonyms of the keywords associated with the image ID as the related keywords. The thesaurus DB may be arranged in the storage unit 505, or a thesaurus DB stored in a storage unit of an apparatus other than the display apparatus 500 may be referenced.

In the acquisition of the related keywords in the process of step 106 of FIG. 24 or FIG. 27, the system control unit 507 may acquire the related image ID from the image DB 5051 based on the image ID of the athlete image extracted in the process of step S105 and then search the keyword DB 5052 based on the acquired related image ID to acquire the keywords associated with the related image ID as the related keywords.

[3.7. First Display Data and Second Display Data]

The "first display data" of the present invention is a concept including not only the display data for displaying the image display screen 600 in the process of step S61 of FIG. 23 or FIG. 26, but is a concept also including display data ("second display data" of the present invention) that is generated to switch the display of the image list in the process of step S98 and that is for displaying the narrowed-down athlete images (or sorted athlete images). More specifically, in the present invention, a process in which generated second display data serves as new first display data, and new second display data is further generated based on the operation information of the user for the new first display data can be repeated. The information displayed in the second display data is further narrowed down or sorted according to the repetition of the process.

4. Fourth Embodiment

Figure 28:
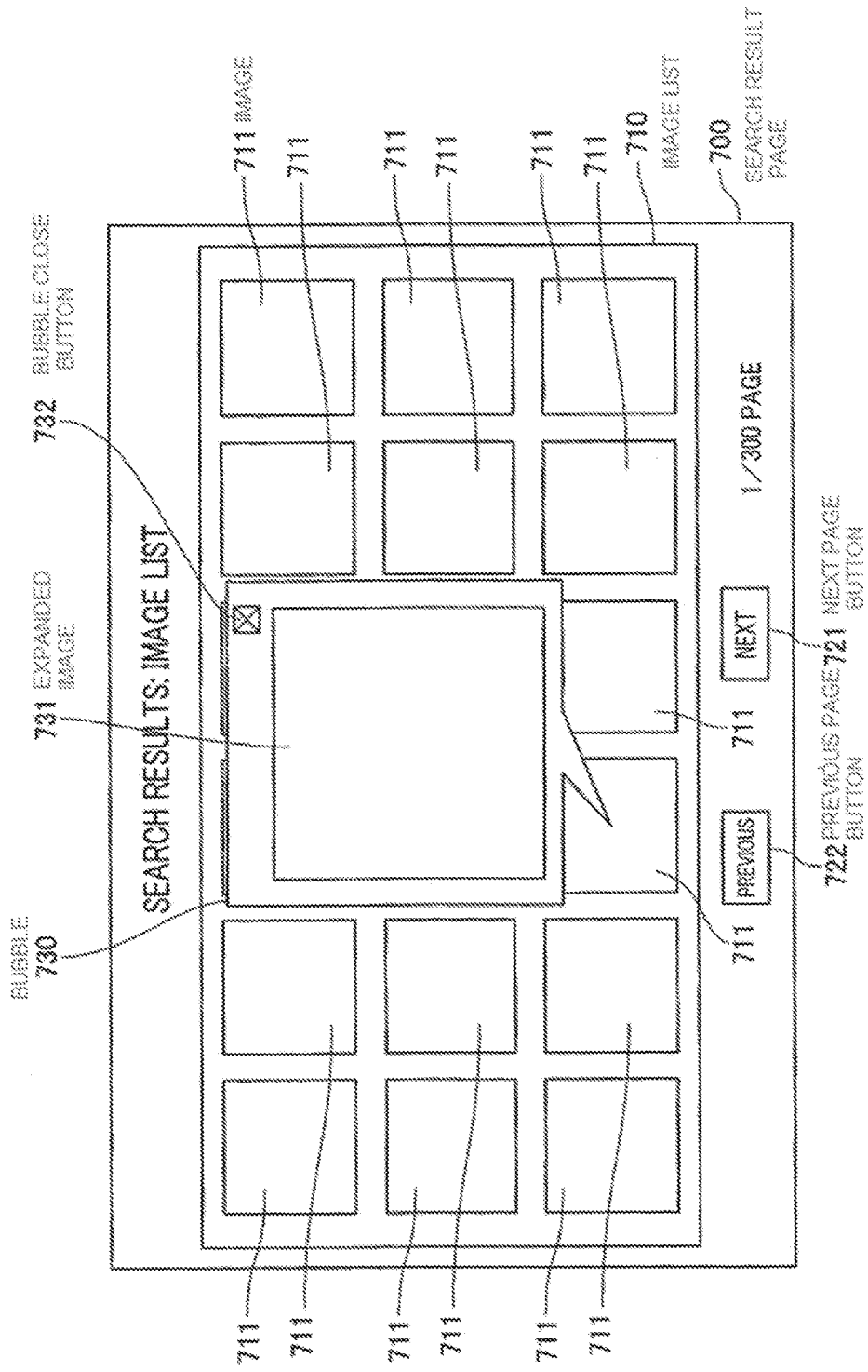
FIG. 28 is a diagram showing a display example of a search result page 700 according to a fourth embodiment.

A fourth embodiment will be described with reference to FIG. 28 to FIG. 30. In the first and second embodiments described above, the corresponding products satisfying the search conditions are displayed in a list format or a slide show format. The fourth embodiment described below is characterized in that images satisfying the search conditions are displayed in a list format or a slide show format.

Regarding an image providing system SA according to the fourth embodiment, differences from the shopping system S according to the first and second embodiments will be mainly described. An image providing server 1A of the image providing system SA according to the fourth embodiment has substantially a similar configuration as that of the shopping server 1 of the shopping system S according to the first embodiment and the second embodiment. Therefore, the same members are designated with the same reference numerals with "A" at the end to skip part of the description, and the differences will be mainly described. The user terminal 2 of the image providing system SA has substantially a similar configuration as that of the user terminal 2 of the shopping system S according to the first embodiment and the second embodiment. Therefore, the same members are designated with the same reference numerals, and part of the description will be skipped.

[4.1. Configuration of Image Providing Server 1A]

A storage unit 15A of the image providing server 1A includes, for example, a hard disk drive and stores various programs, data, and the like. Various databases, such as an image keyword DB 106A, are constructed in the storage unit 15A.

Information (example of "information of targets") related to images (example of "targets that can be recognized by a user"), such as image IDs as identification information of the images, image data for displaying the images, keywords related to the images, tag information (for example, metadata), and related image IDs), is registered in the image keyword DB 106A in association with each image. An image related to the image identified by the image ID is registered as for the related image ID. The name of the subject, words expressing the subject, and words expressing the characteristics of the image (for example, statistical characteristics such as the composition and the tone) are registered for the keywords related to the image.

[4.2. Display of Search Results]

A display mode of the search results when the images are searched based on the search conditions input by the user in the image providing server 1A will be described with reference to FIG. 28.

When the images are searched, the image providing server 1A transmits, to the user terminal 2, search results that are Web pages indicating a list of images ("corresponding images")) satisfying the search conditions input by the user. The Web pages will be called "search result pages". As shown in FIG. 28, a search result page 700 includes an image list 710, a next page button 721, and a previous page button 722. In the search result pages, image data of images to be displayed equivalent to the number of display items (18 in the example of FIG. 28) is displayed in each of a plurality of pages. The image list 710 displays the corresponding images equivalent to the number of display items. The corresponding images can be selected (for example, clicked) by a mouse or the like. When the user selects the corresponding image 711, a bubble 730 is displayed. An expanded image 731 of the selected corresponding image 711 is displayed in the bubble 730. A bubble close button 732 is arranged in the bubble 730, and the bubble 730 is closed when the user selects the bubble close button 732.

When the user selects the next page button 721 or the previous page button 722, a corresponding image group different from the corresponding image group displayed on the image list 710 is displayed on the image list 710. The order of display of the images to be displayed (for example, ascending order of image ID) is set in advance (however, the user can also set the order of display), and 18 images are sequentially displayed on each page. When the next page button 721 is selected, the page to be displayed following the currently displayed page is displayed based on the order of display. Meanwhile, when the previous page button 722 is selected, the page to be displayed prior to the currently displayed page is displayed.

If the image data of the corresponding images displayed on the search result page 700 can be displayed by narrowing down the image data to image data of the corresponding image the user is interested in, the burden of the user in browsing can be reduced. Therefore, the image providing system S specifies the corresponding image the user is interested in based on the details of the operation when the user is browsing the corresponding image. The image data of the images to be displayed is displayed by narrowing down the image data to the image data of the corresponding images related to the specified corresponding image.

To realize this, the image providing system SA records the details of the operation when the user is browsing the search result page 700. Specifically, the type of the operation by the user (for example, click operation or drag operation), the target of the operation (for example, the image link 211), the time of the operation, and the like are recorded. The time here may not necessarily be the actual time, but the time can be an elapsed time from a reference time, in which time of predetermined control (for example, time of display of the search result page 700 or time of display (or update) of the image list 710) serves as a reference (0 second). More specifically, based on the recorded details of operation, the image providing system SA can determine when, for what, and what kind of operation the user has performed, or when the user was not performing the operation. An example of the operation performed by the user includes an operation of using the mouse, the keyboard, or the like to select (for example, click) the corresponding image 711.

The fact that there is an operation for an image displayed on the list can mean that the user at least has an interest in the operated image. On the other hand, the fact that there is no operation for an image displayed on the list can mean that the user has no interest in the image. Therefore, the image providing system SA specifies the image the user is interested in based on the details of the operation of the user when the search result page 700 is displayed.

[4.3. Operation of Image Providing System SA]

A summary of operation of the image providing system SA in displaying the search result page 700 will be described with reference to FIG. 29.

Figure 29:
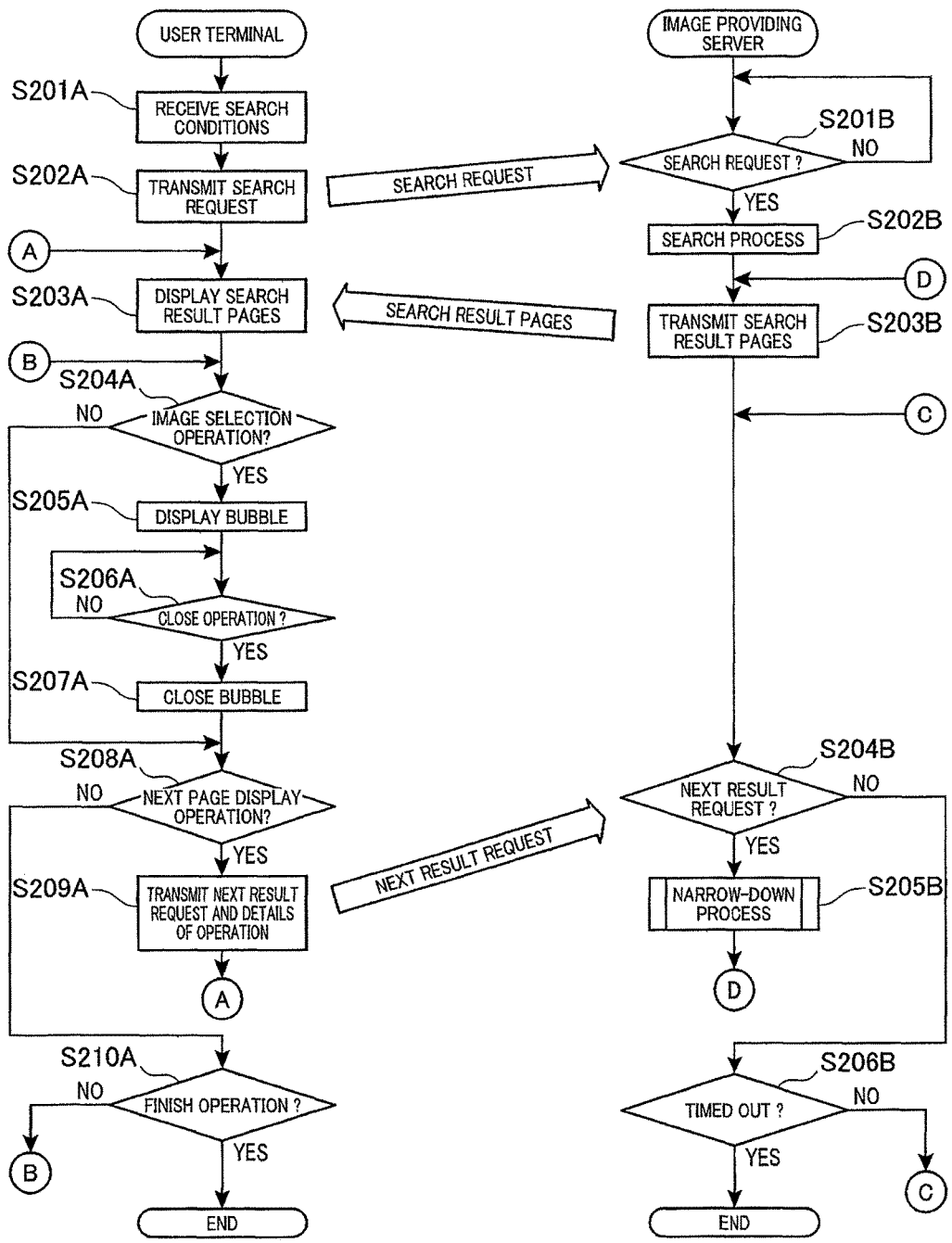
FIG. 29 is a flow chart showing a process example of an image providing system SA according to the fourth embodiment.

As shown in FIG. 29, the system control unit 36 of the user terminal 2 first receives input of the search conditions by the user (step S201A). For example, keywords can be designated for the search conditions. The system control unit of the user terminal 2 then transmits a search request including the input search conditions to the image providing server 1A (step S202A).

Meanwhile, a system control unit 20A of the image providing server 1A is in a standby state until the search request is received (step S201B: NO). When the search request is received (step S201B: YES), the system control unit 20A executes a search process based on the search conditions included in the received search request (step S202B). The system control unit 20A transmits, to the user terminal 2, a search result page (example of "first display data") for displaying a list indicating the corresponding images equivalent to the number of display items (step S203B).

When the search result page is received, the system control unit 36 of the user terminal 2 causes the display unit 32 to display the search result page (step S203A). The system control unit 36 determines whether an operation of selecting the image 711 is detected (step S204A). If the system control unit 36 determines that the operation of selecting the image 711 is not detected (step S204A: NO), the process moves to step S208A. On the other hand, if the system control unit 36 determines that the operation of selecting the image 711 is detected (step S204A: YES), the system control unit 36 displays the bubble 730 for displaying the expanded image 731 of the selected image 711 (step S205A).

When the bubble 730 is displayed, the system control unit determines whether a close operation is detected (step S206A). The close operation is an operation of selecting the bubble close button 732. The system control unit 36 is in the standby state until the close operation is detected (step S206A: NO). If the system control unit 36 determines that the close operation is detected (step S206A: YES), the system control unit 36 closes the bubble 730 (step S207A), and the process moves to step S208A.

The system control unit 36 then determines whether a next page display operation is detected (step S208A). The next page display operation is a next page display operation according to the fourth embodiment, and specifically, is an operation of selecting the next page button 721. If the system control unit 36 determines that the next page display operation is detected (step SS208A: YES), the system control unit 36 transmits the next result request and user operation information indicating the details of the operation of the user to the image providing server 1A (step S209A). The system control unit 36 records the details of the operation of the user from the display of the search result page received from the image providing server 1A to the detection of the next page display operation in the storage unit 34. In step S209A, the user operation information indicating the recorded details of operation is transmitted. Although the system control unit 36 transmits the next result request and the user operation information to the image providing server 1A in the process of step S209A, the next result request and the user operation information may not necessarily be transmitted at the same time. For example, the system control unit 36 may transmit the user operation information before or after the process of step S209A, separately from the next result request.

When the next result request and the user operation information indicating the details of the operation are received (step S204B: YES), the system control unit 20A of the image providing server 1A executes a narrow-down process (step S205B). The narrow-down process will be described later.

When the narrow-down process (step S205B) is finished, the system control unit 20A transmits the search result page for displaying the corresponding images to the user terminal 2 (step S203B). Specifically, if the process of step S307 of the narrow-down process (see FIG. 30) is not executed (if the degree of interest is not higher than the predetermined threshold), the system control unit 20A transmits a search result page for displaying the images to be displayed following the images displayed when the most recent next result request is received. If the process of step S307 of the narrow-down process (see FIG. 30) is executed (if the degree of interest is higher than the predetermined threshold), the system control unit 20A transmits a search result page (example of "second display data") for displaying, from the first image, the corresponding images narrowed down in the process. When the upper limit is set to the number of times of narrowing down the corresponding images in the narrow-down process, the system control unit 20A skips the narrow-down process (step S205B) if the number of times of narrowing down has reached the upper limit and transmits the search result page for displaying the images to be displayed following the images displayed when the most recent next result request is received.

Meanwhile, the system control unit 36 of the user terminal 2 determines whether a finish operation is detected when the search result page is displayed (step S210A). The finish operation is an operation for closing the Web browser or an operation for logging out from the image providing system SA. If the system control unit 36 determines that the finish operation is not detected (step S210A: NO), the process moves to step S204A. On the other hand, if the system control unit determines that the finish operation is detected (step S210A: YES), the process in the flow chart is finished.

If the system control unit 20A of the image providing server 1A determines that the communication with the user terminal 2 has timed out (step S206B: YES), the process in the flow chart is finished.

The narrow-down process (step S205B) by the system control unit 20A of the image providing server 1A will be described with reference to FIG. 30. FIG. 30 is a flow chart showing an example of the narrow-down process by the system control unit 20A according to the fourth embodiment.

The system control unit 20A of the image providing server 1A first calculates the degrees of interest of the user for images (will be called "degree-of-interest calculation target images") displayed on the image list 710 when the next page display operation is detected (step S301). In this case, the system control unit 20A calculates the degrees of interest of the user based on the details of the operation of the user between the display of the degree-of-interest calculation target images on the search result page 700 and the detection of the next page display operation. Specifically, the system control unit 20A calculates the degree of interest of the user for the athlete image based on, for example, the length of the display time of the display of the expanded image 731 in the bubble 730 after the selection of the image 711. The system control unit 20A first adds one point when the image 711 is selected and further adds one point every five seconds of the display time of the bubble 730. Therefore, although at least one point is added to the degree of interest for the image just by the selection of the image 711 in the present embodiment, the degree of interest for the image is 0 point if the image 711 is not selected at all. An upper limit (for example, ten points) may be set for the degree of interest of the user for one image.

The system control unit 20A then compares the degrees of interest of the user for the degree-of-interest calculation target images with a predetermined threshold (for example, three points) (step S302). The system control unit 20A generates a specific image list including images with the degrees of interest of the user higher than the predetermined threshold (step S303). In fact, the image IDs of the images with the degrees of interest of the user higher than the predetermined threshold are registered in the specific image list.

The system control unit 20A then determines whether images are registered in the specific image list (step S304). If the system control unit 20A determines that the images are not registered in the specific image list (step S304: NO), the process in the flow chart is finished. On the other hand, if the system control unit 20A determines that the images are registered in the specific image list (step S304: YES), the system control unit 20A extracts a predetermined number (for example, two) of upper images from the specific image list (step S305). The upper images here denote images with high degrees of interest. If the predetermined number of images are not registered in the specific image list, all registered images may be extracted.

The system control unit 20A then acquires keywords (will be called "narrow-down keywords") associated with the extracted images (step S306). Specifically, the system control unit 20A searches the image keyword DB 106A based on the image IDs of the extracted images and acquires the keywords associated with the image IDs.

The system control unit 20A then narrows down the images to be displayed based on the acquired narrow-down keywords (step S307). Specifically, the system control unit 20A searches the image keyword DB 106A and narrows down the images to be displayed to images associated with the same keywords as the narrow-down keywords.

In this way, the images to be displayed are narrowed down every time the narrow-down process is executed in the present embodiment (except when the process is terminated by "NO" in step 304). An upper limit may be set for the number of times of narrowing down the images to be displayed in the narrow-down process. When the process of step S307 is finished, the system control unit 20A finishes the process in the flow chart.

In the fourth embodiment, the images with the degrees of interest of the user higher than the predetermined threshold are registered in the specific image list (step S303 of FIG. 30), and the predetermined number of upper images are extracted (step S305). However, instead of generating the specific image list, the keywords associated with the specified image may be acquired every time an image with the degree of interest of the user higher than the predetermined threshold is specified (step S306).

[4.4. Sorting Process]

The case of narrowing down the corresponding images to the image data of the images related to the image the user is interested in has been described. However, the order of display may be changed, and the image data of the images related to the image the user is interested in may be preferentially displayed. Specifically, a sorting process is executed in place of the narrow-down process in step S205B of FIG. 29. Details of the sorting process will be described with reference to FIG. 30. The process of step S301 to step S305 is the same as the narrow-down process, and the description will be skipped. In a process of step S306, the system control unit 20A acquires keywords (will be called "sorting keywords") associated with the images extracted in the process of step S305. In step S307, the system control unit 20A sorts the order of display of the images to be displayed based on the acquired sorting keywords. Specifically, the system control unit 20A acquires the keywords associated with the corresponding images from the image keyword DB 104A. The system control unit 20A updates the order of sort so that the order of display of the images associated with the same keywords as the sorting keywords becomes higher and determines the order of display of the corresponding images based on the updated order of sort (therefore, sorts the corresponding images). When a plurality of sorting keywords are acquired, if there are images associated with a plurality of keywords among the keywords, the order of display of images with more associated keywords is raised. If there are a plurality of images in the same conditions in determining the order of display of the corresponding images based on the updated order of sort, the order of display between the images is arbitrary (for example, the order of sort (initial) may be followed).

[4.5. Change in Display Mode]

In the fourth embodiment, the image data of the corresponding images displayed on the search result pages are displayed by narrowing down the image data to the image data of the images related to the image the user is interested in (images with the same keywords as the image the user is interested in). In place of this, (1) the display mode of the image data of the images related to the image the user is interested in may be different from the display mode of the image data of the images related to other products (images other than the image the user is interested in), or (2) a display mode may be adopted in which the image data of the images related to other images (images other than the image the user is interested in) is collapsed and not displayed until a collapse cancellation operation of the user is detected. Examples of (1) include enlarging the display size of the image data of the images related to the image the user is interested in, changing the color of the part displaying the image data, and applying a mask process to the part displaying the image data of the images related to the images other than the image the user is interested in. In this way, even if the image data of the images related to the image the user is interested in is preferentially displayed, the burden of the user in browsing can be reduced.

[4.6. Modified Examples]

The modified examples described in the first embodiment can also be applied to the fourth embodiment.

[4.6.1. Calculation Method Based on Display Time of Expanded Image 731]

The display time of the expanded image 731 is estimated to be longer for the expanded image 731 corresponding to an image the user is highly interested in. Therefore, the degree of interest of the user for each corresponding image can be calculated based on the display time of the expanded image 731. According to the modified example, the image data of the images displayed on the search result pages can be narrowed down to the image data of the images associated with the same keywords as the image with long browsing time and high degree of interest of the user. When the image data of the images related to the image the user is interested is preferentially displayed, the image data of the images associated with the same keywords as the image with long browsing time and high degree of interest of the user can be preferentially displayed.

[4.6.2.1. Target of Narrow-Down Process]

The images already displayed on the search result pages can be removed from the target of the narrow-down process. When the system control unit 20A removes the images already displayed on the search result pages from the target of the narrow-down process, the user does not check the same images again and again, and the burden of the user in browsing can be reduced.

[4.6.2.2. Target of Sorting Process]

The images already displayed on the search result pages can be removed from the target of the sorting process. When the system control unit 20A removes the images already displayed on the search result pages from the target of the sorting process, the user does not have to check the same images again and again, and the burden of the user in browsing can be reduced.

[4.6.3. Cancellation of Narrowing-Down]

The narrowing-down is cancelled if it is determined that the narrowing-down is not performed as the user has expected. If the next page display operation is performed within a predetermined time (for example, 15 seconds) after the display of the images narrowed down in the narrow-down process (step S205B of FIG. 29) on the search result pages, this can mean that the narrowing-down in the narrow-down process is not executed as the user has expected. Therefore, in a modified example, if the next page display operation is performed within the predetermined time (for example, 15 seconds) after the display of the images narrowed down in the narrow-down process on the search result pages, the system control unit 20 displays the search result pages indicating the list of the corresponding images in the state before the last narrow-down process. The corresponding images in the state before the last narrow-down process are the images searched in the search process (step S12B) if the last narrow-down process is the first narrow-down process. If the last narrow-down process is an n-th (natural number two or greater) or subsequent narrow-down process, the corresponding images in the state before the last narrow-down process are images narrowed down in an "n−1"th narrow-down process. The state before any of the narrow-down processes may be restored, instead of the state before the last narrow-down process. The modified example can prevent the continuation of the display of the images narrowed down in a user's unintended format.

[4.6.3.1. Narrowing Down by Narrow-Down Keywords]

As in a modified example of the first embodiment, if there are a plurality of narrow-down keywords, the corresponding images may be narrowed down to the images associated with all same keywords as the narrow-down keywords.

[4.6.3.2. Sort by Sorting Keywords]

As in a modified example of the first embodiment, if a plurality of sorting keywords are acquired (step S306 of FIG. 30), the images associated with more sorting keywords are preferentially displayed (step S307). In a modified example, each image may be associated in advance with keywords in each genre, and the order of display of the corresponding images may be determined based on the image and the genre the user is interested in.

[4.6.4. Order of Display after Narrow-Down Process]

As in a modified example of the first embodiment, the order of display of the images in displaying the images on the search result pages after the narrow-down process may be the descending order of the degrees of interest of the user.

[4.6.5. Relative Evaluation for Degrees of Interest of User]

As in a modified example of the first embodiment, the system control unit 20 may calculate and compare the degrees of interest of all degree-of-interest calculation target images in the narrow-down process (or the sorting process) and register the images with higher degrees of interest of the user in the specific image list as images with high degrees of interest of the user. The images with higher degrees of interest of the user may be, for example, top three images, or may be images included in top 20% of the degree-of-interest calculation target images. The images with higher degrees of interest of the user may not be registered in the specific image list if the degrees of interest are below a predetermined threshold. According to the modified example, the corresponding images are narrowed down to the images associated with the keywords corresponding to the images with high degrees of interest of the user. Therefore, the corresponding images can be narrowed down to the images the user is interested in, without imposing a burden on the user. When the image data of the images related to the image the user is interested in is preferentially displayed, the image data of the images associated with the keywords corresponding to the images with high degrees of interest of the user can be preferentially displayed. Therefore, the user can preferentially acquire the image data of the interesting images without any burden.

[4.6.6. Generation of Image Keyword DB 104A]

The manager of the image providing server 1A may generate the image keyword DB 104A, or the system control unit 20A of the image providing server 1A may generate the image keyword DB 104A. To describe the latter in detail, for example, the system control unit 20A can periodically acquire and associate images, image IDs, and tag information of the images (for example, metadata) included in Web pages from the Web pages that can be accessed through the Internet and register the data in the image keyword DB 104A.

[4.6.7. Execution Period of Narrow-Down Process and Sorting Process]

The system control unit 20A executes the narrow-down process or the sorting process when the next result request is received (step S204B of FIG. 29: YES). In place of this, the system control unit 20A may execute the narrow-down process or the sorting process when a predetermined number of corresponding images 711 are selected (clicked) in a search result page. For example, when two corresponding images 711 are selected, the system control unit 36 of the user terminal transmits information indicative of the selection to the image providing server 1A. The system control unit 20A of the image providing server 1A that has received the information executes the narrow-down process or the sorting process, and when the next result request is received next, the system control unit 20A transmits the search result page applied with the narrow-down process or the sorting process to the user terminal 2. In this case, the system control unit 20A acquires related keywords corresponding to the selected two corresponding images 711, and if there are common related keywords, the system control unit 20A can narrow down or sort the images based on the common related keywords. Although the predetermined number is two in the example described here, the predetermined number may be three or greater.

The narrow-down process or the sorting process may be executed when a predetermined number of corresponding images 711 are selected (clicked) within a predetermined time from the display of a search result page. For example, if three corresponding images 711 are selected (clicked) within five minutes from the display of the search result page by the system control unit 36 of the user terminal 2, information indicative of the selection is transmitted to the image providing server 1A. The system control unit 20A of the image providing server 1A that has received the information executes the narrow-down process or the sorting process and transmits the search result pages applied with the narrow-down process or the sorting process to the user terminal 2 when five minutes have passed. In this case, the system control unit 20A acquires related keywords corresponding to the three selected corresponding images 711, and if there are common related keywords, the system control unit 20A can narrow down or sort the images based on the common related keywords. Although the predetermined time is five minutes in the example described here, an arbitrary time may be set.

[4.6.8. Acquisition of Related Keywords]

Figure 30:
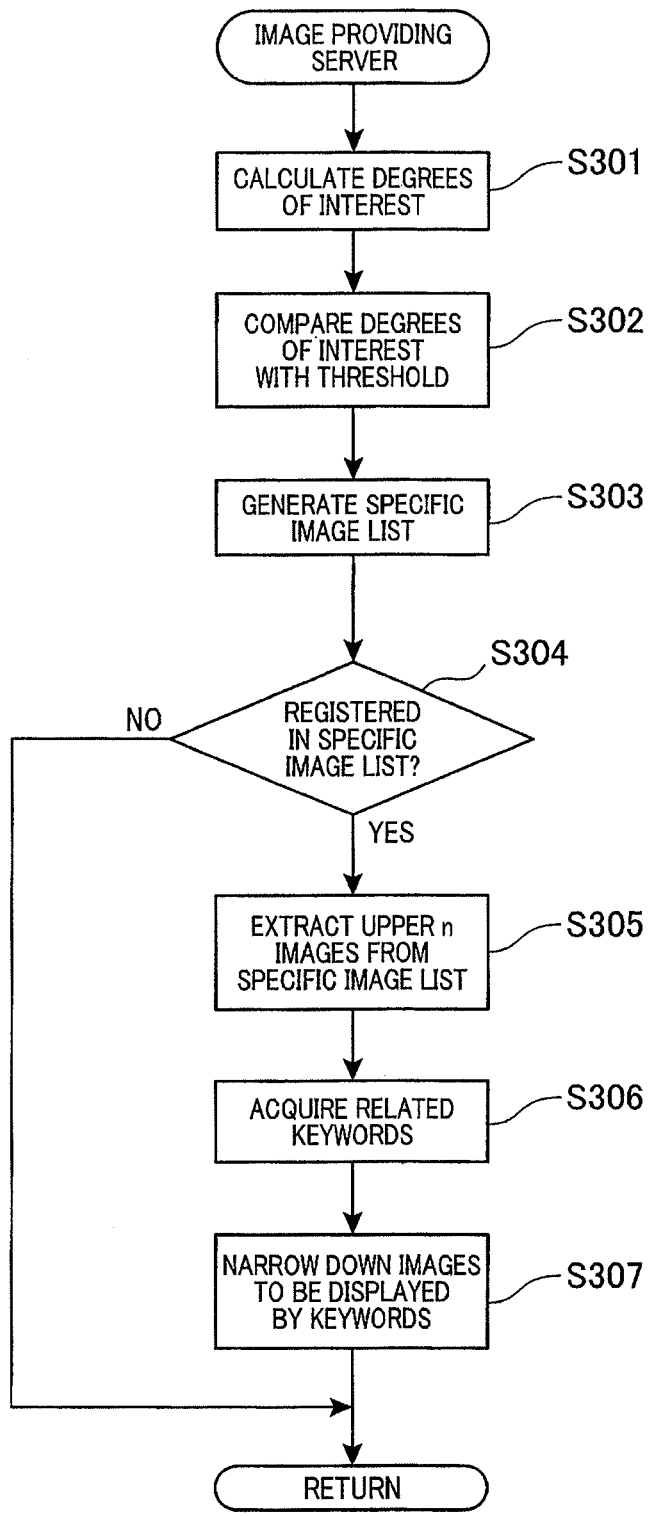
FIG. 30 is a flow chart showing a process example of a system control unit 20A of an image providing server 1A according to the fourth embodiment.

In the acquisition of the related keywords in the process of step 306 of FIG. 30, the system control unit 20A may not only search the image keyword DB 106A based on the image ID of the image extracted in the process of step S305 to acquire the keywords associated with the product ID, but may also refer to a thesaurus DB to acquire synonyms of the keywords associated with the image ID as the related keywords. The thesaurus DB may be arranged on the storage unit 15A, or a thesaurus DB stored in a storage unit of an apparatus other than the image providing server 1A may be referenced.

In the acquisition of the related keywords in the process of step 306 of FIG. 30, the system control unit 20A may acquire the related image ID from the image keyword DB 106A based on the image ID of the image extracted in the process of step S305 and then search the image keyword DB 106A based on the acquired related image ID to acquire, as the related keywords, the keywords associated with the related product ID as the image ID.

[4.7. First Display Data and Second Display Data]

The "first display data" of the present invention is a concept including not only the search result pages transmitted in the process of step S203B executed following the process of step S202B of FIG. 29, but is a concept also including the search result pages ("second display data" of the present invention) transmitted in the process of step S203B executed following the process of step S205B. More specifically, in the present invention, a process in which generated second display data serves as new first display data, and new second display data is further generated based on the operation information of the user for the new first display data can be repeated. The information displayed in the second display data is further narrowed down or sorted according to the repetition of the process.

5. Fifth Embodiment

A fifth embodiment will be described with reference to FIG. 31 and FIG. 32. In the first embodiment described above, the shopping server 1 displays, on the search result pages, the corresponding products that satisfy the search conditions and that are handled in the shopping site. The fifth embodiment described below is characterized in that a search server 1B in a search system SB displays, on the search result pages, information on the Web (hereinafter, "Web information"), such as Web pages and Web sites, on the Internet satisfying the search conditions. Hereinafter, a case of displaying, on the search result pages, information related to the Web pages satisfying the search conditions will be basically described, and the Web pages satisfying the search conditions will be called "corresponding Web pages".

Regarding the search system SB according to the fifth embodiment, difference from the shopping system S according to the first and second embodiments will be mainly described. The search server 1B of the search system SB has substantially a similar configuration as that of the shopping server 1 of the shopping system S according to the first embodiment. Therefore, the same members are designated with the same reference numerals with "B" at the end to skip part of the description, and the differences will be mainly described. The user terminal 2 of the search system SB has substantially a similar configuration as that of the user terminal 2 of the shopping system S according to the first embodiment. Therefore, the same reference numerals are used for the same members, and part of the description will be skipped.

[5.1. Summary of Configuration and Functions of Search System SB]

A configuration and general functions of the search system SB according to the fifth embodiment will be described first. The search system SB (example of "information providing system") includes the search server 1B (example of "server apparatus"), and a plurality of user terminals 2 (example of "terminal apparatuses"). The search server 1B and each of the user terminals 2 can mutually transmit and receive data through the network NW. In the search system SB with the configuration, the search server 1B is a server that searches Web information on the Internet based on search conditions in response to search requests from the user terminals 2 and that transmits search result pages for displaying search results to the user terminals 2. The user terminals 2 are terminal apparatuses used by users to search Web information, such as Web pages and Web sites.

[5.2. Configuration of Search Server 1A]

A configuration of the search server 1B will be described with reference to FIG. 2 and the like.

The search server 1B according to the fifth embodiment includes an operation unit 11B, a display unit 12B, a communication unit 13B, a drive unit 14B, a storage unit 15B, an input/output interface 16B, and a system control unit 20B. The system control unit 20B and the input/output interface 16B are connected through a system bus 21B.

Various DBs (the member DB 101, the shop DB 102, the product DB 103, the keyword DB 104, the member usage DB 105, and the like) constructed in the storage unit 15 in the first embodiment are not constructed in the storage unit 15B (example of "storage means"). Instead, as shown in FIG. 31, the storage unit 15B includes a Web page information DB 107B that stores, for each corresponding Web page, a Web page URL as identification information of the Web page, documents and images in the Web page, tag information (for example, metadata) in the Web page, authors (for example, writers of blogs) of the documents in the Web page, Web page URLs of related Web pages (related Web page URLs), keywords acquired from the documents in the Web page, and the like that are Web page information (example of "information of targets") related to searched corresponding Web pages (example of "targets that can be recognized by a user"). Regarding the documents in the Web pages, all documents in the Web pages may be stored, or part of the documents in the Web pages may be stored so that the documents can be used as snippets (excerpts of the documents in the corresponding Web pages displayed in the search result pages). A known algorithm TF (Term Frequency)/IDF (Inverse Document Frequency), morphological analysis, or the like can be used to acquire keywords from the documents in the Web pages. A plurality of keywords can be associated with one corresponding Web page. The Web page information DB 107B may store Web page information of each corresponding Web page when a search result is received from the user terminal 2, and the Web page information may be deleted when the process according to the present embodiment is finished. The Web page information DB 107B may also store the Web page information of the searched corresponding Web pages every time the search request is received from the user terminal 2.

The storage unit 15B stores various HTML (Hyper Text Markup Language) documents, image data, audio data, text data, and the like that form the search result pages.

A CPU 17B reads and executes various programs stored in a ROM 18B and the storage unit 15B, and in this way, the system control unit 20B controls the components of the search server 1B. The system control unit 20B also functions as a first display generation means, a first transmission means, a reception means, a calculation means, a specifying means, a second display data generation means, and a second transmission means of a server apparatus according to the present invention.

The search server 1B may be formed by a plurality of server apparatuses, such as a server that manages various databases, a search processing server that executes a search process of a Web page, and a WWW server that provides various pieces of information.

[5.3. Display of Search Results]

A display mode of search results when the corresponding Web pages are searched in the search system SB will be described with reference to FIG. 32.

When the Web pages are searched, the search server 1B transmits, to the user terminal 2, search results that are search result pages, which indicate a list of Web page information (example of "information") related to the corresponding Web pages (example of "targets") satisfying the search conditions input by the user. FIG. 32 is a diagram showing a screen display example when the user terminal 2 displays the search result pages.

Figure 32:
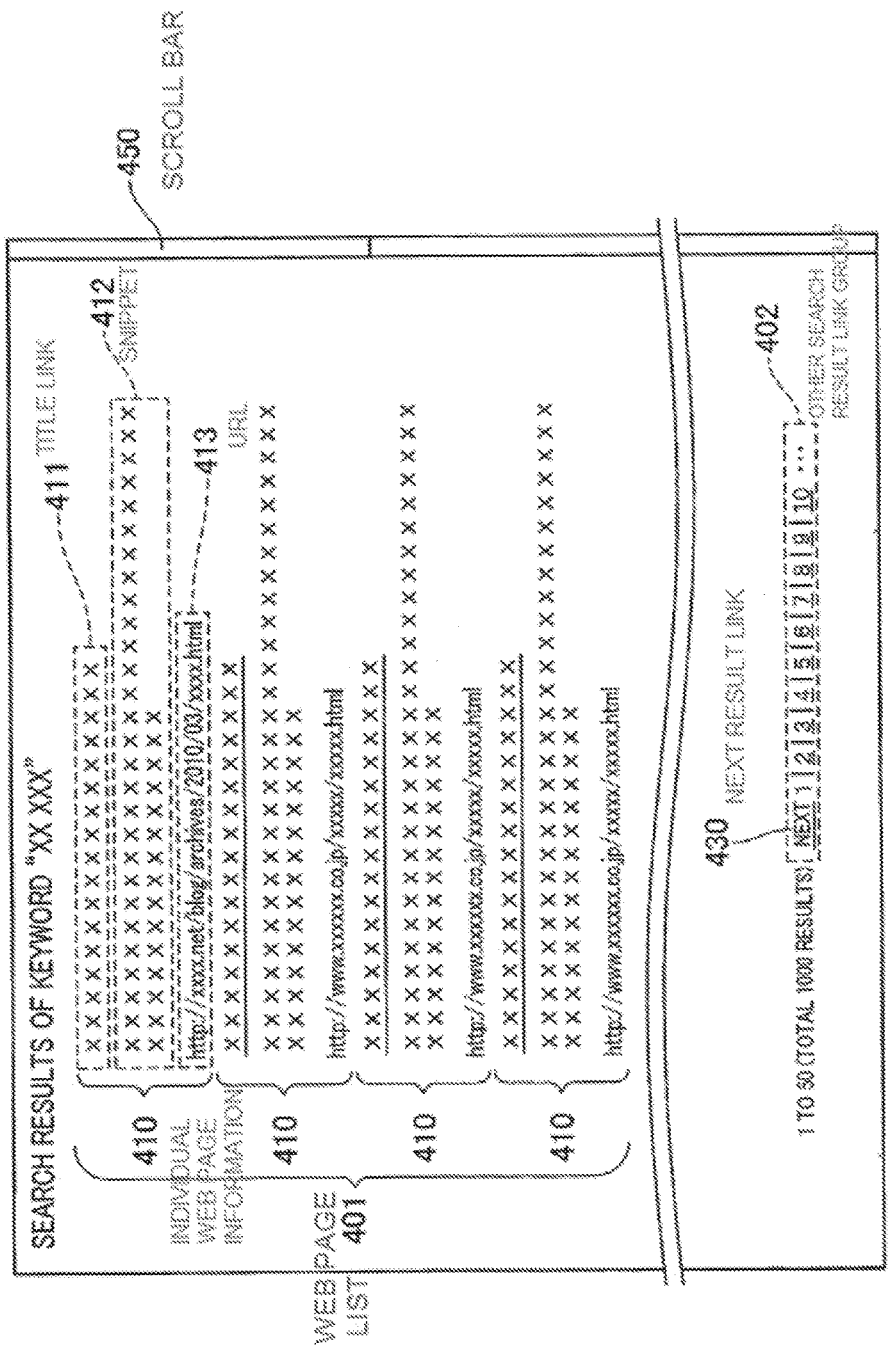
FIG. 32 is a diagram showing a screen display example of a search result page of the user terminal 2 according to the fifth embodiment.

As shown in FIG. 32, a corresponding Web page list 401, an other search result link group 402, and the like are displayed on the search result pages according to the fifth embodiment.

A list of the corresponding Web pages satisfying the search conditions is displayed on the corresponding Web page list 401. Specifically, the corresponding Web page list 401 includes a plurality of pieces of individual Web page information 410. The individual Web page information 410 indicates Web page information of one corresponding Web page. The individual Web page information 410 includes a title link 411 (example of "link information"), a snippet 412 of the corresponding Web page, and a URL 413 of the corresponding Web page. The title link 411 is a link (hyperlink) for displaying the title of the corresponding Web page. When the user selects (for example, clicks) the title link 411, the URL of the corresponding Web page is accessed, and the Web page is displayed.

The number of corresponding products displayed in the corresponding Web page list 401 will be called "the number of display items". An initial value (50 in the present embodiment) of the number of display items is determined in advance in the search system SB. The initial value of the number of display items can also be changed by the user setting.

The other search result link group 402 includes a plurality of links for transition to search result pages for displaying a list of Web pages different from the Web pages displayed as a list in the current corresponding Web page list 401, among the corresponding Web pages satisfying the search conditions. For example, when the user selects a link displaying a page number, the page is switched to the search result page of the page number corresponding to the link. When the user selects a next result link 430 indicated "Next", the currently displayed search result page is switched to the next search result page. For example, if the next result link 430 is selected when a list of 1st to 50th corresponding Web pages is currently displayed, the page is switched to the search result page displaying a list of 51st and subsequent corresponding Web pages. In this way, a predetermined number of corresponding Web pages are displayed on each page. If the entire search result page cannot be displayed on one screen, a scroll bar 450 is displayed on the screen of the user terminal 2. When the scroll bar 450 is operated, scroll display of the search result page is presented.

In the search result page, each piece of the individual Web page information 410 of the corresponding Web page list 401 displays the title link 411 (example of "link information"), the snippet 412 of the corresponding Web page, the URL 413 of the corresponding Web page, and the like. If the user finds an interesting Web page while browsing the search result page, the user can click the title link 411 to browse the Web page.

If the corresponding Web pages displayed on the search result pages can be displayed by narrowing down the corresponding Web pages to Web pages related to the Web page the user is interested in, the burden of the user in browsing can be reduced. Particularly, if the corresponding Web pages obtained as search results include a large amount of Web pages the user is not interested in, the burden of browsing can be significantly reduced. Therefore, the search system SB of the present embodiment specifies the Web page the user is interested in based on the details of the operation when the user is browsing the search result pages. The corresponding Web pages displayed on the search result pages are displayed by narrowing down the corresponding Web pages to the Web pages related to the specified Web page.

To realize this, the search system SB records the details of the operation when the user is browsing the search result pages. Specifically, the type of the operation by the user (for example, click operation), the target of the operation (for example, the title link 411), the time of the operation, and the like are recorded. The time here may not necessarily be the actual time, but the time can be an elapsed time from a reference time, in which time of predetermined control (for example, time of display of the search result pages or time of display (or update) of the corresponding Web page list 401) serves as a reference (0 second). More specifically, based on the recorded details of operation, the search system SB can determine when, for what, and what kind of operation the user has performed, or when the user was not performing the operation. Examples of the operations performed by the user include an operation of using an input interface, such as a mouse and a keyboard, to select (for example, click) the link of the title link 411 or the other search result link group 402 and an operation of changing the position of the scroll bar 450.

The fact that there is an operation for a Web page displayed on the list can mean that the user at least has an interest in the operated Web page. On the other hand, the fact that there is no operation for a Web page displayed on the list can mean that the user has no interest in the Web page. Therefore, the search system SB specifies the Web page the user is interested in based on the details of the operation of the user when the search result pages are displayed.

[5.4. Operation of Search System SB]

A summary of operation of the search system SB in displaying the search result pages will be described. The operation of the search system SB according to the fifth embodiment is similar to the example of operation of the shopping system S according to the first embodiment described with reference to FIG. 5 and FIG. 6. Therefore, the operation of the search system SB according to the fifth embodiment will be described with reference to FIG. 5 and FIG. 6. In this case, the shopping server 1 in FIG. 5 is reread as the search server 1B, and the detail page is reread as the corresponding Web page. The shopping server 1 in FIG. 6 is reread as the search server 1B, and the product is reread as the Web page.

As shown in FIG. 5, the system control unit 36 of the user terminal 2 first receives input of search conditions by the user (step S11A). The system control unit 36 of the user terminal 2 then transmits a search request including the input search conditions to the search server 1B (step S12A).

Meanwhile, the system control unit 20B of the search server 1B is in a standby state until the search request is received (step S11B: NO). When the search request is received (step S11B: YES), the system control unit 20B executes a search process based on the search conditions included in the received search request (step S12B). The system control unit 20B transmits, to the user terminal 2, a search result page (example of "first display data") for displaying a list indicating Web page information of corresponding Web pages equivalent to the number of display items (step S13B).

When the search result page is received, the system control unit 36 of the user terminal 2 causes the display unit 32 to display the search result page (step S13A). The system control unit 36 determines whether operation for displaying a corresponding Web page is detected (step S14A). The operation for displaying a corresponding Web page is an operation of selecting the title link 411. If the system control unit 36 determines that the operation for displaying a corresponding Web page is not detected (step S14A: NO), the process moves to step S19A. On the other hand, if the system control unit 36 determines that the operation for displaying a corresponding Web page is detected (step S14A: YES), the system control unit 36 transmits, to the search server 1B, a corresponding Web page request including URL information indicating the URL corresponding to the operated title link 411 (step S15A).

After the process of step S13B, the system control unit 20B of the search server 1B is in the standby state until one of the corresponding Web page request, the return request, and the next result request is received or until the communication with the user terminal 2 has timed out (step S14B: No, step S16B: NO, step S18B: NO, step S19B: NO). When the corresponding Web page request is received (step S14B: YES), the system control unit 20B acquires the corresponding Web page based on the URL information included in the corresponding Web page request and transmits the corresponding Web page to the user terminal 2 (step S15B).

When the corresponding Web page is received, the system control unit 36 of the user terminal 2 causes the display unit to display the corresponding Web page (step S16A). The system control unit 36 then determines whether a back operation is detected (step S17A). The back operation is an operation for returning to the search result page displayed when the process of step S14A is executed. Specifically, the back operation is an operation of pressing the back button arranged on the Web browser. The system control unit 36 is in the standby state until the detection of the back operation (step S17A: NO). When the system control unit 36 determines that the back operation is detected (step S17A: YES), the system control unit 36 transmits a return request to the search server 1B (step S18A).

When the return request is received (step S16B: YES), the system control unit 20B of the search server 1B retransmits the search result page displayed on the user terminal 2 when the process of step S14B is executed (step S13B). If the search result page is to be transmitted in the process of step S13B, the system control unit 20B holds the search result page in the storage unit 15 so that the search result page can be retransmitted. More specifically, in the retransmission of the search result page based on the reception of the return request, the system control unit 20B retransmits the search result page transmitted in the most recent process of step S13B. When the retransmitted search result page is received, the system control unit 36 of the user terminal 2 causes the display unit 32 to display the search result page (S13A).

The system control unit 36 of the user terminal 2 determines whether a next page display operation is detected when the search result page is displayed (step S19A). The next page display operation is an operation for displaying the next page, and specifically, is an operation of selecting the next result link 230. If the system control unit 36 determines that the next page display operation is not detected (step S19A: NO), the process moves to step S21A. On the other hand, if the system control unit 36 determines that the next page display operation is detected (step S19A: YES), the system control unit 36 transmits the next result request and user operation information indicating the details of the operation of the user to the search server 1B (step S20A). The system control unit 36 records the details of the operation of the user from the display of the search result page received from the search server 1B to the detection of the next page display operation in the storage unit 34. In step S20A, the user operation information indicating the recorded details of operation is transmitted. Although the system control unit 36 transmits the next result request and the user operation information to the search server 1B in the process of step S20A, the next result request and the user operation information may not necessarily be transmitted at the same time. For example, the system control unit 36 may transmit the user operation information before or after the process of step S20A, independently from the next result request.

When the next result request and the user operation information indicating the details of the operation are received (step S17B: YES), the system control unit 20B of the search server 1B executes a narrow-down process (step S18B).

The narrow-down process by the system control unit 20B of the search server 1B will be described with reference to FIG. 6. The system control unit 20B of the search server 1B first calculates the degree of interest for each corresponding Web page (will be called "degree-of-interest calculation target Web page") displayed on the search result page when the next result request is transmitted (step S31). In this case, the system control unit 20B calculates the degree of interest of the user based on the details of the operation of the user indicating the user operation information received along with the next result request in the process of step S17B of FIG. 5. Specifically, the system control unit 20B calculates the degree of interest of the user for the Web page based on the number of selections of the link (the title link 411) displayed in the individual Web page information 410 corresponding to the Web page. The system control unit 20B adds two points to the degree of interest of the user for the Web page for each of the number of selections of the link.

The system control unit 20B then compares the degree of interest of the user for each degree-of-interest calculation target Web page with a predetermined threshold (for example, three points) (step S32). The system control unit 20B generates a specific Web page list including only the Web pages with the degrees of interest of the user higher than the predetermined threshold (step S33). In fact, Web page URLs of the Web pages with the degrees of interest of the user higher than the predetermined threshold are registered in the specific Web page list. Therefore, the process of step S33 corresponds to an example of "specifying the target" of the present invention.

The system control unit 20B then determines whether the Web pages are registered in the specific Web page list (step S34).

If the system control unit 20B determines that the Web pages are not registered in the specific Web page list (step S34: NO), the process in the flow chart is finished. On the other hand, if the system control unit 20B determines that the Web pages are registered in the specific Web page list (step S34: YES), the system control unit 20B extracts a predetermined number (for example, two) of upper Web pages from the specific Web page list (step S35). The upper Web pages here denote Web pages with high degrees of interest. If the predetermined number of Web pages are not registered in the specific Web page list, all registered Web pages may be extracted.

The system control unit 20B then acquires keywords (will be called "narrow-down keywords") associated with the extracted Web pages (step S36). Specifically, the system control unit 20B searches the Web page information DB 107B based on the Web page URLs of the extracted Web pages and acquires the keywords associated with the Web page URLs.

The system control unit 20B then narrows down the corresponding Web pages based on the acquired narrow-down keywords (step S37). Specifically, the system control unit 20B acquires the keywords associated with the corresponding Web pages from the Web page information DB 107B. The system control unit 20B narrows down the corresponding Web pages to only Web pages associated with one or more same keywords as the narrow-down keywords. The corresponding Web pages may be narrowed down to only Web pages associated with at least a predetermined number (for example, two) of same keywords as the narrow-down keywords.

In this way, according to the present embodiment, the corresponding Web pages are narrowed down every time the process of step S37 in the narrow-down process is executed. An upper limit may be set for the number of times of narrowing down the corresponding Web pages in the narrow-down process.

When the process of step S37 is finished, the system control unit 20B finishes the process in the flow chart.

Returning to FIG. 5, when the narrow-down process (step S18B) is finished, the system control unit 20B transmits a search result page for displaying the corresponding Web pages to the user terminal 2 (step S13B). Specifically, if the process of step S37 of the narrow-down process (see FIG. 6) is not executed (if the degree of interest is not higher than the predetermined threshold), the system control unit 20B transmits the search result page for displaying the Web pages to be displayed following the Web pages displayed when the most recent next result request is received. If the process of step S37 of the narrow-down process (see FIG. 6) is executed (if the degree of interest is higher than the predetermined threshold), the system control unit 20B transmits the search result page (example of "second display data") for displaying, from the first corresponding Web page, the corresponding Web pages narrowed down in the process. If the upper limit is set for the number of times of narrowing down the corresponding Web pages in the narrow-down process as described above, the system control unit 20B skips the narrow-down process (step S18B) if the number of times of narrowing-down has reached the upper limit. The system control unit 20B transmits the search result page for displaying the Web pages to be displayed following the Web pages displayed when the most recent next result request is received.

Meanwhile, the system control unit 36 of the user terminal 2 determines whether a finish operation is detected when the search result pages are displayed (step S21A). An example of the finish operation includes a close operation for closing the Web browser. If the system control unit 36 determines that the finish operation is not detected (step S21A: NO), the process moves to step S14A. On the other hand, if the system control unit 36 determines that the finish operation is detected (step S21A: YES), the process in the flow chart is finished.

If the system control unit 20B of the search server 1B determines that the communication with the user terminal 2 has timed out (step S19B: YES), the process in the flow chart is finished.

As described, according to the fifth embodiment, 50 (example of "predetermined number") pieces of Web page information of the corresponding Web pages (example of "targets") are displayed on each of the search result pages. The system control unit 20B of the search server 1B receives the next result request (example of "acquisition request of a next predetermined number of pieces of information") and the user operation information indicating the details of the operation of the user for the Web page displayed when the next result request is transmitted, calculates the degrees of interest of the user for the Web pages based on the received user operation information, specifies the Web pages with the calculated degrees of interest of the user higher than the predetermined threshold, acquires the keywords based on the specified Web pages, narrows down the corresponding Web pages based on the acquired keywords, and generates and transmits the search result pages including the Web page information of the narrowed-down corresponding Web pages.

Therefore, according to the search server 1B of the fifth embodiment, 50 corresponding Web pages are displayed on each page. If the degrees of interest of the user for the Web pages corresponding to the displayed Web page information are high, the Web page information of the Web pages narrowed down based on the degrees of interest of the user in the previous page is displayed next on the page displayed by the next page display operation. Therefore, the user can check the Web page information of the Web pages in each page. If there is an interesting Web page in the displayed page, the user can check only the Web page information of the Web pages related to the interesting Web page in the next page.

In the fifth embodiment, the system control unit 20B of the search server 1B calculates higher degrees of interest of the user for corresponding Web pages corresponding to the title links 411 with more numbers of operations of the user. In this way, the Web page information displayed on the search result pages can be narrowed down to Web page information of the corresponding Web pages associated with the same keywords as the corresponding Web pages with more numbers of operations for the title links 411 and higher degrees of interest of the user.

In the fifth embodiment, the system control unit 20B of the search server 1B receives the search conditions transmitted from the user terminal 2 and searches the Web pages based on the received search conditions to generate the search result pages including the Web page information of the searched corresponding result pages. In this way, even if a large amount of corresponding Web pages are searched by the search conditions, the Web page information can be displayed by narrowing down the Web page information to the Web page information the user is interested in, without imposing a burden on the user in providing the Web page information to the user.

In the fifth embodiment, the Web pages with the degrees of interest of the user higher than the predetermined threshold are registered in the specific Web page list (step S33 of FIG. 6), and the predetermined number of upper Web pages are extracted (step S35). However, instead of generating the specific Web page list, the keywords associated with the specified Web page may be acquired every time the Web page with the degree of interest of the user higher than the predetermined threshold is specified (step S36).

[5.5. Sorting Process]

As in the first embodiment, the Web page information of the Web pages related to the Web page the user is interested in may be preferentially displayed in the fifth embodiment. More specifically, the Web page the user is interested in may be specified based on the details of the operation when the user is browsing the search result pages, and the order of display of the Web pages related to the specified Web page may be raised in displaying the Web page information of the corresponding Web pages in the search result pages. In this way, the operation when the search system SB rearranges (sorts) the corresponding Web pages is similar to the operation when the shopping system SB according to the first embodiment described with reference to FIG. 9 to FIG. 13F rearranges (sorts) the corresponding products. Therefore, the detailed description will be skipped. The sort result display area 240 in FIG. 9 may be arranged in the search result pages shown in FIG. 32 to display the information as described with reference to FIG. 13A to FIG. 13F.

When the Web page information of the corresponding Web pages related to the corresponding Web page the user is interested in is preferentially displayed, 50 (example of "predetermined number") pieces of Web page information of the corresponding Web pages (example of "targets") are displayed on each of the search result pages. The system control unit 20B of the search server 1B receives the next result request (example of "acquisition request of a next predetermined number of pieces of information") and the user operation information indicating the details of the operation of the user for the search result pages displayed when the next result request is transmitted, calculates the degrees of interest of the user for the corresponding Web pages based on the received user operation information, specifies the corresponding Web pages with the calculated degrees of interest of the user higher than the predetermined threshold, acquires the keywords based on the specified corresponding Web pages, determines the order of display of the Web page information of the corresponding Web pages based on the acquired keywords, and transmits the search result pages for displaying the Web page information of the corresponding Web pages in the determined order of display.

Therefore, according to the search server 1B when the Web page information of the corresponding Web pages related to the corresponding Web page the user is interested in is preferentially displayed, 50 pieces of corresponding Web pages are displayed on each page. If the degree of interest of the user for the displayed search result page is high, the Web page information of the corresponding Web pages in the next and subsequent pages displayed by the next page display operation is displayed by sorting the Web page information based on the degree of interest of the user in the previous page. Therefore, the user can check the Web page information of the corresponding Web pages in each page, and if there is an interesting corresponding Web page in the displayed search result page, the user can preferentially check the Web page information of the corresponding Web pages related to the interesting corresponding Web page in the next and subsequent pages.

When the Web page information of the Web pages related to the Web page the user is interested in is preferentially displayed, the system control unit 20B of the search server 1B calculates higher degrees of interest of the user for the corresponding Web pages corresponding to the title links 411 with more numbers of operations of the user. In this way, the Web page information of the corresponding Web pages associated with the same keywords as the corresponding Web pages with more numbers of operations for the title links 411 and with higher degrees of interest of the user can be preferentially displayed.

When the Web page information of the Web pages related to the Web page the user is interested in is preferentially displayed, the system control unit 20B of the search server 1B receives the search conditions transmitted from the user terminal 2 and searches the Web pages based on the received search conditions to generate the search result pages including the Web page information of the searched corresponding Web pages. In this way, even if a large amount of corresponding Web pages are searched by the search conditions, the Web page information of the corresponding Web pages the user is interested in can be preferentially displayed without imposing a burden on the user in providing the Web page information to the user.

[5.6. Change in Display Mode]

In the first embodiment, the Web page information of the corresponding Web pages displayed on the search result pages are displayed by narrowing down the Web page information to the Web page information of the Web pages related to the Web page the user is interested in (Web pages with the same keywords as the Web page the user is interested in). In place of this, (1) the display mode of the Web page information of the Web pages related to the Web page the user is interested in may be different from the display mode of the Web page information of the Web pages related to other Web pages (Web pages other than the Web page the user is interested in), or (2) a display mode may be adopted in which the Web page information of the Web pages related to other Web pages (Web pages other than the Web page the user is interested in) is collapsed and not displayed until a collapse cancellation operation of the user is detected. Examples of (1) include enlarging the display character size of the Web page information of the Web pages related to the Web page the user is interested in, changing the color of the characters or background color of the part displaying the Web page information, and applying a mask process to the part displaying the Web page information of the Web pages related to the Web pages other than the Web page the user is interested in. In this way, even if the Web page information of the Web pages related to the Web page the user is interested in is preferentially displayed, the burden of the user in browsing can be reduced.

[5.7. Modified Examples]

Modified examples of the fifth embodiment will be described.

[5.7.1. Method of Calculating Degree of Interest of User]

A modified example related to the method of calculating the degree of interest of the user will be described.

[5.7.1.1. Calculation Method Based on Order of Operation of Links]

It is estimated that the title link 411 corresponding to the Web page the user is more interested in is selected earlier, among the title links 411 displayed on the Web pages in the search result pages. Therefore, the degrees of interest for the corresponding Web pages can be calculated based on the order of selection of the title links 411. For example, the system control unit 20 can set higher degrees of interest for Web pages with earlier order of selection of the title links 411, such as by providing five points to the degree of interest for the Web page corresponding to the title link 411 selected first, providing four points to the degree of interest for the Web page corresponding to the title link 411 selected second, . . . , and providing one point to the degree of interest for the Web page corresponding to the title link 411 selected fifth. In this way, the Web page information displayed on the search result pages can be narrowed down to the Web page information of the Web pages associated with the same keywords as the Web pages with earlier order of operation for the title links 411 and with higher degrees of interest of the user. When the Web page information of the Web pages related to the Web page the user is interested in is preferentially displayed, the Web page information of the Web pages associated with the same keywords as the Web pages with earlier order of operation for the title links 411 and with higher degrees of interest of the user can be preferentially displayed.

[5.7.1.2. Calculation Method Based on Display Time of Corresponding Web Pages]

It is estimated that the display time of the corresponding Web pages is longer for the corresponding Web pages that the user is highly interested in. Therefore, the degree of interest of the user for each corresponding Web page can be calculated based on the display time of each corresponding Web page. For example, the system control unit 20B adds one point to the degree of interest to the corresponding Web page every 30 seconds of the display time of the corresponding Web page.

There can be two methods for acquiring the display time of the Web pages by the system control unit 20B of the search server 1B. The first is a method for the user terminal 2 to measure the display time of the corresponding Web pages to transmit information indicating the measured display time. The second is a method for the system control unit 20B to calculate the display time from the time difference between the time of transmission of the corresponding Web page based on the reception of the corresponding Web page request (step S15B) and the time of transmission of the search result page based on the reception of the return request (step S13B).

It is preferable to take into account whether the user has been actually browsing the corresponding Web page in the calculation of the degree of interest of the user based on the display time of the corresponding Web page. More specifically, if the display time of the corresponding Web page is long because the user has been performing another operation, it is preferable not to calculate the degree of interest of the user high. Therefore, if the display time of the corresponding Web page exceeds a predetermined time, it is determined that the user has not been browsing the corresponding Web page, and the degree of interest of the user for the corresponding Web page is set to "0" point. An example of the predetermined time that can be set includes a time that is n times of the average time of browsing of the corresponding Web page.

According to the modified example, the Web page information displayed on the search result pages can be narrowed down to the Web page information of the corresponding Web pages associated with the same keywords as the corresponding Web page with long browsing time and high degree of interest of the user. When the Web page information of the corresponding Web pages related to the corresponding Web page the user is interested in is preferentially displayed, the Web page information of the corresponding Web pages associated with the same keywords as the corresponding Web page with long browsing time and high degree of interest of the user can be preferentially displayed.

[5.7.2.1. Target of Narrow-Down Process]

As in a modified example of the first embodiment, the corresponding Web pages already displayed on the search result pages may be removed from the target of the narrow-down process. The system control unit 20B removes the corresponding Web pages already displayed on the search result pages from the target of the narrow-down process. In this way, the user does not check the same corresponding Web pages again and again, and the burden of the user in browsing can be reduced.

[5.7.2.2. Target of Sorting Process]

As in a modified example of the first embodiment, the corresponding Web pages already displayed on the search result pages may be removed from the target of the sorting process. The system control unit 20B removes the corresponding Web pages already displayed on the search result pages from the target of the sorting process. In this way, the user does not have to check the same corresponding Web pages again and again, and the burden of the user in browsing can be reduced.

[5.7.3. Cancellation of Narrowing-Down]

As in a modified example of the first embodiment, the narrowing-down may be cancelled if it is determined that the narrowing-down is not performed as the user has expected.

The modified example can prevent the continuation of the display of the Web pages narrowed down in a user's unintended format.

[5.7.4.1. Narrowing-Down by Narrow-Down Keywords]

As in a modified example of the first embodiment, if there are a plurality of narrow-down keywords, the corresponding Web pages may be narrowed down to the Web pages associated with all same keywords as the narrow-down keywords. Each Web page may be associated in advance with keywords in each genre. The narrow-down keywords may be acquired based on the Web page and the genre the user is interested in, and the corresponding Web pages may be narrowed down by the acquired narrow-down keywords.

[5.7.4.2. Sort by Sorting Keywords]

As in a modified example of the first embodiment, each Web page may be associated in advance with keywords in each genre, and the order of display of the corresponding Web pages may be determined based on the Web page and the genre the user is interested in.

[5.7.5. Order of Display after Narrow-Down Process]

As in a modified example of the first embodiment, the order of display of the corresponding Web pages in displaying the corresponding Web pages on the search result pages after the narrow-down process may be the descending order of the degrees of interest of the user.

[5.7.6. Relative Evaluation for Degrees of Interest of User]

As in a modified example of the first embodiment, the system control unit 20B may calculate and compare the degrees of interest for all degree-of-interest calculation target Web pages in the narrow-down process (or sorting process) and register the corresponding Web pages with higher degrees of interest of the user in the specific Web page list as corresponding Web pages with high degrees of interest of the user. The Web pages with higher degrees of interest of the user may be, for example, top three corresponding Web pages or may be corresponding Web pages included in top 20% of the degree-of-interest calculation target Web pages. The corresponding Web pages with higher degrees of interest of the user may not be registered in the specific Web page list if the degrees of interest are below the predetermined threshold. According to the modified example, the corresponding Web pages are narrowed down to the corresponding Web pages associated with the keywords corresponding to the corresponding Web pages with high degrees of interest of the user. Therefore, the corresponding Web pages can be narrowed down to the corresponding Web pages the user is interested in, without imposing a burden on the user. When the Web page information of the corresponding Web pages related to the corresponding Web pages the user is interested in is preferentially displayed, the Web page information of the corresponding Web pages associated with the keywords corresponding to the corresponding Web pages with high degrees of interest of the user can be preferentially displayed. Therefore, the user can preferentially acquire the Web page information of interesting corresponding Web pages without any burden.

[5.7.7. Execution Period of Narrow-Down Process and Sorting Process]

As in a modified example of the first embodiment, the system control unit 20B may execute the narrow-down process or the sorting process when the returning request is received (step S16B of FIG. 5 and FIG. 10: YES). In this case, the search result pages applied with the narrow-down process or the sorting process are transmitted to the user terminal 2.

As in a modified example of the first embodiment, in a configuration of opening and activating another window for displaying the corresponding Web page and inactivating the window for displaying the search result page when the user selects (clicks) the title link 411, the system control unit 20B may execute the narrow-down process or the sorting process when close information indicative of a close operation of closing the other window for displaying the corresponding Web page (for example, an operation of clicking the close button) is received from the user terminal 2. In this case, the system control unit 20B retransmits the search result pages applied with the narrow-down process or the sorting process (more specifically, the search result pages for displaying the narrowed-down Web page information or the search result pages for displaying the sorted Web page information) to the user terminal 2 to display the retransmitted search result pages on the window that is activated again by the close operation and that was displaying the search result pages.

The system control unit 20B may execute the narrow-down process or the sorting process when information indicative of an activation operation for activating an inactive window for displaying the search result pages (for example, operation of clicking the inactive window) is received from the user terminal 2. In this case, the system control unit 20B retransmits the search result pages applied with the narrow-down process or the sorting process to the user terminal 2 to display the retransmitted search result pages on the window that is activated again by the activation operation and that was displaying the search result pages.

The system control unit 20B may execute the narrow-down process or the sorting process when the title links 411 are selected (clicked) for a predetermined number of corresponding Web pages in one search result page. For example, the system control unit 20B executes the narrow-down process or the sorting process when corresponding Web page requests for two corresponding Web pages are received and transmits the search result pages applied with the narrow-down process or the sorting process to the user terminal 2 when a return request is received next. Although the predetermined number is two in the example described here, the predetermined number may be three or more.

The system control unit 20B may execute the narrow-down process or the sorting process when the title links 411 are selected (clicked) for a predetermined number of corresponding Web pages within a predetermined time from the display of one search result page. For example, the system control unit 20B executes the narrow-down process or the sorting process when corresponding Web page requests for three corresponding Web pages are received within five minutes from the transmission of the search result pages and transmits the search result pages applied with the narrow-down process or the sorting process to the user terminal 2 when five minutes have passed. Although the predetermined time is five minutes in the example described here, an arbitrary time may be set.

[5.7.8. Acquisition of Related Keywords]

In the acquisition of the related keywords in the process of step 36 of FIG. 6 or FIG. 11, the system control unit 20B may not only search the Web page information DB 107B based on the Web page URL of the Web page extracted in the process of step S35 to acquire the keywords associated with the Web page URL, but may also refer to a thesaurus DB to acquire synonyms of the keywords associated with the Web page URL as the related keywords. The thesaurus DB may be arranged on the storage unit 15, or a thesaurus DB arranged on a storage unit of an apparatus other than the search server 1B may be referenced.

In the acquisition of the related keywords in the process of step 36 of FIG. 6 or FIG. 11, the system control unit 20B may acquire the related page URL from the Web page information DB 107B based on the Web page URL of the Web page extracted in the process of step S35 and then search the Web page information DB 107B based on the acquired related Web page URL to acquire the keywords associated with the related Web page URL as the related keywords.

[5.8. First Display Data and Second Display Data]

The "first display data" of the present invention is a concept including not only the search result pages transmitted in the process of step S13B executed following the process of step S12B of FIG. 5 or FIG. 10, but is a concept also including the search result pages ("second display data" of the present invention) transmitted in the process of step S13B executed following the process of step S18B. More specifically, in the present invention, a process in which generated second display data serves as new first display data, and new second display data is further generated based on the operation information of the user for the new first display data can be repeated. The information displayed in the second display data is further narrowed down or sorted according to the repetition of the process.

6. Conclusion

As described, according to the shopping server 1 of the first embodiment or the second embodiment, the storage unit 15 (example of "storage means") stores the product DB 103 and the keyword DB 104. The system control unit 20 transmits, to the user terminal 2, the search result pages (example of "first display data") for displaying the product information of the corresponding products (products to be displayed), receives, from the user terminal 2, the user operation information indicating the details of the operation of the user when the product information of the corresponding products is displayed by the user terminal 2, calculates the degrees of interest of the user for the products displayed by the user terminal 2 based on the received user operation information, specifies products with the calculated degrees of interest of the user higher than the predetermined threshold, acquires the keywords corresponding to the specified products from the storage unit 15, narrows down the corresponding products to be displayed to the products associated with the same keywords as the acquired keywords, and transmits, to the user terminal 2, the search result pages (example of "second display data") for displaying the product information of the narrowed-down corresponding products.

Therefore, the degrees of interest of the user for the products corresponding to the product information displayed by the user terminal 2 are calculated based on the details of the operation of the user, and the product information to be displayed is narrowed down to the product information of the products associated with the same keywords as the products with high degrees of interest of the user. As a result, the product information can be displayed by narrowing down the product information to the product information the user is interested in, without imposing a burden on the user in providing the product information to the user.

When the product information of the products related to the product the user is interested in is preferentially displayed in the first embodiment or the second embodiment, the system control unit 20 transmits, to the user terminal 2, the search result pages (example of "first display data") for displaying the product information of the corresponding products, receives, from the user terminal 2, the user operation information indicating the details of the operation of the user when the product information of the corresponding products are displayed by the user terminal 2, calculates the degrees of interest of the user for the products displayed by the user terminal 2 based on the received user operation information, specifies the products with the calculated degrees of interest of the user higher than the predetermined threshold, acquires the keywords corresponding to the specified products from the storage unit 15, sorts the order of display for displaying the product information of the corresponding products to be displayed so that the order of display of the product information of the products associated with the same keywords as the acquired keywords becomes higher, and transmits, to the user terminal 2, the search result pages (example of "second display data") for displaying the product information of the corresponding products in the determined order of display.

Therefore, the degrees of interest of the user for the products corresponding to the product information displayed by the user terminal 2 are calculated based on the details of the operation of the user, and the product information of the products associated with the same keywords as the products with high degrees of interest of the user can be preferentially displayed. As a result, the product information the user is interested in can be preferentially displayed without imposing a burden on the user in providing the product information to the user.

According to the image providing server 1A of the fourth embodiment, the storage unit 15A (example of "storage means") stores the image keyword DB 104A. The system control unit 20A transmits, to the user terminal 2, the search result pages (example of "first display data") for displaying the corresponding images 711 (images to be displayed), receives, from the user terminal 2, the user operation information indicating the details of the operation of the user when the user terminal 2 is displaying the corresponding images 711, calculates the degrees of interest of the user for the images displayed by the user terminal 2 based on the received user operation information, specifies the images with the calculated degrees of interest of the user higher than the predetermined threshold, acquires the keywords corresponding to the specified images from the storage unit 15A, acquires the keywords corresponding to the specified images from the storage unit 15A, narrows down the corresponding images to be displayed to the images associated with the same keywords as the acquired keywords, and transmits the search result pages (example of "second display data") for displaying the narrowed-down corresponding images to the user terminal 2.

Therefore, the degrees of interest of the user for the images displayed by the user terminal 2 are calculated based on the details of the operation of the user, and the images to be displayed are narrowed down to the images associated with the same keywords as the images with high degrees of interest of the user. As a result, the images can be displayed by narrowing down the images to the images the user is interested in, without imposing a burden on the user in providing the image information to the user.

When the images related to the image the user is interested in is preferentially displayed in the fourth embodiment, the system control unit 20A transmits, to the user terminal 2, the search result pages (example of "first display data") for displaying the corresponding images 711, receives, from the user terminal 2, the user operation information indicating the details of the operation of the user when the user terminal 2 displays the corresponding images

711, calculates the degrees of interest of the user for the images displayed by the user terminal 2 based on the received user operation information, specifies the images with the calculated degrees of interest of the user higher than the predetermined threshold, acquires the keywords corresponding to the specified images from the storage unit 15, sorts the order of display in displaying the corresponding images to be displayed so that the order of display of the images associated with the same keywords as the acquired keywords becomes high, and transmits, to the user terminal 2, the search result pages (example of "second display data") for displaying the corresponding images in the determined order of display.

Therefore, the degrees of interest of the user for the images displayed by the user terminal 2 are calculated based on the details of the operation of the user, and the images associated with the same keywords as the images with high degrees of interest of the user can be preferentially displayed. As a result, the images the user is interested in can be preferentially displayed without imposing a burden on the user in providing the image information to the user.

In the display apparatus 500 of the third embodiment, the storage unit 505 (example of "storage means") stores the image DB 5051 and the keyword DB 5052. The system control unit 507 generates the display data (example of "first display data") for displaying the plurality of athlete images 611 to be displayed, causes the display unit 502 to display the athlete images 611 based on the generated display data, acquires the user operation information indicating the details of the operation of the user when the display unit 502 displays the athlete images 611, calculates the degrees of interest of the user for the athlete images 611 displayed on the display unit 502 based on the acquired user operation information, specifies the athlete images 611 with the calculated degrees of interest of the user higher than the predetermined threshold, refers to the storage unit 505 that stores the athlete images in association with the keywords corresponding to the athlete images, acquires the keywords associated with the specified athlete images, and narrows down the athlete images to be displayed to the athlete images associated with the same keywords as the acquired keywords or sorts the order of display in displaying the athlete images to be displayed so that the order of display of the athlete images associated with the same keywords as the acquired keywords becomes high. The display data (example of "second display data) for displaying the narrowed-down athlete images or the display data (example of "second display data") for displaying the athlete images according to the sorted order of display is generated, and the athlete images 711 are displayed on the display unit 502 based on the generated display data.

Therefore, the degrees of interest of the user for the athlete images displayed by the display apparatus 500 are calculated based on the details of the operation of the user. The athlete images to be displayed can be narrowed down to the athlete images associated with the same keywords as the athlete images with high degrees of interest of the user, or the athlete images associated with the same keywords as the athlete images with high degrees of interest of the user can be preferentially displayed. The athlete images can be displayed by narrowing down the athlete images to the athlete images the user is interested in, or the athlete images the user is interested in can be preferentially displayed, without imposing a burden on the user in providing the athlete image information to the user.

In the first embodiment or the second embodiment, the keywords associated with the products with the calculated degrees of interest of the user higher than the predetermined threshold are acquired, and the products for displaying the product information are narrowed down to the products associated with the same keywords as the acquired keywords. In place of this, the keywords associated with the products with the calculated degrees of interest of the user lower than the predetermined threshold may be acquired. The products for displaying the product information may be narrowed down to the products not associated with the same keywords as the acquired keywords, or the order of display in displaying the product information for the products to be displayed may be sorted so that the order of display of the product information of the products not associated with the same keywords as the acquired keywords becomes high. In this case, the product information to be displayed can be narrowed down to the product information of the products not associated with the keywords corresponding to the products with low degrees of interest of the user, or the product information of the products not associated with the same keywords as the products with low degrees of interest of the user can be preferentially displayed. Therefore, the product information can be displayed by narrowing down the product information to the product information the user is interested in, or the product information the user is interested in can be preferentially displayed, without imposing a burden on the user in providing the product information to the user.

Similarly, in the fourth embodiment, the keywords associated with the calculated degrees of interest of the user higher than the predetermined threshold are acquired. The corresponding images to be displayed are narrowed down to the images associated with the same keywords as the acquired keywords, or the order of display is sorted so that the order of display of the images associated with the same keywords as the acquired keywords becomes high. In place of this, the keywords associated with the images with the calculated degrees of interest of the user lower than the predetermined threshold may be acquired. The corresponding images to be displayed may be narrowed down to the images not associated with the same keywords as the acquired keywords, or the order of display in displaying the corresponding images to be displayed may be sorted so that the order of display of the images not associated with the same keywords as the acquired keywords becomes high. In this case, the corresponding images to be displayed can be narrowed down to the images not associated with the keywords corresponding to the images with low degrees of interest of the user, or the images not associated with the same keywords as the images with low degrees of interest of the user can be preferentially displayed. Therefore, the images can be displayed by narrowed down the images to the images the user is interested in, or the images the user is interested in can be preferentially displayed, without imposing a burden on the user in providing the image information to the user. The same applies to the third embodiment.

Similarly, in the fifth embodiment, the keywords associated with the corresponding Web pages with the calculated degrees of interest of the user higher than the predetermined threshold are acquired, and the corresponding Web pages for displaying the Web page information are narrowed down to the corresponding Web pages associated with the same keywords as the acquired keywords. In place of this, the keywords associated with the corresponding Web pages with the calculated degrees of interest of the user lower than the predetermined threshold may be acquired. The corresponding Web pages for displaying the Web page information may be narrowed down to the corresponding Web pages not associated with the same keywords as the acquired keywords, or the order of display in displaying the Web page information of the corresponding Web pages to be displayed may be sorted so that the order of display of the Web page information of the corresponding Web pages not associated with the same keywords as the acquired keywords becomes high. In this case, the Web page information to be displayed can be narrowed down to the Web page information of the corresponding Web pages not associated with the keywords corresponding to the corresponding Web pages with low degrees of interest of the user, or the Web page information of the corresponding Web pages not associated with the same keywords as the corresponding Web pages with low degrees of interest of the user can be preferentially displayed. Therefore, the Web page information can be displayed by narrowing down the Web page information to the Web page information the user is interested in, or the Web page information the user is interested in can be preferentially displayed, without imposing a burden on the user in providing the Web page information to the user.

In the first embodiment and the second embodiment, various databases, such as the member DB 101, the shop DB 102, the product DB 103, the keyword DB 104, and the member usage DB 105, are constructed on the storage unit 15 in the shopping server 1. In place of this, the databases may be constructed on a storage unit of another server that can be accessed by the shopping server 1, and the system control unit 20 of the shopping server 1 may access the DBs 101 to 105 as necessary. Similarly, the image keyword DB 104A in the fourth embodiment may be constructed on a storage unit of another server that can be accessed by the image providing server 1A, and the system control unit 20A of the image providing server 1 may access the image keyword DB 104A as necessary. Similarly, the Web page information DB 107B in the fifth embodiment may be constructed on the storage unit of another server that can be accessed by the search server 1B, and the system control unit 20B of the search server 1B may access the Web page information DB 107B as necessary.

In the first embodiment and the second embodiment, although the product IDs and the product information are associated and registered in the product DB 103, the product IDs and tag information (for example, metadata) may be associated and registered.

In the embodiments, the targets (products (first and second embodiments), athlete images (third embodiment), images (fourth embodiment), and Web pages (fifth embodiment)) are registered in the keyword DB (the image keyword DB 104A in the fourth embodiment and the Web page information DB 107B in the fifth embodiment) in association with the keywords, and the targets to be displayed are narrowed down, or the order of display is sorted based on the keywords associated with the targets with high degrees of interest of the user. In place of this, the targets and attribute information may be associated and registered in an attribute information DB, and the targets to be displayed may be narrowed down, or the order of display may be sorted based on the attribute information associated with the targets with high degrees of interest of the user.

A narrow-down process based on the attribute information registered in the attribute information DB will be described with reference to FIG. 33. FIG. 33 is a diagram showing an example of a part of the attribute information DB, and particularly, FIG. 33 illustrates a part corresponding to a product "digital camera" as well as attribute information "maker" and "the number of pixels". For example, the maker of a digital camera with a product ID "DC0001" is "Company A", and the number of pixels is "greater than 3 million and equal to or smaller than 5 million".

In a case in which at least the product information of the products with the product IDs "DC0001" to "DC0005" is to be displayed, a case in which the degree of interest of the user for the digital camera with the product ID "DC0001" is higher than a predetermined threshold (or relatively higher than the other products), and the product information to be displayed is narrowed down based on the digital camera with the product ID "DC0001" will be considered. In this case, the attribute information of the digital camera with the product ID "DC0001" is acquired, and the product information to be displayed is narrowed down based on the acquired attribute information. Specifically, the product information is narrowed down to the product information of the products associated with the same attribute information as the acquired attribute information. More specifically, the product information is narrowed down to the product information of the products at least associated with the same attribute information as the attribute information of the digital camera with the product ID "DC0001" (maker: "Company A", the number of pixels: "greater than 3 million and equal to or smaller than 5 million"). Therefore, at least the digital camera of the product ID "DC0003" with the same attribute information of the maker and the digital camera of the product ID "DC0004" with the same attribute information of the number of pixels are extracted in the narrow-down process. In this way, the narrow-down process can also be executed based on the attribute information, in place of the keywords.

A sorting process based on the attribute information registered in the attribute information DB will be described with reference to FIG. 34. FIG. 34 is a diagram showing an example of the attribute information DB, and particularly, FIG. 34 illustrates parts corresponding to a product "digital camera" as well as attribute information "maker" and "the number of pixels". For example, the maker of the digital camera with the product ID "DC0001" is "Company A", and the number of pixels is "greater than 3 million and equal to or smaller than 5 million".

In a case in which the product information of the products with the product IDs "DC0001" to "DC0005" is to be displayed, a case in which the degree of interest of the user for the digital camera with the product ID "DC0001" is higher than a predetermined threshold (or relatively higher than the other products), and the order of display of the product information to be displayed is determined based on the attribute information associated with the digital camera with the product ID "DC0001" will be considered. In this case, the attribute information of the digital camera with the product ID "DC0001" is acquired, and the order of display of the product information to be displayed is determined based on the acquired attribute information. Specifically, the order of display of the product information associated with the same attribute information as the acquired attribute information is raised. More specifically, the order of display of the product information at least associated with the same attribute information as the attribute information of the digital camera with the product ID "DC0001" (maker: "Company A", the number of pixels: "greater than 3 million and equal to or smaller than 5 million") is raised. Therefore, the order of display of the digital camera of the product ID "DC0003" with the same attribute information of the maker and the digital camera of the product ID "DC0004" with the same attribute information of the number of pixels is raised.

In this way, the order of display of the information can be determined based on the attribute information, in place of the keywords.

REFERENCE SIGNS LIST 1 shopping server
11 shopping server/operation unit
12 shopping server/display unit
13 shopping server/communication unit
14 shopping server/drive unit
15 shopping server/storage unit
16 shopping server/input-output interface
17 shopping server/CPU
18 shopping server/ROM
19 shopping server/RAM
20 shopping server/system control unit
21 shopping server/system bus
101 member DB
102 shop DB
103 product DB
104 keyword DB
105 member usage DB
2 user terminal
31 user terminal/operation unit
32 user terminal/display unit
33 user terminal/communication unit
34 user terminal/storage unit
35 user terminal/input-output interface
36a user terminal/CPU
36b user terminal/ROM
36c user terminal/RAM
36 user terminal/system control unit
37 user terminal/system bus
NW network
S shopping system
500 display apparatus
501 display apparatus/operation unit
502 display apparatus/display unit
503 display apparatus/communication unit
504 display apparatus/drive unit
505 display apparatus/storage unit
506 display apparatus/input-output interface
507a display apparatus/CPU
507b display apparatus/ROM
507c display apparatus/RAM
507 display apparatus/system control unit
508 display apparatus/system bus
5051 image DB
5052 keyword DB
1A image providing server
11A image providing server/operation unit
12A image providing server/display unit
13A image providing server/communication unit
14A image providing server/drive unit
15A image providing server/storage unit
16A image providing server/input-output interface
17A image providing server/CPU
18A image providing server/ROM
19A image providing server/RAM
20A image providing server/system control unit
21A image providing server/system bus
104A image keyword DB
SA image providing system
1B search server
11B search server/operation unit
12B search server/display unit
13B search server/communication unit
14B search server/drive unit
15B search server/storage unit
16B search server/input-output interface
17B search server/CPU
18B search server/ROM
19B search server/RAM
20B search server/system control unit
21B search server/system bus
104B Web page information DB 107B
SB search system

The invention claimed is:

1. A server apparatus comprising:
at least one memory operable to store program code; and
at least one processor operable to access said at least one memory and operate as instructed by said program code, said program code comprising:
first list generation code that causes at least one of said at least one processor to generate a first list of information items about a plurality of targets by referring to a storage that stores information items about the plurality of targets that can be recognized by a user;
first transmission code that causes at least one of said at least one processor to transmit the generated first list to a terminal apparatus;
reception code that causes at least one of said at least one processor to receive, from the terminal apparatus, user operation information indicating information items selected by the user from the first list displayed on the terminal apparatus;
determination code that causes at least one of said at least one processor to determine a degree of interest of the user for a target corresponding to each of the information items selected by the user based on the received user operation information;
specifying code that causes at least one of said at least one processor to specify at least two targets for which the determined degree of interest of the user satisfies a predetermined condition;
related word acquisition code that causes at least one of said at least one processor to acquire words related to the at least two specified targets by referring to a related word database that stores words related to each of the plurality of targets;
second list generation code that causes at least one of said at least one processor to generate a second list of all or some of the information items included in the first list by prioritizing an information item about a given target related, in the related word database, to a certain number or higher words overlapping with the acquired words; and
second transmission code that causes at least one of said at least one processor to transmit, to the terminal apparatus, the generated second list to be displayed on the terminal apparatus,
wherein when there are one or more common words related in common to the at least two specified targets among the acquired words, the second list generation code causes at least one of said at least one processor to generate the second list by further prioritizing an information item about the given target related, in the related word database, to the one or more common words,
wherein the second list generation code causes at least one of said at least one processor to determine a display format of the information items of the targets included in the first list based on a number of the words overlapping with the acquired words respectively related to the at least two specified targets to generate the second list based on the determined display format, and wherein the second list generation code causes at least one of said at least one processor to specify a genre of an information item in which the user is interested among the information items displayed by the first list based on the received user operation information, and generate the second list by prioritizing an information item about a second given target related to a target among the at least two specified targets and the specified genre.

2. The server apparatus according to claim 1, wherein the second list generation code causes at least one of said at least one processor to narrow down the information items of the plurality of targets included in the first list based on a number of the words overlapping with the acquired words respectively related to the at least two specified targets to generate the second list including the narrowed-down information items of the plurality of targets.

3. The server apparatus according to claim 1, wherein the second list generation code causes at least one of said at least one processor to sort an order of display of the information items of the plurality of targets included in the first list based on a number of the words overlapping with the acquired words respectively related to the at least two specified targets to generate the second list.

4. The server apparatus according to claim 3, wherein when there are a plurality of words overlapping with the acquired words respectively related to the at least two specified targets, the second list generation code causes at least one of said at least one processor to generate the second list in such a way that an information item about the given target related to the certain number or higher overlapping words is displayed in a higher level.

5. The server apparatus according to claim 3, wherein the reception code causes at least one of said at least one processor to further receive, from the terminal apparatus, user operation information for information items selected by the user, among the second list displayed on the terminal apparatus;

the determination code causes at least one of said at least one processor to further determine the degree of interest of the user for the target corresponding to information item displayed by the second list based on the further received user operation information;

the specifying code causes at least one of said at least one processor to further specify a second plurality of targets for which the further determined degree of interest of the user satisfies a second predetermined condition; and when there are a plurality of words overlapping between the acquired words respectively related to the at least two specified targets and words corresponding to information items of the second plurality of targets that are further specified, the second list generation code causes at least one of said at least one processor to generate a new second list in such a way that an information item about the given target related to the certain number or higher overlapping words between the acquired words respectively related to the at least two specified targets and the words corresponding to the information items of the second plurality of targets that are further specified is displayed in a higher level.

6. The server apparatus according to claim 1, the program code further comprising:

third transmission code that causes at least one of said at least one processor to, when a page of a plurality of pages for displaying information items displayed by the second list is displayed on the terminal apparatus, and in a case where an operation for proceeding to a next page is performed within a predetermined period of time from a time when the page is displayed, transmit the first list or the second list most recently transmitted to the terminal apparatus.

7. The server apparatus according to claim 1, wherein the specifying code causes at least one of said at least one processor to specify the target for which the determined degree of interest is higher than a predetermined threshold, and the second list generation code causes at least one of said at least one processor to generate the second list by prioritizing an information item about the given target related to the certain number or higher words overlapping with the acquired words respectively related to the at least two specified targets.

8. The server apparatus according to claim 1, wherein the specifying code causes at least one of said at least one processor to specify a third plurality of targets for which the determined degree of interest is lower than a predetermined threshold, and the second list generation code causes at least one of said at least one processor to generate the second list by prioritizing an information item about a second given target other than an information item about a second target related to the certain number or higher words overlapping with the acquired words respectively related to the third plurality of specified targets.

9. The server apparatus according to claim 1, wherein the specifying code causes at least one of said at least one processor to, when a degree of interest of user for two or more targets is determined, compare the determined degree of interest, and specify a target for which the degree of interest of user is in a high level, and the second list generation code causes at least one of said at least one processor to generate the second list by prioritizing the specified target.

10. The server apparatus according to claim 1, wherein the first list further includes link information for displaying related information items of the targets, the reception code causes at least one of said at least one processor to receive user operation information including details of an operation of the user for the link information, and the determination code causes at least one of said at least one processor to determine the degree of interest of the user for a target corresponding to the link information to be operated based on the received user operation information.

11. The server apparatus according to claim 1, wherein the reception code causes at least one of said at least one processor to receive display time of the information items of displayed targets based on user operation for the first list, and the determination code causes at least one of said at least one processor to determine degrees of interest of the user for the displayed targets based on the received display time.

12. The server apparatus according to claim 1,
wherein the first list displays the information items of the plurality of targets in units of predetermined number of pieces, and
the reception code causes at least one of said at least one processor to receive, from the terminal apparatus, an acquisition request of a next predetermined number of information items and the user operation information including details of an operation of the user for the first list displayed on the terminal apparatus.

13. The server apparatus according to claim 1,
wherein the second list generation code causes at least one of said at least one processor to generate the second list excluding the targets with the information items already displayed by the first list.

14. The server apparatus according to claim 1, wherein when there are a plurality of words overlapping with the acquired words respectively related to the at least two specified targets, the second list generation code causes at least one of said at least one processor to generate the second list including a ratio indicator, the ratio indicator indicating a proportion of given targets associated with at least one of the overlapping plurality of words.

15. An information providing method by a server apparatus, the information providing method comprising:
generating a first list of information items about a plurality of targets by referring to a storage that stores information about targets that can be recognized by a user;
transmitting the generated first list to a terminal apparatus;
receiving, from the terminal apparatus, user operation information indicating information items selected by the user from the first list displayed on the terminal apparatus;
determining a degree of interest of the user for a target corresponding to each of the information items selected by the user based on the received user operation information;
specifying at least two targets for which the determined degree of interest of the user satisfies a predetermined condition;
acquiring words related to the at least two specified targets by referring to a related word database that stores words related to each of the plurality of targets;
generating a second list of all or some of the information items included in the first list by prioritizing an information item about a given target related, in the related word database, to a certain number or higher words overlapping with the acquired words; and
transmitting, to the terminal apparatus, the generated second list to be displayed on the terminal apparatus,
wherein when there are one or more common words related in common to the at least two specified targets among the acquired words, the second list is generated by further prioritizing an information item about the given target related, in the related word database, to the one or more common words,
wherein the generating the second list comprises:
determining a display format of the information items of the targets included in the first list based on a number of the words overlapping with the acquired words respectively related to the at least two specified targets to generate the second list based on the determined display format, and
specifying a genre of an information item in which the user is interested among the information items displayed by the first list based on the received user operation information, and generating the second list by prioritizing an information item about a second given target related to a target among the at least two specified targets and the specified genre.

16. An information providing system comprising:
a terminal apparatus; and a server apparatus that can be accessed by the terminal apparatus through a network,
the server apparatus comprising:
at least one memory operable to store program code; and
at least one processor operable to access said at least one memory and operate as instructed by said program code, said program code comprising:
first list generation code that causes at least one of said at least one processor to generate a first list of information items about a plurality of targets by referring to a storage that stores information about targets that can be recognized by a user;
first transmission code that causes at least one of said at least one processor to transmit the generated first list to the terminal apparatus;
first reception code that causes at least one of said at least one processor to receive, from the terminal apparatus, user operation information indicating information items selected by the user from the first list displayed on the terminal apparatus;
determination code that causes at least one of said at least one processor to determine a degree of interest of the user for a target corresponding to each of the information items selected by the user based on the received user operation information;
specifying code that causes at least one of said at least one processor to specify at least two targets for which the determined degree of interest of the user satisfies a predetermined condition;
related word acquisition code that causes at least one of said at least one processor to acquire words related to the at least two specified targets by referring to a related word database that stores words related to each of the plurality of targets;
second list generation code that causes at least one of said at least one processor to generate a second list of all or some of the information items included in the first list by prioritizing an information item about a given target related, in the related word database, to a certain number or higher words overlapping with the acquired words; and
second transmission code that causes at least one of said at least one processor to transmit, to the terminal apparatus, the generated second list to be displayed on the terminal apparatus,
wherein when there are one or more common words related in common to the at least two specified targets among the acquired words, the second list generation code causes at least one of said at least one processor to generate the second list by further prioritizing an information item about the given target related, in the related word database, to the one or more common words,
the terminal apparatus comprising:
at least one memory operable to store program code; and
at least one processor operable to access said at least one memory and operate as instructed by said program code, said program code comprising:

second reception code that causes at least one of said at least one processor to receive the first list transmitted by the first transmission code;

first display control code that causes at least one of said at least one processor to induce a display unit to display the first list received by the first reception code;

third transmission code that causes at least one of said at least one processor to transmit, to the server apparatus, the user operation information for the first list displayed on the display unit;

third reception code that causes at least one of said at least one processor to receive the second list transmitted by the second transmission code; and second display control code that causes at least one of said at least one processor to induce the display unit to display the second list received by the second reception code, wherein the second list generation code causes at least one of said at least one processor to determine a display format of the information items of the targets included in the first list based on a number of the words overlapping with the acquired words respectively related to the at least two specified targets to generate the second list based on the determined display format, and wherein the second list generation code causes at least one of said at least one processor to specify a genre of an information item in which the user is interested among the information items displayed by the first list based on the received user operation information, and generate the second list by prioritizing an information item about a second given target related to a target among the at least two specified targets and the specified genre.

* * * * *